US008332247B1

(12) United States Patent
Bailey et al.

(10) Patent No.: US 8,332,247 B1
(45) Date of Patent: Dec. 11, 2012

(54) METHODS AND SYSTEMS FOR OPTIMIZING NETWORK TRAVEL COSTS

(75) Inventors: G. William Bailey, Newark, DE (US); William A. Huber, Rosemont, PA (US)

(73) Assignee: G. William Bailey, Newark, DE (US)

( * ) Notice: Subject to any disclaimer, the term of this patent is extended or adjusted under 35 U.S.C. 154(b) by 1519 days.

(21) Appl. No.: 11/702,627

(22) Filed: Feb. 6, 2007

Related U.S. Application Data

(63) Continuation-in-part of application No. 09/953,156, filed on Sep. 17, 2001, now Pat. No. 7,412,398, which is a continuation-in-part of application No. 09/095,802, filed on Jun. 11, 1998, now Pat. No. 6,604,083.

(60) Provisional application No. 60/049,448, filed on Jun. 12, 1997.

(51) Int. Cl.
*G06Q 10/00* (2012.01)

(52) U.S. Cl. ........................................ 705/7.11; 705/13

(58) Field of Classification Search ........................ None
See application file for complete search history.

(56) References Cited

U.S. PATENT DOCUMENTS

| | | | | |
|---|---|---|---|---|
| 5,285,494 | A | 2/1994 | Spreecher et al. | |
| 5,521,813 | A * | 5/1996 | Fox et al. | 705/8 |
| 5,809,145 | A | 9/1998 | Slik et al. | |
| 5,884,312 | A | 3/1999 | Dustan et al. | |
| 5,933,100 | A | 8/1999 | Golding | |
| 6,026,384 | A * | 2/2000 | Poppen | 705/400 |
| 6,047,234 | A | 4/2000 | Cherveny et al. | |
| 6,259,988 | B1 * | 7/2001 | Galkowski et al. | 701/202 |
| 6,298,328 | B1 | 10/2001 | Healy et al. | |
| 6,604,083 | B1 | 8/2003 | Bailey | |
| 7,239,959 | B2 * | 7/2007 | Rasmussen et al. | 701/200 |

(Continued)

FOREIGN PATENT DOCUMENTS

JP 59034918 A 2/1984

OTHER PUBLICATIONS

Upchurch et al. "Using GIS to generate mutually exclusive service area linking travel on and off network," Journal of Transport geography 12, p. 23-33, Elsevier, 2003.*

(Continued)

*Primary Examiner* — Jonathan G Sterrett
*Assistant Examiner* — Tzu-Hsiang Lan
(74) *Attorney, Agent, or Firm* — Finnegan, Henderson, Farabow, Garrett & Dunner

(57) ABSTRACT

Methods and systems optimize travel costs both on and off a sequence of one or more networks used to represent travel, communication, or transport of anything within a spatial medium. Such systems and methods can develop a data structure for optimizing travel costs for a region having an embedded network. The data structure includes a grid representation of the region having an array of cells covering the region, an optimal-cost grid dataset containing optimal costs for travel between an initial location in the region and cells in the grid, a hybrid grid-network dataset representing travel costs within the network, within the grid, and between the network and the grid, and back-links among elements of the hybrid grid-network dataset, reflecting optimal travel routes originating at the initial location. Methods and systems also include querying the datasets of the data structure to generate a route with an optimal travel cost from the initial location to a query point.

31 Claims, 27 Drawing Sheets

4300

U.S. PATENT DOCUMENTS

2003/0191683 A1* 10/2003 Bailey ............................ 705/10
2005/0246222 A1* 11/2005 Bailey ............................ 705/10

OTHER PUBLICATIONS

Cohen, Eric, "Miles, Minutes, & Custom Markets," American Demographics, Jul./Aug. 1996, pp. 18-21.*
Freehling, John, "Using Drive Times to Construct Trading Areas," GIS in business conf. proceedings, 1993 pp. 261-264.*
Bielli et al., "object modeling and path computation for multimodal travel systems," European journal of operational research 175, Elsevier 2005, pp. 1705-1730.*
Wu et al. "accomodating user preferences in the optimization of public transport travel," international journal of simulation system, science & technology: applied moeliing & simulation, ISSN 147-8031, pp. 12-25, 2006.*
O'Malley et al., " Retailing applications of geodemographics: a preliminary investigation," Marketing Intelligence & planning, 1995, pp. 29-35.*
van Bemmelen et al., "vector vs raster-based algorithms for cross country movement planning," Proceeding Auto Carto 11, 304-17, 1993.*
Clarke, Graham., "Changing methods of locaiton planning for retail companies," Geojournal 45; pp. 289-298, 1998.*
Sun et al. "A gis-based path searching system for transit networks," journal of the Eastern Asia Scoiety for transportation, vol. 6, 2223-2233, 2005.*
Horn, Mark E.T., "an extended model and procedural framework for planning multi-modal passgenger journeys," Transportation research part B, 37 (2003) pp. 641-660, Elsevier Science, 2003.*
McCormack et al., "exploiting object oriented methods for multimodal trip planning system," Information and Software technology 38, Elsevier Science, 1996, pp. 409-417.*
Li et al., "GIS based itinerary planning system for multimodal and fixed-route transit network," MID-conteinent Transportation Symposium Proceedings pp. 47-50, 2000.*
Yu et al. "Extension to least-cost path algorithms for roadway planning," Int, J, Geographical information science, 2003, vol. 17, No. 4, pp. 361-376.*
Winter, Stephan., "Modeling costs of turn in route planning," Geoinformatica 6;4, pp. 345-361, 2002.*
Applebaum, William, Methods for Determining Store Trade Areas, Market Penetration, and Potential Sales Journal of Mareting Research, vol. 3, No. 2, May 1966, pp. 127-141.
Applebaum, William, Guidelines for a Store-location Strategy Study Journal of Marketing, vol. 30, No. 4, Oct. 1966, pp. 42-45.
Stock R., Distijnce and the utilization of heal facilities in rural Nigeria Social Science Medicine, vol. 17, No. 9, 1983, Abstract.
Bowbly et al, Store Location: Problems and Methods 3 Retail & Distribution Management, Jan./Feb. 1985, pp. 44-50.
Simkin, Lyndon P., Evaluating a Store Location International Journal of Retail & Distribution Management, vol. 18, No. 4, Jul./Aug. 1990, Abstract.
Kohsaka, Hiroyuki, Three-Dimensional Representation and Estimation of Retail Store Demand by Bicubic Splines Journal of Retailing, vol. 68, No. 2., Summer 1992, pp. 221-241.
Freehling, John, Using Drive Times to Construct Trading Areas GIS in Business, Conference Proceedings, 1993, pp. 261-264.
Freeling, John, Use Drive Times to Build Trading Areas and Market Segments Marketing News, vol. 27, No. 10, May 10, 1993, p. 2.
O'Malley et al., Retailing applications of geodemographics: a primary investigation Marketing Intelligence & Planning, vol. 13, No. 2, 1995, pp. 29-35.
Cohen, Eric, Miles, minutes & custom markets American Demcgraphics, Jul./Aug. 1996, pp. 18-21.
Reda, Susan, New Software Tool Aids Supermarket Site Selection Stores, Feb. 1997, pp. 42-43.
O'Kelly, M.E. et al., A Synthesis of Some Market Area Delimitation Modes Growth and Change, Summer 1989, pp. 14-33.
Longley, Paul el al., GIS for Business and Service Planning GeoInformation International, 1995, ISBN: 1-899761-07-1.
Davies, R. L. et al., Store Location and Store Assessment Research John Wiley & Sons, 1991.
Brunner, James A., The Influence of Driving Time Upon Shopping Center Preference Journal of Marketing, vol. 32, No. 2, Apr. 1968, pp. 57-61.
Kerin, Roger A et al., Evaluation of Retail Store Location Through Profitability Analysis Journal of Small Business Management, Jan. 1975, vol. 13, No. 1, pp. 41-45.
Cova, Thomas J. et al., Extending geographical representation to include fields of spatial objects Int. J. Geographical Information Science, vol. 16, No. 6, 509-532.
Abramo, Guy P., Building an effective marketing plan National Petroleum News, vol. 89, No. 11, Oct. 1997, pp. 89-96.
Abramo, Guy P., Finding potential hotspots National Petroleum News, vol. 89, No. 3, Mar. 1997, pp. 40-43.
Abramo, Guy P., Planning your future stores National Petroleum News, vol. 89, No. 1, Jan. 1997, pp. 36-39.
Applebaum, William, Methods for Determining Store Trade Areas, Market Penetration, and Potential sales Journal of Marketing Research, vol. 3, No. 2, May 1966, pp. 127-141.
ArcView Business Analyst, Environmental Systems Research Institute, Inc., Sep. 1998.
ArcView GIS <URL:www.esri.com/software/arcview/graphics/netext.sub.--screenshot.html>.
ArcView Network Analyst: An ESRI White Paper, Apr. 1998. <URL: www.esri.com/library/whitepapers/pdfs/ana0498.pdf>.
Bailey, William G. et al., "Data Dilemma: Turnover and Commingling—Perils of Using Traditional Method Market Analysis for Elder Housing Development and Takeover" Part 2 of 3, The RMA Journal, pp. 78-82, Sep. 2001.
Bailey, William G. et al., "The Three-Cornered Hat: A Fantasy Dance—Perils of Using Traditional Market Analysis for Elder Housing Development and Takeover" Part 1 of 3, The RMA Journal, pp. 78-83, Jul./Aug. 2001.
Bailey, William G., Market and Feasibility Assessment, Fiscal Associates, 16 Fairfield Drive, Newark, DE 19711, Jul. 24, 1998, pp. 1-127.
Beiser, K., 'CD-ROM Report: Evoloving Search Interfaces', Feb. 1995, Database (DTB), v18, n1, pp. 88-92; Dialog File 484: Periodical Abstracts Plustext. Dialog Information Services, Accession # 02246255.
Bell, Robert et al., Assisting marketing decisions by computer mapping Journal of Marketing Research, Feb. 1978, vol. 15, pp. 122-128.
Bowbly et al., Store Location: Problems and Methods 3, Retail & Distribution Management, Jan./Feb. 1985, pp. 44-50.
Breslin, Pat et al., Getting to Know ArcView GIS, Environmental Systems Research Institute, Inc. 1996-1999, ISBN: 1-879102-46-3.
Brown-Kruse, Jamie, et al., Theory and Experiments on Spatial Competition, Economic Inquiry, vol. XXXI, Jan. 1993, pp. 139-165.
Caliper.com—Maptitude Overview Web Pages, Feb. 1999.
Caliper.com Web Pages, Feb. 1997.
Cannaday, Roger Edward, Location Analysis for Consumer-Oriented Facilities of Commercial Banks University of South Carolina, 1980, MT 8020285, Abstract.
Chapman et al. "Demand/capacity management in health care: An application of yield management," Health Care Management Review, Fall 1992, vol. 17, No. 4, pp. 45-55.
Cohen, Eric, Miles, minutes & custom markets, American Demographics, Jul./Aug. 1996, pp. 18-21.
Cova, Thomas J. and Goodchild, Michael F., Extending geographical representation to include fields of spatial objects, Int. J. Geographical Information Science, 2002, vol. 16, No. 6, pp. 509-532.
Craig, Samuel et al., Models of the Retail Location Process: A Review, Journal of Retailing, vol. 60, No. 1, Spring 1984, pp. 5-36.
Culpepper, Brian, Desktop GIS for Business Geographics, Geoplace.com, May 1998.
Daniel, Larry, GIS Helping to Reengineer Real Estate, Earth Observation Magazine, Nov. 1994.
Davies, R. L. et al., Store Location and Store Assessment Research, John Wiley & Sons, 1991.
Demand/capacity management in health care: An application of yield management, Health Care Management Review, vol. 17, No. 4, 1992, pp. 45-54.

Desktop Mapping Solutions for Sales and Marketing—A MapInfo White Paper, MapInfo, Jul. 1996.
Desktop Mapping: Health care, MapInfo, Jan. 1995.
Doctrow, Jerry L. et al., Survival of the Fittest: Competition, Consolidation and Growth in the Assisted Living Industry, Journal of Real Estate Portfolio Management, vol. 5, No. 3., 1999, pp. 225-234.
Dramowicz, Ela, Retail Trade Area Analysis Using the Huff Model, Nova Scotia Community College, Jul. 2, 2005, www.directionsmag.com/article.php?article_id=896&trv=1.
Eckenstahler, Charles R., Generating effecting market and feasibility studies from your real estate consultant, Economic Development Review, vol. 12, No. 3, Summer 1994.
Evans, Jim, The lay of the land: GIS and mapping software, Health Management Technology, vol. 18, No. 5, Apr. 1997.
Fischer, Manfred, et al., Neural Network Modelling of Constrained Spatial Interaction Flows, 41$^{st}$ Congress of the European Regional Science Association, Zagreb, Croatia, Aug. 29-Sep. 1, 2001.
Fletcher, John et al., The Use of Cones to Determine the Market Shares of Service Establishments in a Single Market, The Services Industry Journal, vol. 10, No. 4, Oct. 1990, pp. 722-736.
Franzblau, David, Hospitals using mapping data to plan network coverage, Health Care Strategic Management, vol. 12, No. 7, Jul. 1994.
Freehling, John, Using Drive Times to Construct Trading Areas, GIS in Business Conference Proceedings, 1993, pp. 261-264.
Freehling, John, Use Drive Times to Build Trading Areas and Market Segments, Marketing News, vol. 27, No. 10, May 10, 1993, p. 2.
Friedman et al., "Health Care's Changing Face; The Demographics of the 21.sup.st Century; Three Experts, Three Visions of the Future," Hospitals, Apr. 5, 1991, vol. 65, No. 7, pp. 36-44.
Fung, D. et al., Geographic Information Systems Technology for Business Applications, Journal of Applied Business Research, vol. 13, No. 3, summer of 1997, starting on p. 17.
Geographic Information Systems, Health Data Management, vol. 8, No. 8, Aug. 2000.
Ghosh, Avijit et al., Formulating Retail Location Strategy in an Change Environment, Journal of Marketing, vol. 47, 1983, pp. 56-68.
Guseman, Patrick K, How to Pick the Best Location, American Demographics, vol. 10, No. 8, Aug. 1988, pp. 42-43.
Hewlett-Packard, HP-41C, Financial Decisions PAC, "Compound Interest Solutions: The Cash Flow Diagram and Sign Convention", 15 pages, 1980.
Howarth, Robin A. et al., Office market analysis: Improving best-practice techniques, The Journal of Real Estate Research, vol. 16, No. 1, 1998, pp. 15-34.
Huff, David L., Parameter Estimation in the Huff Model, ArcUser, pp. 34-36, Oct.-Dec. 2003.
Huff, David, Defining and Estimating a Trade Area, Journal of Marketing, Jul. 1964, col. 28, pp. 34-38.
Hyndman, Jilda et al., A comparison of measures of access to child health clinics and the implications for modeling the location of new clinics, Australian and New Zealand Journal of Public Health, vol. 23, No. 2, Apr. 1999, pp. 189-195.
Joerger, Albert et al., Applying Geographic Information Systems, Cornell Hotel and Restaurant Administration Quarterly, vol. 40, No. 4, Aug. 1999, pp. 48-59.
Jones, Ken et al., The Geography of markets, Ivey Business Journal, vol. 63, No. 3, Mar./Apr. 1999, pp. 66-70.
Kates, Shawn M., Retail Site Selection Using GIS and MCDM: A Case Study of the Toronto Retail Jeweler Industry, The University of Western Ontario, Master Thesis, May 1997.
Kerin, Roger A et al., Evaluation of Retail Store Location Through Profitability Analysis, Journal of Small Business Management, Jan. 1975, vol. 13, No. 1, pp. 41-45.
Klosterman, Richard et al., Retail Impact Analysis with Loosely Coupled GIS and a Spreadsheet, International Planning Studies, vol. 2, No. 2, 1997, starting on p. 175.
Kohsaka, Hiroyuki, Three-Dimensional Representation and Estimation of Retail Store Demand by Bicubic Splines, Journal of Retailing, vol. 68, No. 2, Summer 1992, pp. 221-241.
Kristiansen, Paul, Geographic Distribution of Nurseries in Brisbane, 1995. Downloaded from Internet <URL: www-personal.une.edu.au/.aboutpkristia/Paul/Research/Nursery_project/ nursery_project.html> [downloaded Jul. 30, 2001].
Lang, L., Fox, S., "Getting There with Software Maps", Mar. 1993, PC World, PC World, v.11, n3, p. 182(7), Dialog File 47: Gale Group Magazine DB.TM.
Limp, Fredrick, "ArcView 3.0 for Windows," GIS Wrld, vol. 9, No. 12, Dec. 1996, p. 120(2).
Longley, Paul et al., GIS for Business and Service Planning, GeoInformation International, 1995, ISBN: 1-899761-07-1.
Mapinfo.com Web Pages—Map Gallery, MapInfo, Oct. 1999.
MapInfo.com Web Pages—Sales and Marketing Testimonials, MapInfo, Aug. 2000.
MapInfo.com Web Pages—Decision Maker Resource, MapInfo, May 1999.
Marshall, Patrick, PC Mapping Software Matures, InfoWorld, vol. 14, No. 49, Dec. 7, 1992.
Mason, Barry J. et al., Modern Retailing—Third Edition, Business Publications Inc., 1984.
Mayfield, Lisa Pritchard, Software choices bring efficiencies, profits, National Real Estate Investor, vol. 39, No. 7, Jul. 1997.
Metro Data Resource Center, 1997 <URL: storefront.metro-region.org/drc/index.cfm>. [Follow links to "Custom Services", Market Profile Service, "DRC Staff"].
Mitchell, Andy, The ESRI Guide to GIS Analysis—vol. 1: Geographic Patterns & Relationships Environmental Systems Research Institute, Inc. 1999, ISBN: 1-87910206-4.
Myers, Dowell et al., Identifying a well-funded market analysis, Appraisal Journal, vol. 61, No. 4, Oct. 1993.
Network analysis in raster GIS using MFworks www.husdal.com/mscgis/thsis/htm/chapter3.htm.
Network Solutions, Inc. Web Registry. URL:www.netwol.com/cgi-bin/whois/whois?STRING=metro-region.org&Search- Type=do.
Notice of Allowance mailed Jan. 13, 2003 for U.S. Appl. No. 09/095,802 (parent application), filed Jun. 11, 1998, 8 pages.
Office Action mailed Aug. 1, 2001, directed to U.S. Appl. No. 09/095,802 (parent application), filed Jun. 11, 1998, 8 pages.
Office Action mailed Jan. 15, 2002, directed to U.S. Appl. No. 09/095,802 (parent application), filed Jun. 11, 1998, 11 pages.
Office Action mailed Dec. 1, 2005 for U.S. Appl. No. 09/953,156 (parent application), filed Sep. 17, 2001.
Office Action mailed May 15, 2006 for U.S. Appl. No. 09/953,156 (parent application), filed Sep. 17, 2001.
Office Action mailed Nov. 3, 2006 for U.S. Appl. No. 09/953,156 (parent application), filed Sep. 17, 2001.
Office Action mailed Sep. 18, 2000, directed to U.S. Appl. No. 09/095,802 (parent application), filed Jun. 11, 1998, 8 pages.
Office Action mailed Apr. 19, 2007 for U.S. Appl. No. 09/953,156 (parent application), filed Sep. 17, 2001.
Office Action mailed Dec. 27, 2006 for U.S. Appl. No. 11/110,884 (parent application), filed Apr. 21, 2005.
O'Kelly, M.E. et al., A Synthesis of Some Market Area Delimitation Models, Growth and Change, Summer 1989, pp. 14-33.
O'Malley et al., Retailing applications of geodemographics; a primary investigation, Marketing Intelligence & Planning, vol. 13, No. 2, 1995, pp. 29-35.
Orkin, Eric B., Boosting Your Bottom Line with Yield Management, Cornell Hotel and Restaurant Administration Quarterly, vol. 28, No. 4, Feb. 1988, pp. 52-56.
Osborn, Thomas, Sizing Up Site Requirements for the Lifecare Center, Healthcare Financial Management, vol. 40, No. 11, Nov. 1986, Abstract, pp. 42-43.
Overstreet, George, Creating value in oversupplied markets: The case of Charlottesville Virginia Hotels, Cornell Hotel & Restaurant Administration Quarterly, vol. 24, No. 5, Oct. 1993.
Pallato, J., "PCs and Mapmaking: Cartographers have just begun to explore the potential of microcomputers", Mar. 18, 1986, PC Week, v.3, n11, p. 57; Dialog File 275: Gale Group Computer DB.TM . . . Dialog Information Services, Accession # 01176036.
Patterson, David, Mapping out your future, Nursing Homes, vol. 44, No. 8, Oct. 1995.
Pearce, Michael, Retail Marketing Management, Nelson, Canada 1997, ISBN: 0-17-603438-2.

Power Your Business With ESRI GIS White Paper, Environmental Systems Research Institute, Inc., Oct. 1999.
Reda, Susan, New software tool aids supermarket site selection, Stores, vol. 79, No. 2, Feb. 1997, Abstract.
Retooling: Mapping, Marketing Tools, Mar./Apr. 1996, starting on p. 40.
Rogers, David, A Review of Sales Forecasting Models Most Commonly Applied in Retail Site Evaluation International Journal of Retail & Distribution Management, Jul./Aug. 1992, vol. 20, No. 4.
Rogers, David et al., A New Perspective on Forecasting Store Sales Applying Statistical Models and Techniques in the Analog Approach, Geographical Review, vol. 69, No. 4, Oct. 1979, pp. 449-458.
Roy, John R., Areas, nodes and networks: Some analytical considerations, Papers Reg. Sci. 78, 135-155 (1999).
SeePMD.com Web Pages, Project Market Decisions, Inc., Jan. 1997, 1998.
Segal, Donald B., Retail Trade Area Analysis: Concepts and New Approaches, Directions Magazine, Nov. 18, 1998.
Simkin, Lyndon P., Evaluating A Store Location, International Journal of Retail & Distribution Management, vol. 18, No. 4, Jul./Aug. 1990, Abstract.
Spatial Insights Releases Trendmap, Location Intelligence, Oct. 6, 1998.
Stock, R. Distance and the utilization of heal facilities in rural Nigeria, Social Science Medicine, vol. 17, No. 9, 1983, Abstract.
Shuey, David, Researching the market for assisted living facilities, Marketing Health Services, vol. 20, No. 4, Winter 2000, pp. 30-31.
Taneja, Sunil, Technology Moves In, Chain Store Age, May 1999, vol. 75, No. 5, pp. 136, 138.
Tessier, Eleanor et al., Trade area analysis from private pay assisted living facilities, Journal of Real Estate Portfolio Management, vol. 5, No. 3, 1999, pp. 275-286.
Thrall, Grant Ian et al., Applying the seven-step site selection methodology to Red Lobster Restaurants: Steps One and Two, Geo Info Systems, vol. 8, No. 2, Feb. 1998, pp. 40-43.
Thrall, Grant Ian et al., Market Evaluation with GIS Part 4: Analyzing the location decision, Geo Info Systems, vol. 9, No. 11, Nov. 1999, pp. 44-49.
Thrall, Grant Ian et al., Retail Location Analysis Step Five: Assess Market Penetration, Geo Info Systems, vol. 8, No. 9, Sep. 1998, pp. 46-50.
Thrall, Grant Ian et al., Retail Location Analysis Step Four: Identify Situation Targets, Geo Info Systems, vol. 8, No. 6, Jun. 1998, pp. 38-43.
Thrall, Grant Ian et al., Retail Location Analysis Step Six: Identify Markets for Expansion, Geo Info Systems, vol. 8, No. 11, Nov. 1998, pp. 42-45.
Thrall, Grant Ian et al., Retail Location Analysis Step Three: Assessing Relative Performance, Geo Info. Systems, vol. 8, No. 4, Apr. 1998, pp. 38-44.
Thrall, Grant Ian et al., William Applebaum: Father of Marketing Geography, Geo Info Systems, Sep. 1998, p. 50.
Thrall, Grant Ian, CACI Site Reporter with Scan/US, Geo Info Systems, vol. 8, No. 6, Jun. 1998, pp. 46-49.
Thrall, Grant Ian, Demographic ring study reports with GIS technology, Journal of Real Estate Literature, vol. 7, No. 2, Jul. 1999, pp. 211-217.
Thrall, Grant Ian, iSite Version 4.1, Geo Info Systems, vol. 9, No. 6, Jun. 1999, pp. 47-51.
Turkel, Stanley, A Fresh Look at Feasibility Studies, Lodging Hospitality, vol. 53, No. 1, Jan. 1997, p. 16.
Villalon, Maria, GIS and the Internet: Tools That Add Value to Your Health Plan, Health Management Technology, vol. 20, No. 9, Oct. 1999, pp. 16-18.
Winning Retail—A self-assessment and instructional guide for independent retailers, Industry Canada, Aug. 2000.
Yrigoyen, Coro Chasco et al., Spatial Interaction Models Applied to the Design of Retail Trade Areas, Congress of the European Regional Science Association.
ZA Consulting Acquires Project Market Decisions, Business Wire, Aug. 14, 1997.
Final Official Action dated Jun. 11, 2007 issued in co-pending U.S. Appl. No. 11/110,884.

* cited by examiner

| Market Area | Weight | Travel Time |
|---|---|---|
| Primary | 53.1% | 0-17 |
| Secondary | 14.2% | 18-30 |
| Tertiary | 4.1% | 31-45 |
| Out | 26.5% | Out |

8400

9530

9520

9510

17300

17310 17340 17350 17360 17370 17380

| Category | Age < 65 | Mobility & Self-care Limits | Qualified by Income | Over 75 | 65 to 74 |
|---|---|---|---|---|---|
| A | Yes | Yes | No | No | No |
| B | Yes | Yes | Yes | No | No |
| C | No | Yes | No | Yes | No |
| D | No | Yes | Yes | Yes | No |
| E | No | Yes | No | No | Yes |
| F | No | Yes | Yes | No | Yes |
| G | No | No | Yes | Yes | No |
| H | No | No | No | Yes | No |
| I | No | No | No | No | Yes |
| J | No | No | Yes | No | Yes |

FIG. 17

METHODS AND SYSTEMS FOR OPTIMIZING NETWORK TRAVEL COSTS

RELATED APPLICATIONS

The present application is a continuation-in-part of U.S. patent application Ser. No. 09/953,156, filed on Sep. 17, 2001 now U.S. Pat. No. 7,412,398, which is a continuation-in-part of application Ser. No. 09/095,802, filed on Jun. 11, 1998 and now U.S. Pat. No. 6,604,083, which claims priority to U.S. provisional Application No. 60/049,448 filed Jun. 12, 1997, all of which are incorporated herein by reference.

DESCRIPTION OF THE INVENTION

1. Technical Field

The present invention relates generally to methods and systems to optimize travel costs on and off one or more networks used to represent travel, communication, or transport of anything within a spatial medium.

2. Background

Finding optimal routes in transportation networks or any similar network-like structure, such as the network of connections on an integrated circuit or a telecommunication network, is an important problem. An "optimal" route in this sense is one that connects at least one of a set of origin points to at least one of a set of destination points with the least total cost. The total cost is the sum of specified non-negative costs to traverse each junction and each path between junctions along the route.

Two general methods of representing networks are a vector method and a raster method. The vector method does not require an explicit mapping of the network elements, such as nodes and edges. The raster method maps the network elements onto a surface (or into a space), which itself is discretized into an array of small cells, called a "raster." Vector methods alone do not adequately accommodate movement onto or off the network from its surrounding region, while raster methods cannot easily represent one-way travel or edge crossovers such as overpasses or underpasses on a highway.

While optimal routes along single networks can been found using long-standing vector methods, such as Dijkstra's Algorithm, and optimal routes for travel in arbitrary directions on a surface off network have long been found using raster methods, the vector method or the raster method alone cannot solve a set of problems consisting of moving among one or more networks from locations both on and off network. For example, travel within the region can occur arbitrarily, by moving about from point to point (although the cost of travel through certain parts of the region can vary and may be prohibitively high), but can also be expedited by moving along one or more embedded networks. This models the actual travel of people, goods, or information, which often occurs in a "multi-modal" fashion via many possible routes. This set of problems is referred to as the Multimodal Problem.

Therefore, the Multimodal Problem consists of finding the transport costs between points that are served by more than one network or, perhaps, are served by no network at all. For example, a person traveling from home to work might walk a short distance to the car, drive to the train station, take the train to another stop, and then walk to work from there. This example involves a sequence of two networks—the automobile and train networks—and includes travel by foot among arbitrary points on the ground. To find the shortest route to work involves solving a least-cost problem where "cost" is directly proportional to travel time. A similar, but perhaps economically more important application, concerns determining the least expensive (or fastest) way to ship goods when opportunities of multimodal transportation using trucks, trains, and even barges exist. Current methods use relatively inefficient and very approximate methods to solve this problem.

Dijkstra's Algorithm allows two related problems to be solved efficiently:

(I) Given a fixed origin, whether or not it lies on a network, find the time (or more generally, the cost) to travel to any point on the network.

(II) Efficiently find the cost to travel from any point to any other point, regardless of whether they lie on the network.

The usual method to solve Problem I is by approximation, preferably by "snapping" the origin and destination to nearest points on the network (or to the nearest points where the network can be accessed, such as train stations or bus stops). Snapping involves replacing an origin or destination by a geometrically nearest point on the network. Occasionally, some cost is imputed to the snapping, but such a cost is an approximation, and the snap point may not be the most realistic one to use. When the origin and destination do not lie close to the network, or when the cost of traveling from them to the network (i.e., getting on or off the network) is high, this approximation is likely a poor one. In order to address Problem II, one needs information about the cost of traveling between points off the network.

Combining Problems I and II creates the Multimodal problems:

(III) Given a fixed origin (or finite set of origins), efficiently find the cost to travel to all other points within the vicinity of the network.

(IV) Given a fixed origin (or finite set of origins), not necessarily lying on any network, find the cost to travel to all other points within the vicinity of a collection of networks.

The Multimodal Problem generally refers to Problem IV, while Problem III may be considered as a simplified example of the Multimodal problem.

Examples of the Multimodal Problem include analysis and management of any medium in which information, goods, or people are moved about, including, but not limited to:

communication networks
integrated circuits
power grids
utility corridors, including electric transmission lines and pipelines
location-based Web services
multimodal transportation logistics
air and marine shipping
GPS routing
air traffic control
market analyses
emergency response
wilderness search and rescue.

Solving the Multimodal Problem would allow a useful generalization to find optimal routes from any point to any other point where there exist multiple overlapping networks, such as a road system, a rail system, air travel, and boat travel, even when there do not exist direct connections among them (or when information about such connections does not exist in an explicit form and has to be inferred from spatial proximity alone). The solution becomes more important when a significant component of the travel time or cost involves walking, transfer of goods, or any other form of off network travel.

SUMMARY

A method consistent with the invention for optimizing travel costs for a region having an embedded network comprises developing a data structure for the region and querying datasets in the data structure automatically to generate a route with an optimal travel cost from the initial location to a query point. The data structure has a grid representing the region, the grid comprising a plurality of cells covering the region; an optimal-cost grid dataset containing optimal costs for travel between an initial location in the region and cells in the grid; a hybrid grid-network dataset representing travel costs within the network, within the grid, and between the network and the grid, and back-links among elements of the hybrid grid-network dataset, the back-links reflecting optimal travel routes originating at the initial location.

A system consistent with the invention for optimizing travel costs for a region having an embedded network comprises means for developing a data structure for the region, the data structure, and means for querying the datasets in the data structure to generate a route with an optimal travel cost from the initial location to a query point. The data structure has a grid representing the region, the grid comprising a plurality of cells covering the region; an optimal-cost grid dataset containing optimal costs for travel between an initial location in the region and cells in the grid; a hybrid grid-network dataset representing travel costs within the network, within the grid, and between the network and the grid; and back-links among elements of the hybrid grid-network dataset, the back-links reflecting optimal travel routes originating at the initial location.

Both the foregoing general description and the following detailed description are exemplary and explanatory only and are not restrictive of the present invention, as claimed.

BRIEF DESCRIPTION OF THE DRAWINGS

The accompanying drawings, which are incorporated in and constitute a part of this specification, illustrate several embodiments.

FIG. 17 is a table corresponding to the exemplary demand model of FIGS. 16A-16D;

DETAILED DESCRIPTION

Figure 1:
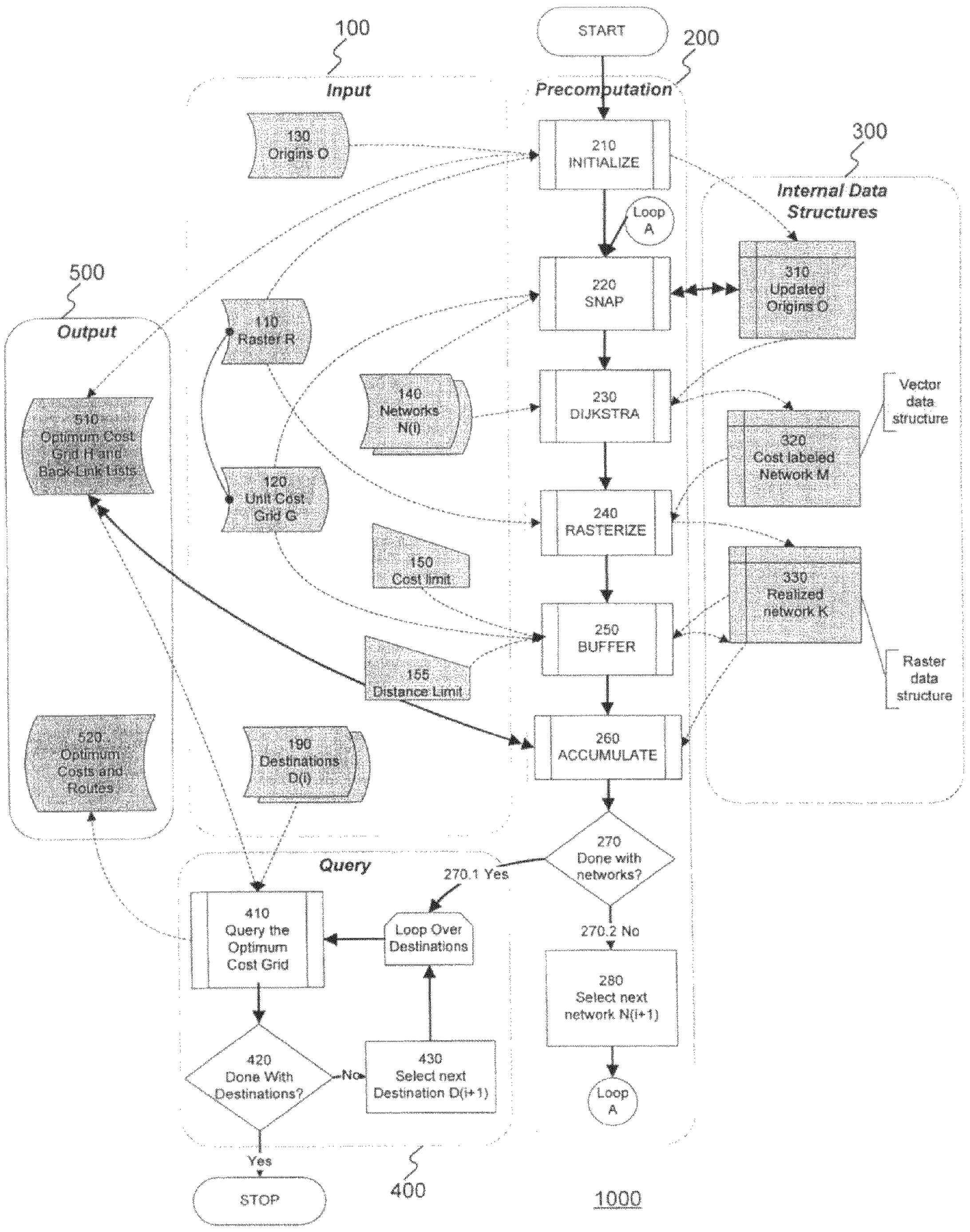
FIG. 1 is a flowchart of an exemplary method for optimizing travel costs for a region having at least one embedded network.

Reference will now be made in detail to exemplary embodiments consistent with the present invention, examples of which are illustrated in the accompanying drawings. Wherever possible, the same reference numbers in different drawings refer to the same or like parts. While the description includes exemplary embodiments, other embodiments are possible, and changes may be made to the embodiments described without departing from the spirit and scope of the present invention. The following detailed description does not limit the present invention. Instead, the scope of the present invention is defined by the appended claims and their equivalents.

As used herein, a graph is the topological description of how points on a network are connected. Mathematically, a graph is an ordered pair (V, E) consisting of a set V (whose members are referred to as nodes) and a set E whose members are ordered pairs of elements of V. An element of E is called an edge. The first component of an edge is its initial node and the second component of an edge is its terminal node. Ordering the pairs imposes a direction on each edge. Bidirectional edges can either be represented by adding a binary flag to indicate travel can occur in both directions along an edge or by introducing a second edge from the terminal to the initial node. As used in the following description, a network will be any graph whose edges are labeled with two non-negative real numbers, thought of as a length and a travel cost.

Networks can be used to represent the time or, more generally, the cost expected to travel along transportation routes. When a network represents a transportation route, its nodes represent specific locations or interchanges, its edges represent paths taken between those locations, and the edge labels are typically the actual distance and the cost or time required to travel along the edge. This representation is "abstract" in the sense that the paths have not yet been associated with actual sequences of points within some space or medium. An edge only reflects the fact that transport somehow can occur between the initial and terminal nodes of the edge.

A region is a set of locations that can be continuously mapped. In many applications, this region will be two-dimensional, but one of ordinary skill in the art will recognize that, within the spirit and scope of the present invention, a region may be multi-dimensional. By including time as a dimension, this allows the method to be applied to find optimal paths in schedule-constrained networks. The images of the maps are subsets of the plane, or more generally, subsets of Euclidean n-dimensional space with its usual Cartesian coordinates. In many applications, the region represents part of the surface of the earth, but the concept is more general. For example, a surface might be the surface of a computer chip. And a three-dimensional implementation of the method consistent with the present invention can handle communications within multiple layered chips.

Consistent with the present invention, a network is embedded in a region when its nodes correspond to points of the region and corresponding to its edges are continuous, rectifiable paths in the region connecting those points. Such paths are called realizations of the edges, or realized edges. Realized edges may intersect themselves or each other, but any new points created at intersections are not considered nodes of the network and do not represent mechanisms to transfer from one edge to another. For example, a highway overpass is a spatial overlap of road network edges for which no connection (node) exists. When a network has been embedded in a region, the length assigned to a network edge usually is the geodesic length of the corresponding path. The geodesic length is derived from a metric defined on the region. This usually is the Euclidean metric for small, relatively flat regions or a spheroid metric for sizable portions of the earth's surface, for instance. When the distinction between a network edge and its realization needs to be emphasized, the network edge (an ordered pair of vertices, q.v.) is sometimes called an abstract edge.

An interior point of a realized edge of an embedded network is any point of the region that lies on the edge but does not coincide with either of the edge's vertices.

In addition, a function on a region assigns a unique value to each point in the region. For example, functions can be used to represent cost per unit distance or speed per unit distance to travel in arbitrary directions in the vicinity of each point of a region. A special kind of function is the back link: its value at a point consists either of another point in the region or of a network node. Back links are used to trace routes from a destination back to an origin.

The values of a cost function specify the cost (or time) per unit distance required to travel along a region at each point. For instance, the cost function for walking across a flat landscape might be 0.5 hours per mile at every point that is not part of a water body or other physical barrier. Otherwise, the cost would be infinite (or very large).

A path in a region is a rectifiable map from an interval of real numbers into the region. It can be thought of as a continuous sequence of points in the region whose length can be computed. Paths are represented by arcs. A (polygonal) arc is represented by a sequence of ordered pairs of points (vertices) $(V_0, V_1), (V_1, V_2), \ldots, (V_{n-1}, V_n)$ where the points are given by their coordinates and the terminal point of each pair is identical to the initial point of any subsequent pair. The path itself follows the geodesic line segments from $V_0$ to $V_1$ to ... to $V_n$ at a uniform speed. The start vertex of the arc is $V_0$, and the end vertex is $V_n$. Given a cost function, the cost of a path in the region is the integral of the cost function over that path.

Furthermore, a raster is a decomposition of a region into subregions (cells) (a) that can be addressed uniquely by an ordered n-tuple of integers (where n is the dimension of the region); (b) where coordinates of a designated point (the "center") of each cell are either provided or can be rapidly computed from the cell's address; (c) where the addresses and geodesic distances to the adjacent cells are either provided or can rapidly computed from the cell's address; and (d) where the addresses of the cells containing any given geodesic line segment in the region can rapidly be computed. A commonly used raster representation of a part of the Euclidean plane consists of a regular grid of squares forming rows and columns. The addresses (a) consist of the row and column indexes. Center point coordinates (b) are linear functions of the addresses (depending only on the position of a corner of the raster's region and on the common length of the cell sides). Addresses for neighboring cells (c) are obtained by changing the values of a cell's address by 0 or ±1; and the geodesic distances to these neighbors (c) are computed from center point coordinates via the Pythagorean Theorem. Addresses of cells containing any given line segment (d) are computed using well-known algorithms based on linear interpolation of coordinates. Other kinds of rasters are possible, including regular and irregular arrays of rectangles; regular arrays of triangles, hexagons, or parallelograms; and even unusual arrays of cells formed by coordinate lines in different coordinate systems such as polar coordinates. These examples of rasters extend, mutatis mutandis, to decompositions of higher-dimensional spaces and decompositions of Riemannian manifolds such as the sphere or spheroid commonly used as an earth reference system.

Any raster implicitly describes the portion of a region consisting of the union of all its cells. Consistent with the present invention, the region is represented by or covered by the raster.

The mesh of a raster is the largest distance between adjacent cells in a raster. A raster with a relatively small mesh is fine, and a raster with a relatively large mesh is coarse.

A raster function, or grid, assigns a unique value to each cell of a raster. In other words, the grid is "based on" the raster. Raster functions are used as discrete representations of functions defined on a region: the value assigned to a cell is typically the value of the function at the cell's center or some statistical summary, such as the mean or median, of the function's values within the cell's points. Values can be multivariate; that is, they can consist of ordered k-tuples of values for $k \geqq 1$, and they can even be more complex, such as a back link (q. v.).

A "multipath" is travel that takes one along parts of various networks. For instance, a complete route from one's home in New York to a building in California might begin by a walk to the bus stop, a trip along part of a bus route, a walk to the train station, a trip along part of the train network, a shuttle to the airport, several flights over an air network, and a cab ride from the terminal airport to the ultimate destination. This example involves portions of bus, train, air, and road networks, as well as off-network travel for the walks (which might constitute an important part of the trip).

Therefore, a multipath may be referred to as a sequence of paths (within a region containing one or more embedded networks) that has the following two properties.

(a) Some paths in the sequence are subsets of (and have the same orientation as) embedded network edges. The cost of such a path is the pro-rated cost of the corresponding network edge; that is, it is the cost of the edge multiplied by the length of the path divided by the length of the edge. The cost of the remaining (non-edge) paths is computed from a cost function defined on the region.

(b) Except for the last path in the sequence, the terminus of each path coincides with the origin of the next path.

The cost of a multipath is the sum of the costs of its component paths. A multipath represents a route that may move along any of the networks (by following embeddings of their edges) as well as along the region independently of any of the networks.

Edges of an embedded network can have an additional attribute in addition to their costs and possible bidirectionality. An inaccessible edge is one whose interior points cannot start or end any component of a multipath. This represents situations where only certain parts of networks can be used to get on or off the network: the train stations, bus stops, and non-limited access highways, for instance.

A labeled point is a point with an associated number representing a cost to reach that point. Labeled points are usually represented by coordinates to indicate their position in the region along with an additional number for the label. A cost-labeled network is a network having associated costs with every vertex.

Consistent with the present invention, systems and methods described below can accommodate situations where the "off-network" costs should not be neglected. They can also accommodate routing between multiple networks of the same or different types, even where explicit connections among those networks have not been specified. Natural extensions of it can accommodate costs associated with network nodes such as waiting times at stoplights, costs to enter or leave a network, tolls, and so on.

FIG. 1 is a flowchart of an exemplary method 1000 for optimizing travel costs for a region having at least one embedded network. Consistent with the present invention, method 1000 is designed for highly efficient computation of the least-cost travel relative to an origin or finite set of origins. This is the function whose value at any point P (whether on or off a network) is the least cost required to travel from the origin (or some one of the set of origins) to P.

As shown in FIG. 1, method 1000 comprises stages 100, 200, 300, 400, and 500. Stage 100 develops various input datasets for stage 200. Stage 200 is a precomputation stage, which reads from input datasets and internal data structures and writes to internal data structures. Stage 300 updates various internal data structures based on the activities in stage 200. One of ordinary skill in the art will recognize that any implementation (and location) of input datasets and data structures described herein is contemplated within the scope and spirit of the present invention. For example, input datasets and internal data structures may be implemented as tables, views, or databases. In addition, input datasets and internal data structures may be implemented as the same or different type and may reside in the same table or database.

Collectively, stages 100, 200 and 300 may be referred to as the "development stage." The development stage may be implemented in many different sequences or manners. For example, stages 100, 200 and 300 may be implemented as a single stage.

After stages 100, 200, and 300, method 1000 generates optimal cost grid 510 for query and output. Stage 400 queries optimal cost grid 510 concerning costs and routes to any destination point in the region. Stage 500 generates output regarding optimum costs and routes for travel on and/or off network.

Now referring back to input stage 100, dataset 110 describes a fixed raster R representing the region through which off-network travel may occur, while dataset 120 represents a cost grid G (based on the fixed raster R) providing the cost of travel per unit distance within each cell of the fixed raster R. Dataset 110 is thus a grid representing the region, comprising an array of cells covering the region. The raster R will be the basis for all grids (data structures) created during the execution of stage 200. In addition, the region's unit cost function is provided in a grid format, represented as an array of (scalar) cost values along with raster information (such as origin, cell size, and spatial extent) needed to reference the grid values to region coordinates. The cost grid G itself may contain special values indicating inaccessible locations (such as waterways, when only land travel is being considered) or the presence of barriers restricting travel which otherwise may take place freely throughout the region.

The information regarding costs of travel may be calculated using a formula to compute costs of travel per unit distance as a function of location or other attributes in the region.

Stage 100 also provides datasets 130 and 140. Dataset 130 represents a finite set O of labeled origin points within the region represented by the raster R. The original points are not limited to points in the network. Dataset 140 represents a sequence of networks $(N_1, N_2, \ldots, N_n)$, $n \geqq 1$, where the edges of each network are labeled with lengths and total costs and each network also has an embedding into the region represented by the raster R. As discussed earlier, an abstract network is represented in a conventional way as an array of nodes. Associated with each node is a list of the edges it initiates. An edge points to its terminal node and also contains a binary indicator of the edge's accessibility. An embedded network associates an arc to each edge of the network, representing the realization of that edge within a region. Attached to each such arc are a cost-per-unit-length and a total length. The start and end vertices of the arc provide coordinates for the edge's initial and terminal nodes, respectively. The arc may contain many intermediate vertices in its representation, but such intermediate vertices do not explicitly correspond to any network nodes.

As shown in FIG. 1, stage 100 may also provide datasets 150, 155 and 190. As discussed later, dataset 150 is an optional cost limit value to speed up precomputation during stage 200 by only computing costs that do not exceed the predetermined cost limit. Similarly, dataset 150 is an optional distance limit value to speed up precomputation during stage 200 by only computing costs that do not exceed the predetermined distance limit. Dataset 190 represents a finite set D of destination points in the region specified by their coordinates. Dataset 190 will be used during query stage 400 to generate optimal routes. Dataset 190 may be generated by interactive query or by real-time coordinate information supplied by GPS units or other location-finding devices.

Referring now to stage 200, precomputation consists of two sub-stages: initialization (step 210) and iteration (steps 220, 230, 240, 250, and 260). Iteration consists of computing optimum travel costs on an abstract network, "Dijkstra" (step 230), followed by computing optimum travel costs throughout a raster in which that network has been embedded, using the "Rasterize" (step 240), "Buffer" (step 250), "Accumulate" (step 260), and "Snap" (step 220) steps described below. A sequence of such steps (270.2, 280) computes optimum travel costs across a given sequence of networks.

During initialization step 210, method 1000 labels each origin point in O (dataset 130) with a zero cost and creates a new optimal-cost grid H (dataset 510) based on the raster R (dataset 110). Each cell of R will have two values, one representing cost (to reach the cell from O) and another being a back-link pointing to the previous cell or network node along an optimum route having the cell as destination. Method 1000 further initializes the costs to infinity and sets the back-links in grid H to null. One of ordinary skill in the art will recognize that any implementation (and location) of dataset 510 is contemplated within the scope and spirit of the present invention.

For example, dataset 510 may comprise two datasets, one representing costs of travel and the other representing the back-links.

The next sub-stage is iteration. During iteration i (i=1, 2, . . . , n), the symbol N will stand for the $i^{th}$ network (dataset 140). Stage 300 updates various internal data structures based on the activities in stage i. The Snap step 220 computes the costs and the back-links to travel along the grid G (dataset 120) to the nearest accessible location of N starting at each labeled origin in O (dataset 130). Each origin (and the back-links associated with it) is updated as a result. The origin's location is set to the corresponding point of N and its label is incremented to reflect the additional cost of the travel to N. If necessary, the network is augmented to include every point of O among its nodes (if they are not already there), using at most one point per raster cell. Whenever two or more points in O are made to correspond to the same point during this updating, all points having greater labels (higher costs) will be removed from O. An internal data structure 310 stores the information regarding the updated origins as part of stage 300.

Next, the Dijkstra step 230 computes the costs and the back-links to travel solely along the network to all network nodes, beginning at the labeled points O. The output is a cost-labeled network M (data structure 320).

The Rasterize step 240 realizes the edges of M (data structure 320) by "rasterizing" them into the raster R (dataset 110). This associates two attributes to every cell of R intersecting the realized edges of M: the cost and whether it is "accessible." The output is represented as a grid K (data structure 330). Therefore, data structure 330 is a hybrid grid-network data structure. If multiple realized edges of M fall into the same cell of R, then that cell is considered accessible provided at least one of the edges is accessible at a point in the cell. The cost is the minimum among all accessible costs. If the cell is not accessible, the cost is the minimum among all costs.

The Rasterize step 240 preferably accomplishes two results. It must create a raster representation of the network edges, and it must interpolate costs along the edges, based on costs at their endpoint nodes, and copy those interpolated costs into the corresponding cells.

The first procedure is standard and can be accomplished in many ways. Raster display devices routinely convert vector representations of line segments and polygon boundaries into raster versions. The Rasterize step 240 should also interpolate costs, which it will assign to the cells. Costs are usually interpolated linearly. For some cells, however, involving bi-directional network edges, special care is necessary to achieve correct results. This occurs when the maximum travel cost is reached in the interior of the realized edge.

Figure 2A:
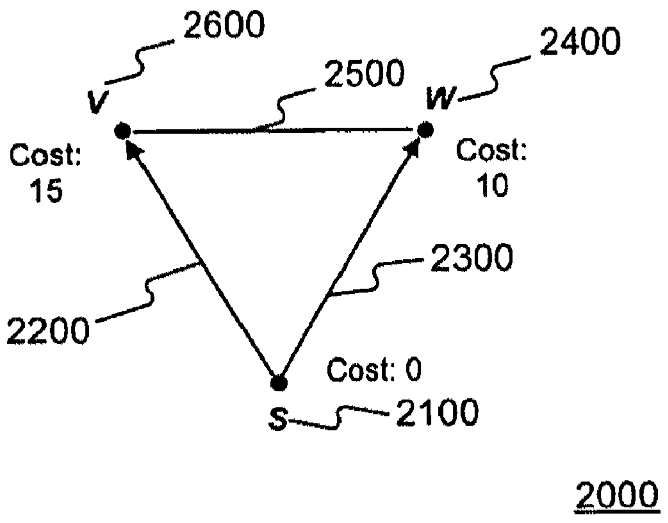
FIG. 2A is a diagram illustrating an exemplary network having a bi-directional edge.
Figure 2B:
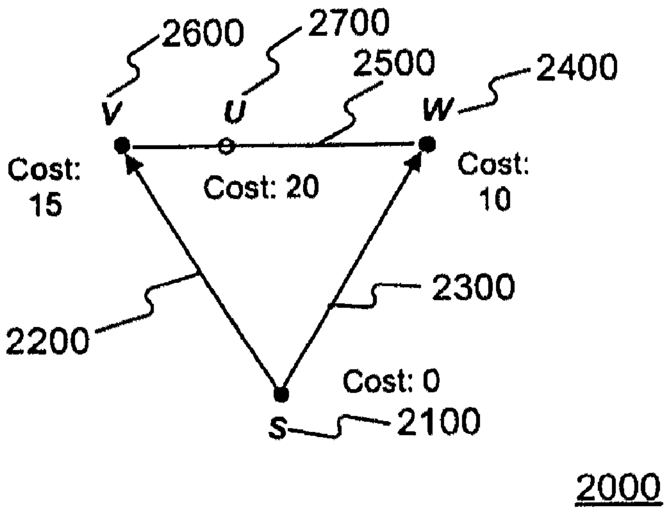
FIG. 2B is a diagram illustrating an exemplary network having costs interpolated along a bi-directional edge.

An example of interpolating costs within a network involving bi-directional network edges is illustrated in FIG. 2A and FIG. 2B. FIG. 2A shows an exemplary network 2000. Network 2000 has cost-labeled nodes 2100 (S), 2400 (W), and 2600 (V), a bi-directional top edge 2500 between nodes 2400 and 2600, and two other edges 2200 and 2300. The cost to reach V from S is 15 and the cost to reach W from S is 10. Assuming constant cost of travel per unit length along the upper edge 2500, and supposing the total cost of travel along that edge is 15, the maximum cost of 20 is reached at the point 2700 (U), one-third of the way from the left node 2600, as shown in FIG. 2B.

The maximum cost of 20 to reach U is calculated as follows. Costs are linearly interpolated from both endpoints of the upper edge to the point of maximum cost. Specifically, when the total cost of travel along a bidirectional edge (V, W) between nodes V and W is c, the optimum cost to reach V is x, and the optimum cost to reach W is y, then the maximum cost z is determined by the equation, $(z-x)+(z-y)=c$, hence $z=(c+x+y)/2$. As shown in FIG. 2A and FIG. 2B, V is the left node of the top edge and W its right node, c=15, x=15, and y=10, yielding z=(15+15+10)/2=20. The point of maximum cost, U, is found by linearly interpolating along the embedded edge by the amount $(z-x)/c$ from the node V towards the node W. Here, this point will be found one-third of the way from V to W because (20−15)/15=⅓. The cost to reach any cell lying on the realized edge between V and U is obtained by linear interpolation from 15 to 20; the cost to reach any cell lying on the realized edge between W and U is obtained by linear interpolation from 10 to 20.

Returning to FIG. 1, the Buffer step 250 uses the unit cost data in G (dataset 120) to compute the optimum costs and back-links for traveling from cell to cell in R (dataset 110) beginning at the accessible network points in K (data structure 330). This updates K as a result. To minimize the amount of computation, this procedure can be halted when all cells reach an upper threshold of total cost and/or distance, such as a cost limit (dataset 150) and/or a distance limit (dataset 155). This may cause some (or many cells) not to have a cost computed.

Next, the Accumulate step 260 updates the minimum-cost grid H (dataset 510) with the output of the preceding steps in K (dataset 330) by taking the lesser of each pair of corresponding values and retaining the back-link corresponding to whichever is the minimum. The steps described above (steps 220-260) repeat until all of the networks have been selected, as shown in steps 270 and 280 in FIG. 1.

Now referring to stage 400, after computing the optimal cost grid H (dataset 510), queries concerning costs to any destination point D (dataset 190) are carried out by finding the value of H within the cell containing the point D during step 410. The entire cost grid can be mapped if desired. This is an approximation, because all points within any given raster cell are assigned the same cost and route. The accuracy of the approximation increases with decreasing cell size. High accuracy can be achieved by reducing all cell sizes accordingly. The algorithm's use of the abstract representations of the networks greatly reduces the influence of cell size on accuracy, however, especially for destination points lying relatively close to the final network.

Queries concerning optimal routes (those achieving the lowest costs) are carried out by tracing the back-link structure, which may be a part of H (dataset 510), during step 410. Its pointers alternately trace a route from cell to cell in the raster, then from edge to edge in the last network $N_n$, then back through the raster, . . . , then from edge to edge in the first network $N_1$, until finally back-tracking through the raster to reach at least one of the origin points in O (dataset 130). Thus, the pointers in H consist of the heads of linked lists, which connect the cells of the raster, R (dataset 110); and all the nodes (including those that may have been added by the Snap step 220) of all the networks $N_1, N_2, \ldots, N_n$ (dataset 140).

The output H (dataset 510) can be saved to disk, allowing indefinite repetition of the querying steps 410, 420, and 430, without having to repeat the precomputation. Changes to any of the inputs (datasets 110-140), including the origins, will require redoing the precomputation. To facilitate the precomputation, a cost limit (dataset 190) can be specified. The Buffer step 250 can often be completed faster if it only needs to compute costs that do not exceed the limit. Thus, if an upper bound is available for the optimal cost, this can be supplied to the Buffer step 250 as the cost limit parameter. Use of the cost limit, however, is optional. In addition, dataset 520 may be generated to reconstruct the optimal-cost routes to any destinations within the region.

Figure 3:
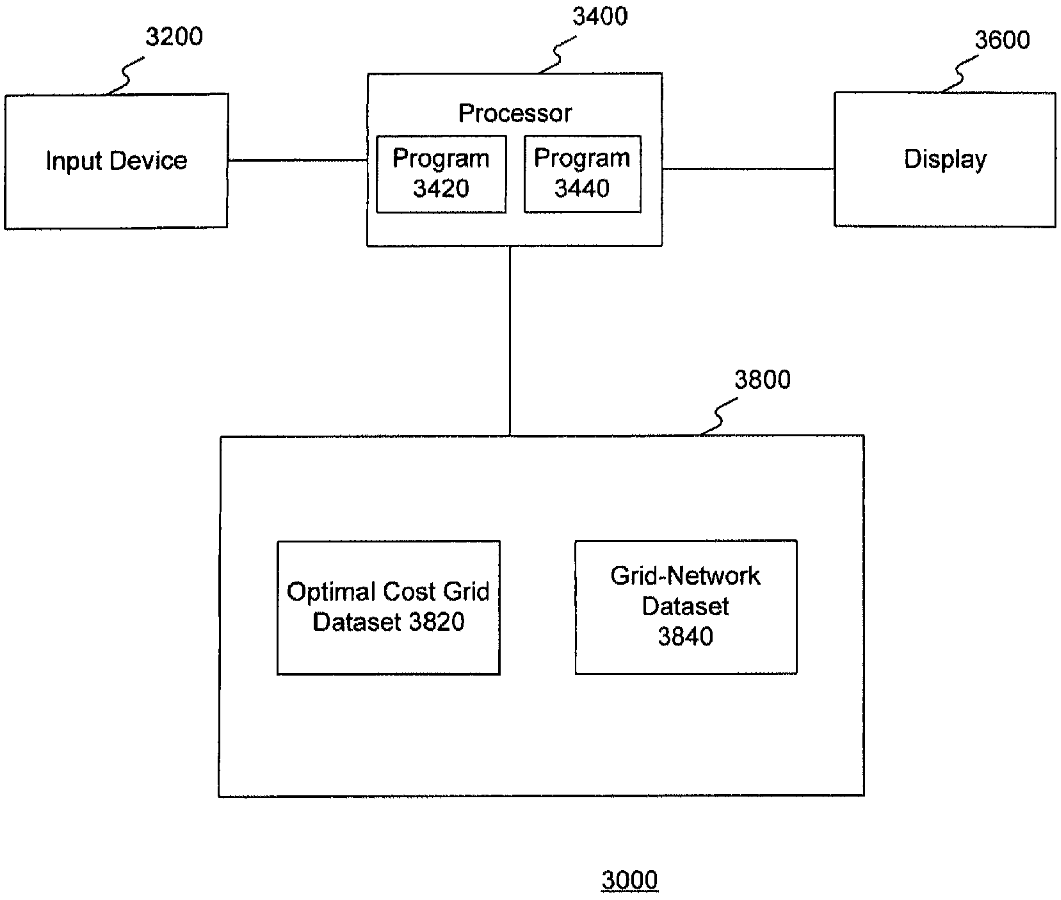
FIG. 3 is a block diagram of an exemplary system for optimizing travel costs for a region having at least one embedded network.

FIG. 3 shows a block diagram of an exemplary system 3000, consistent with the present invention, for optimizing travel costs for a region having at least one embedded network. Processor 3400 receives input from input device 3200, processes data in connection with server 3800, and displays information on display 3600. Server 3800 provides many datasets and/or data structures including an optimal cost grid dataset 3820 and a grid-network dataset 3840. One of ordinary skill in the art will recognize that the scope and spirit of the present invention includes any implementation (and location) of processor 3400 and server 3800 that achieves the purposes of the invention. For example, processor 3400 and server 3800 may be implemented as one server or processor.

In one embodiment, the grid, network, and origins are specified in advance, allowing for an initial phase of computing occurring in processor 3400 before any destination locations are processed. One example of the initial phase of computing could be stage 200 as shown in FIG. 1. After the precomputation has been completed, whenever a destination point is given, processor 3400 provides for rapid constant-time calculation of the total cost to reach any destination from an arbitrary point of origin. In addition, it allows for computation of the optimal path from an origin to the destination in time proportional to the length of that path.

As shown in FIG. 3, server 3800 provides an optimal cost grid dataset 3820 and a grid-network dataset 3840. Dataset 3820 contains the optimum cost to travel from any point of origin to the center of each cell of the grid. It is used to display maps of optimum cost and to provide rapid constant-time responses to subsequent spatial queries of optimum cost. A query need merely compute the cell in which a destination point falls, then return the value of the least-cost grid for that cell. In addition, dataset 3840 contains back-links pointing from each cell or network node to another cell or network node. By traversing the chain of back-links from a destination, a path that realizes the optimum cost from an origin to that destination can be reconstructed in detail. The computation time is directly proportional to the number of back-links needed to proceed from destination back to an origin. One of ordinary skill in the art will recognize that, consistent with the present invention, server 3800 may also provide other datasets and data structures representing, for example, a raster, networks, a unit cost grid, a set of origins, a set of destinations, and a cost limit.

Processor 3400 is designed to calculate all possible movements between cells in the raster representation of the region, between those cells and accessible network points, and among network nodes. This is achieved by adding information about how a network is realized within a region. The information consists of adding optimal times to reach every node of the network. Consistent with the present invention, network nodes may be represented by cells after a network is realized within a region.

In one embodiment, processor 3400 includes many programs including programs 3420 and 3440. For example, processor 3400 is capable of executing program 3420 to develop a data structure for a region. The data structure has a grid (not shown) representing the region and comprising a plurality of cells covering the region, an optional-cost grid dataset (3820), a hybrid grid-network dataset (3840), and back-links (not shown) among elements of the hybrid grid-network dataset reflecting optimal travel routes originating at an initial location. Processor 3400 is also capable of executing program 3440 to query the datasets to generate a route with an optimal travel cost from the initial location to a query point or to report the optimal travel cost. It is understood that program 3420 may also be used to develop a data structure containing optimal costs for travel from a group of initial locations in the region, and an initial location in the region is not limited to points in the network.

Consistent with the present invention, program 3420 may include many modules for performing various functions, such as those performed at stage 200 of FIG. 1. For example, one module may be used for providing a cost grid, such as dataset 120 in FIG. 1, which contains cost of travel per unit distance within each cell. The costs of travel per unit distance may be computed as a function of location or other attributes of points in the region by using a formula provided in the module. Another module may be used for providing a set of initial locations, such as dataset 130 in FIG. 1, within the region. Yet another module may be used for initializing various datasets including: labeling each initial location in the set with a zero cost, initializing all costs in the optimal-cost grid dataset (3820) to infinity, and setting all back-links in the hybrid grid-network dataset (3840) to null.

In particular, program 3420 may include a module for computing costs and back-links to travel along the cost grid to a nearest accessible node of the network from each of the set of initial locations. Additionally, the module may be configured for computing costs and back-links to travel along the network to all network nodes to generate a cost-labeled network, rasterizing edges of the cost-labeled network to realize the network, computing optimum costs and back-links for traveling from cell to cell in the region beginning at the accessible network nodes in the realized network, updating the optimal-cost grid dataset using the back-links in the realized network, and updating the hybrid grid-network dataset with the back-links corresponding to the optimal costs. If a region has multiple networks, the module may be further configured for updating optimum costs and back-links for traveling for multiple networks by repeating the computing, rasterizing and updating steps for each of the multiple networks. Moreover, the module is capable of halting the computation of optimum costs and back-links upon reaching a predetermined cost limit and/or a predetermined distance limit.

Figure 4A:
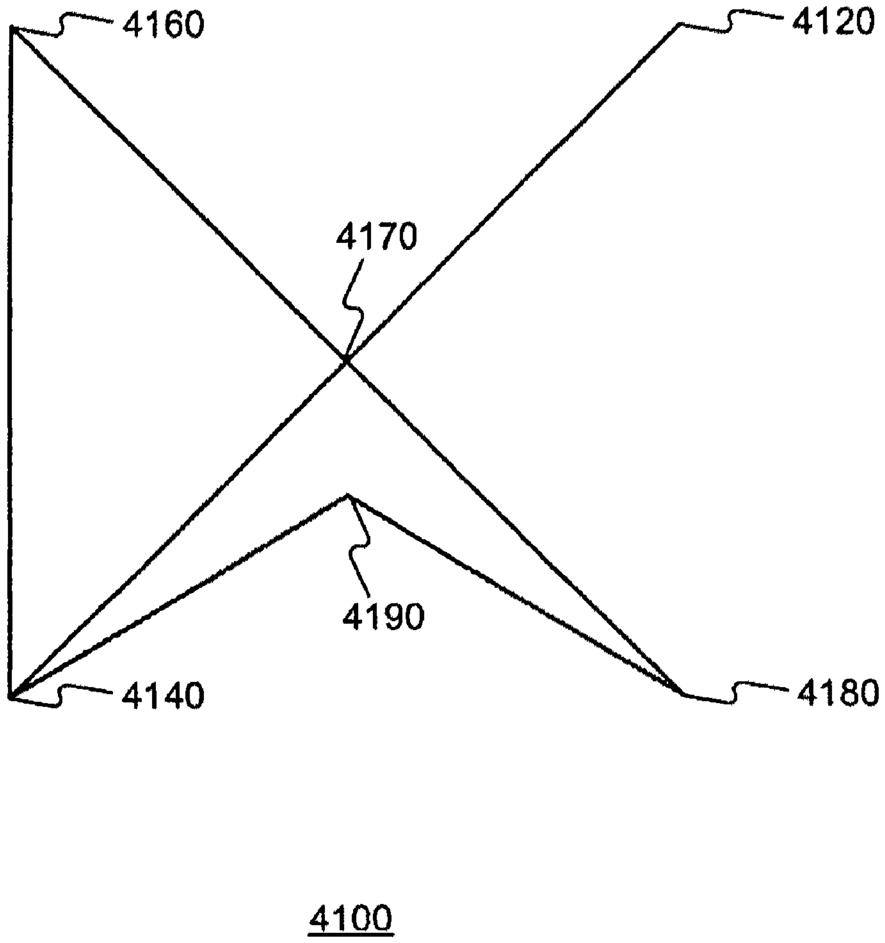
FIGS. 4A-4D illustrate an exemplary region having an embedded network for optimizing travel costs on and off network.

FIGS. 4A through 4D illustrate yet another embodiment consistent with the present invention. FIG. 4A shows a two-dimensional Euclidean bidirectional network (N) 4100 lying within the unit square bounded by points with coordinates (0,0), (1,0), (1,1), and (0,1) as shown. It has nodes at the four corner points with node 4140 at (0,0), node 4180 at (1,0), node 4120 at (1,1), and node 4160 at (0,1). The vertex 4190 at (0.5,0.3) is part of the realization of the edge joining (0,0) to (1,0), but is not itself a node. The crossing 4170 at (0.5,0.5) is not a node. Network 4100 is accessible at every point along every edge.

In one embodiment, travel along network 4100 starts at node 4120 (O={(1,1)}) and a unit cost of 1.0 per unit of travel is contemplated. Here, the Snap step (step 220 in FIG. 1) is not needed, because all the points in O (the set of origins) already lie on N (network 4100). The result of the Dijkstra step (step 230 in FIG. 1) is the cost-labeled network (M) 4200 shown in FIG. 4B.

Figure 4B:
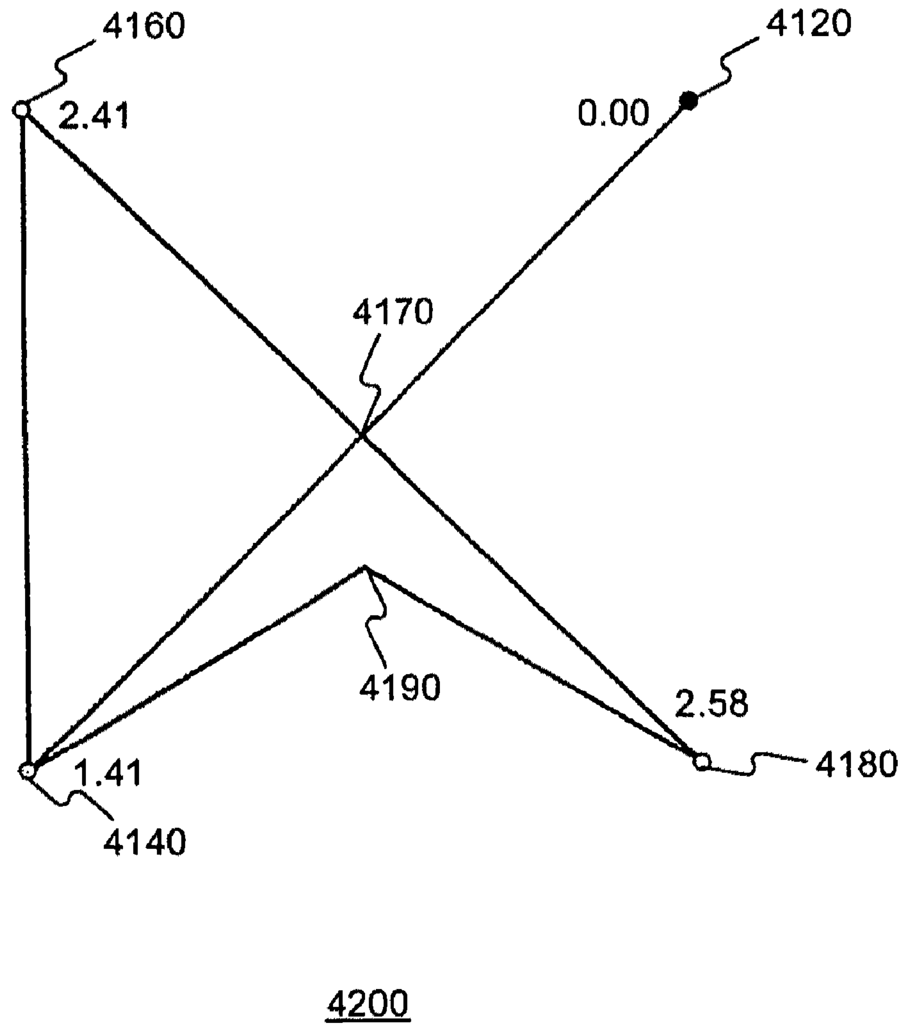

As shown in FIG. 4B, the cost of travel from node 4120 to node 4140 is 1.41, based on a unit cost of 1.0 per unit of travel. The cost of travel from node 4120 to node 4160 is 2.41, the cost of travel from node 4120 to node 4140 (1.41) plus the cost of travel from node 4140 to node 4160 (1 for one unit). The cost of travel from node 4120 to node 4180 is more complicated, as two separate routes may be used. In the first route, travel starts from node 4120 to node 4140, then to node 4160, and eventually arrives at node 4180. The cost of travel for the first route is 3.82 (2.41+1.41). In the second route, travel starts from node 4120 to node 4140, then through vertex 4190 (0.5, 0.3), and eventually arrives at node 4180. The cost of travel for the second route is 2.58. Because the cost of travel for the second route is lower than the cost for the first route, node 4180 is cost labeled for 2.58. Note that point 4170 is not a network node. The effect of the lack of a node at the central crossing is that a turn to the right or left is not possible.

Figure 4C:
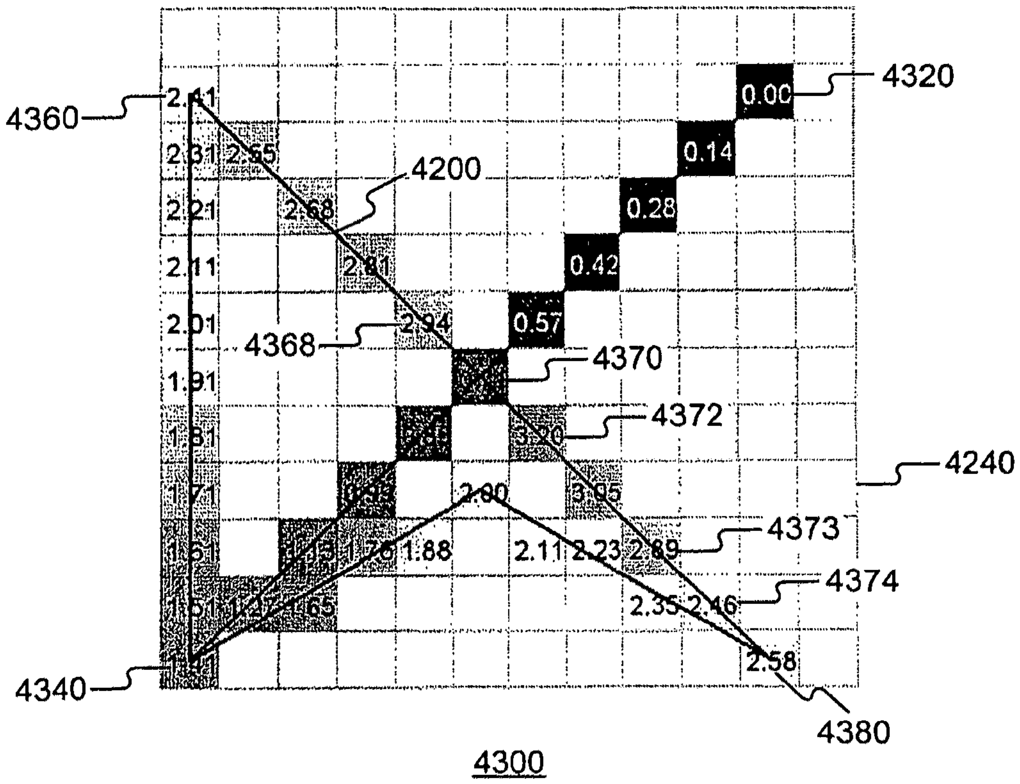

FIG. 4C shows an exemplary region 4300 with network 4200 being embedded on the region. As shown in FIG. 4C, region 4300 surrounds network 4200 and is rasterized with an array of square cells of size 0.1. One of ordinary skill in the art will recognize that, consistent with the present invention, a raster with a much finer mesh, such as cells of size 0.001, may be used instead to keep the size of discretization errors low.

The Rasterize step (step 240 in FIG. 1) renders the cost labeled network as the grid (K) 4240 as shown in FIG. 4C. For example, nodes 4120, 4140, 4160, and 4180 are now rasterized into cells 4320, 4340, 4360, and 4380, respectively. Each cell keeps the same travel cost. As discussed earlier, the Rasterize step also interpolates costs and assigns them to cells that do not represent network nodes.

The lack of a node at the central crossing 4370 (a turn to the right or left is not possible) causes network travel costs immediately to the right (cell 4368) or left (cell 4372) of that crossing to be relatively high (2.94 and 3.20 compared to 0.85). This crossing restriction cannot be represented with a grid alone. The ability to handle network crossings within a raster-based framework is one of the advantages of methods and systems consistent with the present invention.

As shown in FIG. 4C, the value of 2.46 is found in the cell 4374 centered at (0.9, 0.1). It reflects the lesser of the costs found for two realized network edges intersecting that cell. This does not cause errors further along in the network, however, as the value of 2.89 for the cell 4373 centered at (0.8, 0.2) correctly reflects optimum costs for travel along the network without any artificial "short circuiting" through the grid. This illustrates how using the vector representation of the network increases the accuracy of the results compared to using a raster representation of the network, even in cases where problems associated with crossings are not an issue.

Figure 4D:
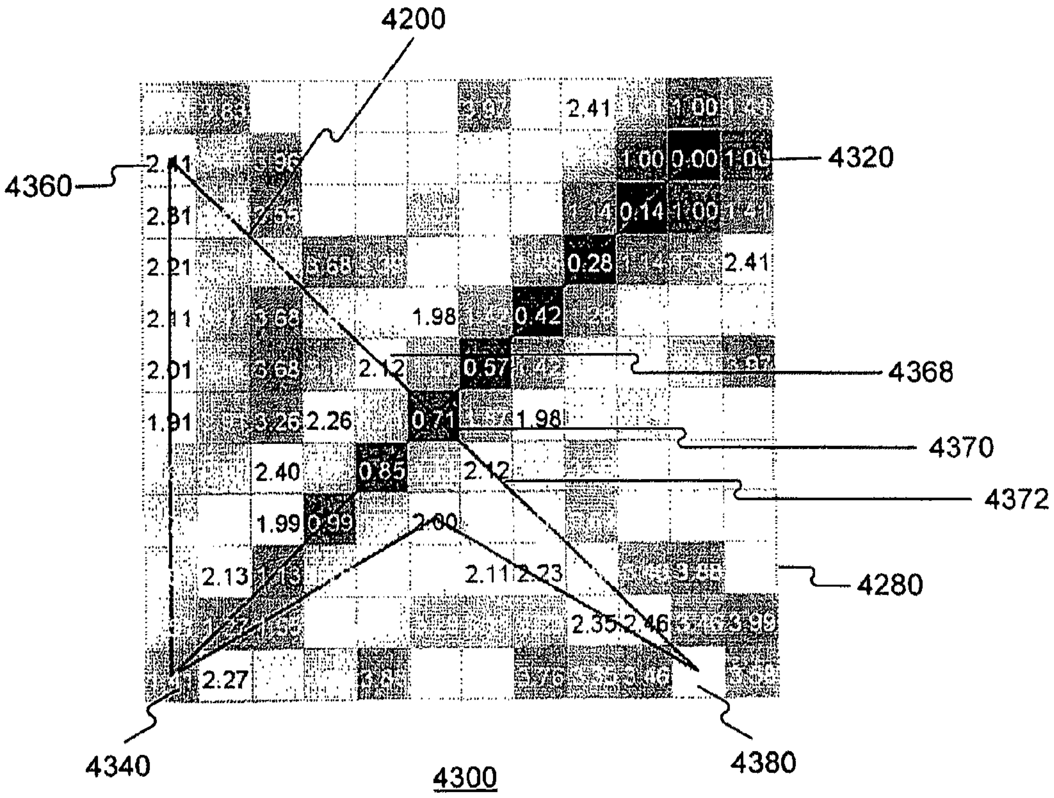

FIG. 4D shows region 4300 after optimizing travel costs on and off network. In particular, the Buffer step (step 250), with a cost limit set to 4.00, computes optimal costs for subsequent off-network travel. The blank cells of the raster 4300 have no associated cost because the total cost to reach them, along either the network or the raster, would exceed the threshold of 4. The possibility of off-network travel has reduced the optimal costs to reach two of the cells, 4368 and 4372, near the central crossing 4370. Their costs have decreased from 2.94 and 3.20 to 2.12 each. This is accomplished by leaving the network at the central crossing point 4370 and proceeding along the grid 4280 ("walking"). This ability to incorporate off-network costs within a vector-based framework is one of the advantages of methods and systems consistent with the present invention.

FIGS. 5-20 illustrate various embodiments consistent with the present invention that provide a way of defining the market area using equal travel times or travel costs on and off one or more networks in the market area. The following examples use travel times, but they could also use travel costs. A database contains the travel time traces from the proposed site in the geographical area under analysis.

An analyst selects travel times based on empirical research relating travel time to use of the proposed facility. Where existing empirical research is inadequate or unavailable, travel times can be reasonable estimates of an experienced analyst. Travel time is objective, unlike other methods used such as basing market area on certain characteristics of the population. This latter method has no rules about the market boundaries.

Using travel time to define a market area is most reliable when the business or service draws local patronage. For example, assisted living facilities are typically selected that are either close to a disabled person's home if the spouse remains active or close to the home of a relative.

Figure 5:
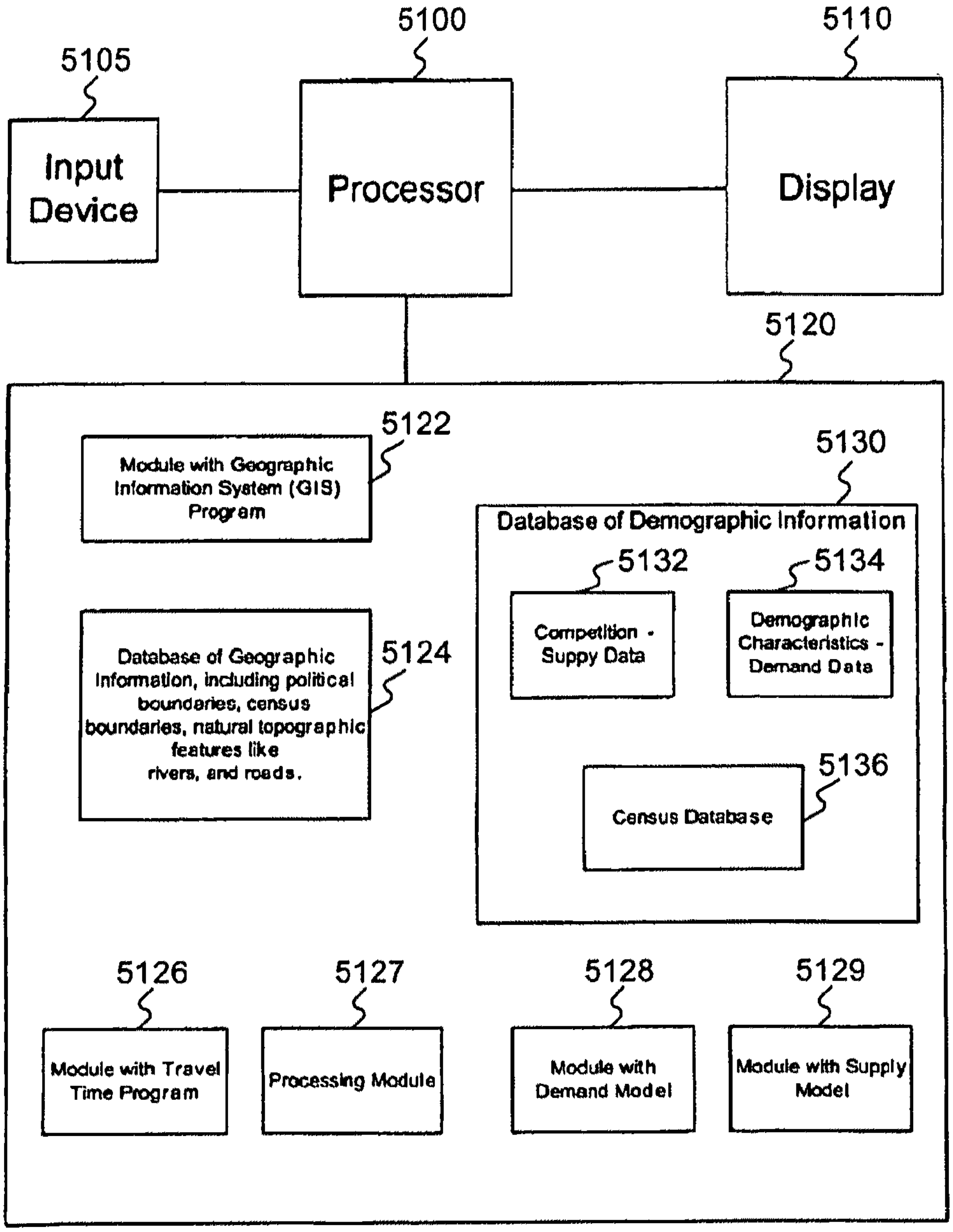
FIG. 5 is an overall diagram of a system for implementing the present invention.

FIG. 5 shows a block diagram of a processor configured in a manner consistent with the present invention. A processor 5100 receives input from an input device 105 and displays information on a display 110. Memory 5120 includes a module with geographic information system program (GIS) 5122, a module with travel time program 5126, a processing module 5127, a module with demand model program 5128, and a module with supply model program 5129. The module with demand model program 5128 includes, for the area under consideration, empirical relationships or assumptions concerning the relationships between demographic demand and travel time, such as the decay of demand with increased travel time from the site. The module with supply model program 5129 includes, if available for the area under consideration, empirical relationships or assumptions concerning the relationships between supply of competition and travel time.

Data in the geographical information database 5124 include political boundaries, census unit boundaries, and natural topographical boundaries including rivers and roads. The database of demographic information 5130 includes supply data 5132, demand data 5134, and a census database 5136. Supply data 5132 are data related to competition such as other stores in an area. Demand data are demographic information providing information on the population in an area. Census database 5136 includes information relating the census units to demand data 5134 and supply data 5132.

Figure 6:
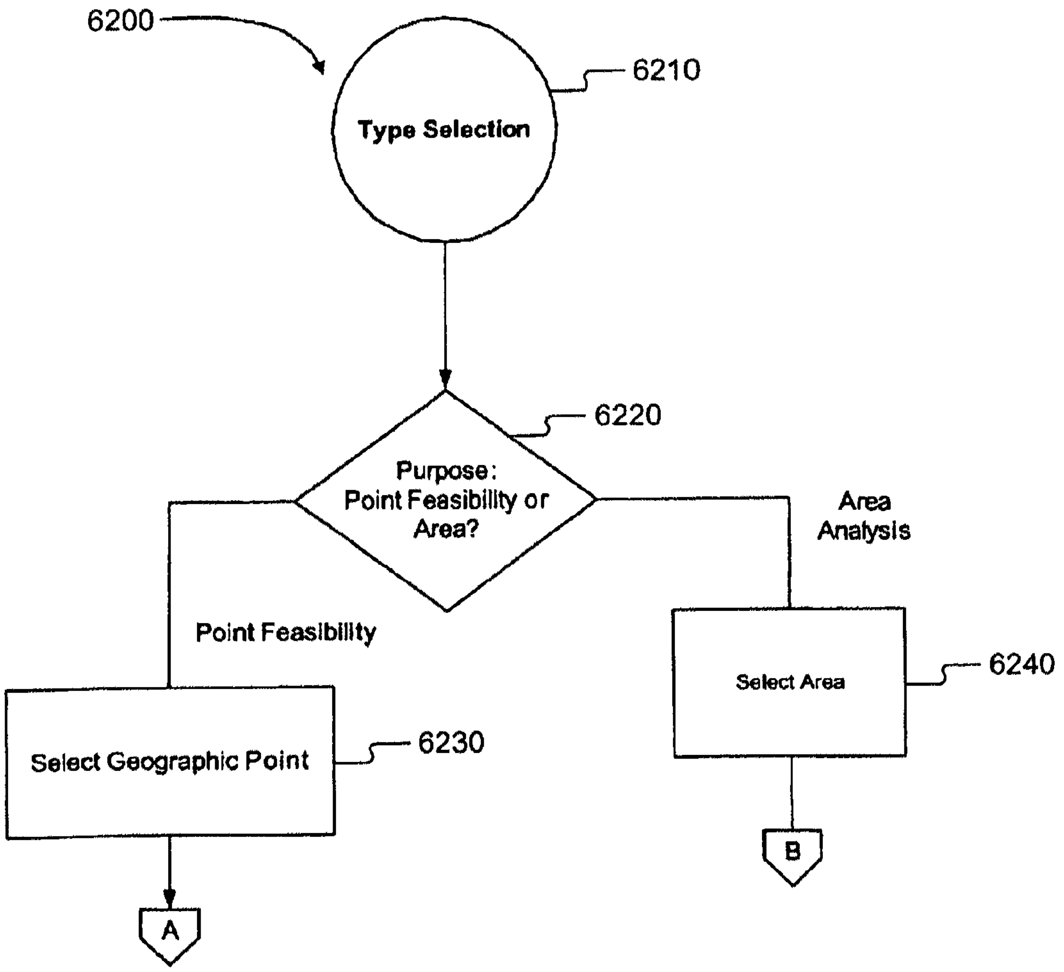
FIG. 6 is a flow chart showing the steps for selecting a type of market analysis.

FIG. 6 is a flowchart showing the initial steps 6200 taken by an analyst in a market analysis. First, a market analyst, using input device 5105, selects a type of market analysis (step 6210). Generally, a market analyst may select one of two types of market analysis: a point feasibility analysis or an area feasibility analysis (step 6220). The point feasibility analysis analyses the market for a site in a specific location.

An area analysis is used to determine the best site locations in a general area. An analyst performs an area analysis when an investor wishes to find what point within a geographical area is best for business. In the prior art, only a few points were processed as it was time consuming to analyze each point. An area analysis using the present invention involves analyzing a large collection of points uniformly covering an area using the point analysis. In one implementation some points on the map, such as those where bodies of water lie or a large factory exists, will not be analyzed. Generally, in the present invention, an area analysis allows the analyst to select a geographical area and to iterate a point analysis for a large collection of points uniformly covering that area, such as, one point within each census unit in the area (e.g., census block, block group or census tract). The geographical area may incorporate the area of interest and a band around the exterior to incorporate the travel times radiating out from the peripheral census units point analyses. In order for the point analyses of the exterior census units to be meaningful, the analyses must incorporate data from outside the area of interest, such as the band.

If point analysis is selected, the analyst must select a specific geographical point (step 6230). For an area analysis, the analyst must select a geographical area and processing continues at B in FIG. 14 (step 6240).

Figure 7:
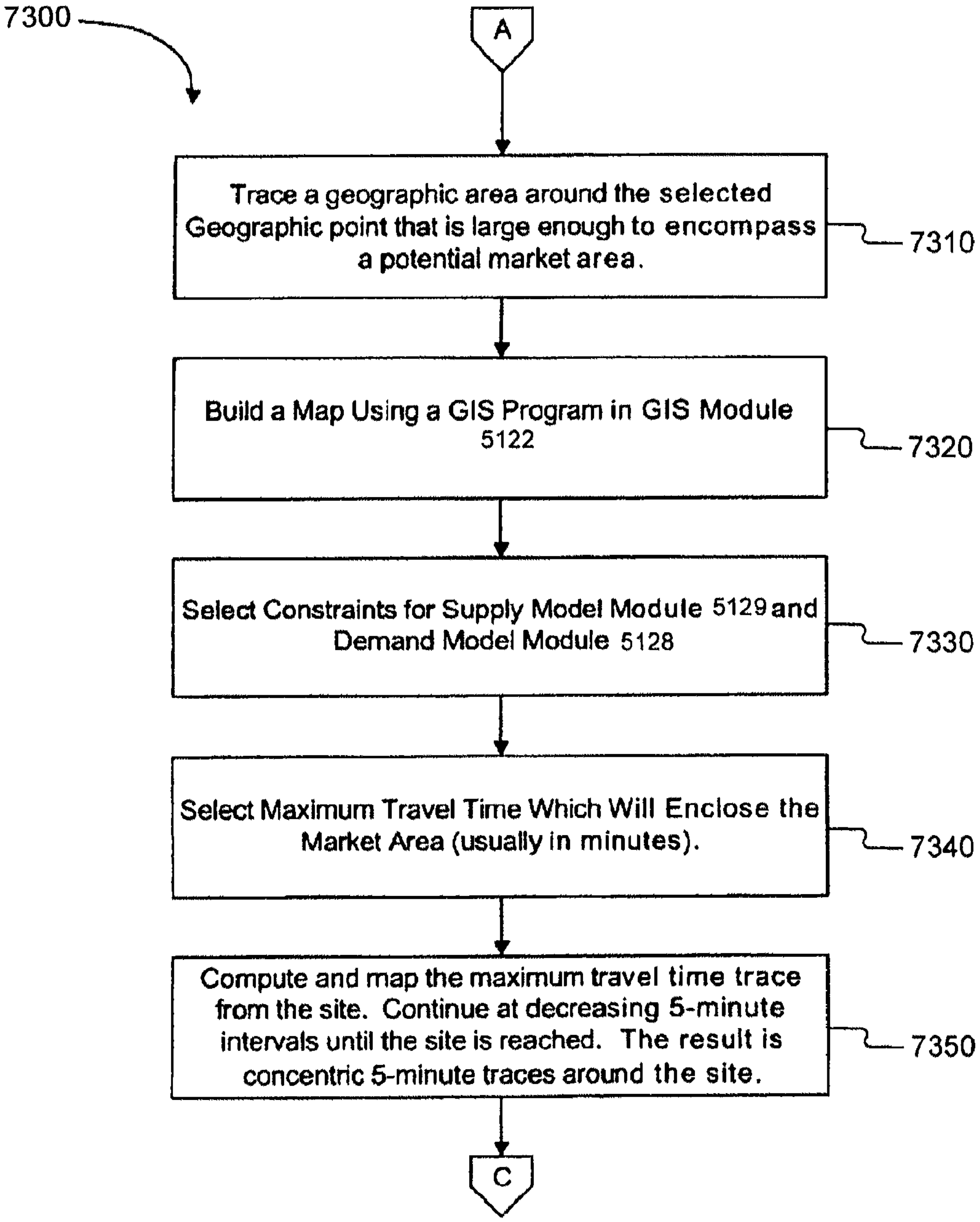
FIG. 7 is a flow chart showing the steps for performing market analysis.

If point analysis is selected, processing continues as shown in steps 7300 in FIG. 7. First, the analyst traces an area around the geographical point that encompasses any potential market area using knowledge known to the analyst, such as types of neighborhood around the point (step 7310). The analyst also has access to many other sources of data, including information obtained from the Bureau of the Census and other sources. GIS programs, such as that in GIS module 5122, create a map of the traced area around the geographical point (step 7320). The analyst may specify attributes of the displayed map; for example, the scale of the map (such as centimeters per mile) or what features the user wishes to show. The user may elect to display streets, landmarks, county boundaries, towns, Census boundaries, and many other types of features. The GIS program 5122 generates the map by reading data from a geographic database 5124 that holds map information.

The analyst selects constraints to define the supply model module 5129 and demand model module 5128 (step 7330). The analyst uses a model that defines the weights to be given to different information. For example, based on available empirical evidence for a certain service, the customer base may exclude anyone under 20 years old and give no weight to data on those under 20. On the other hand, the most likely customers for a certain business may be aged 30 to 40, in which case the demand model will weigh more highly people in that age group and a greater percentage of those in the age group of 30 to 40 will be presumed to be customers. Similarly, a smaller percentage of those in the age group 40 to 50 might be presumed to be customers. Another parameter in the models may include assigning different weights to each travel time from the site.

Figures 8A, 8B:
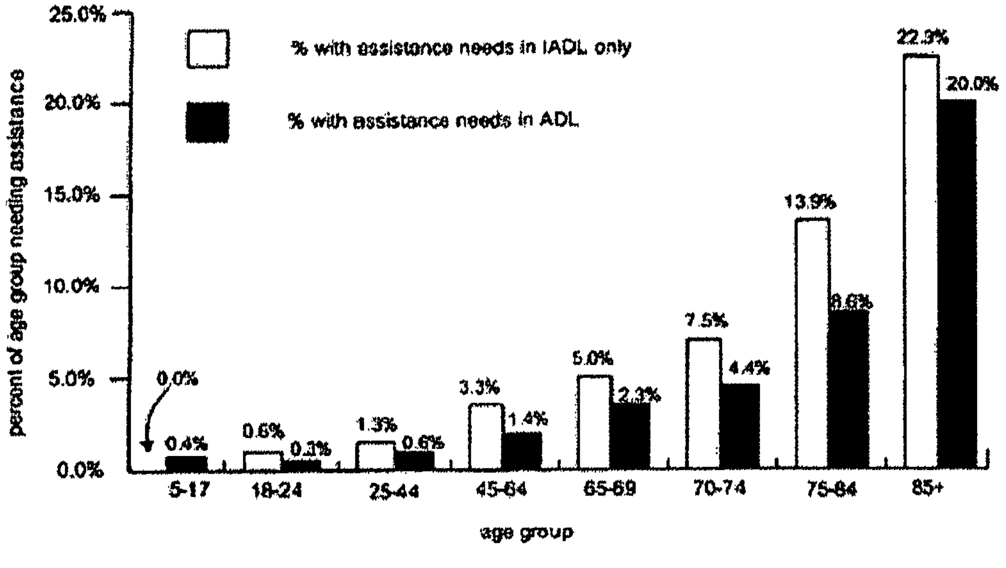
FIGS. 8A-8C are example display screens showing information related to a market demand model.

FIG. 8A shows an example display 8400 of different weights assigned to different travel time traces. The closer to the site a census unit is, the more likely it will be that customers will come from that census unit. The projected demand is determined by adding up the number of people the demand model estimates to be of interest. The supply is determined by information about other suppliers in the area. The net demand in the area is the projected demand minus the supply. If the net demand is positive, the project may be desirable, but if the demand is negative, the project is not desirable.

One example of a demand model is for assisted living homes. One component of the demand model is the percentage of people in given age groups that require care. FIG. 8B shows a chart listing various age groups and the percentage of people in those groups requiring two different levels of care.

Figure 8C:
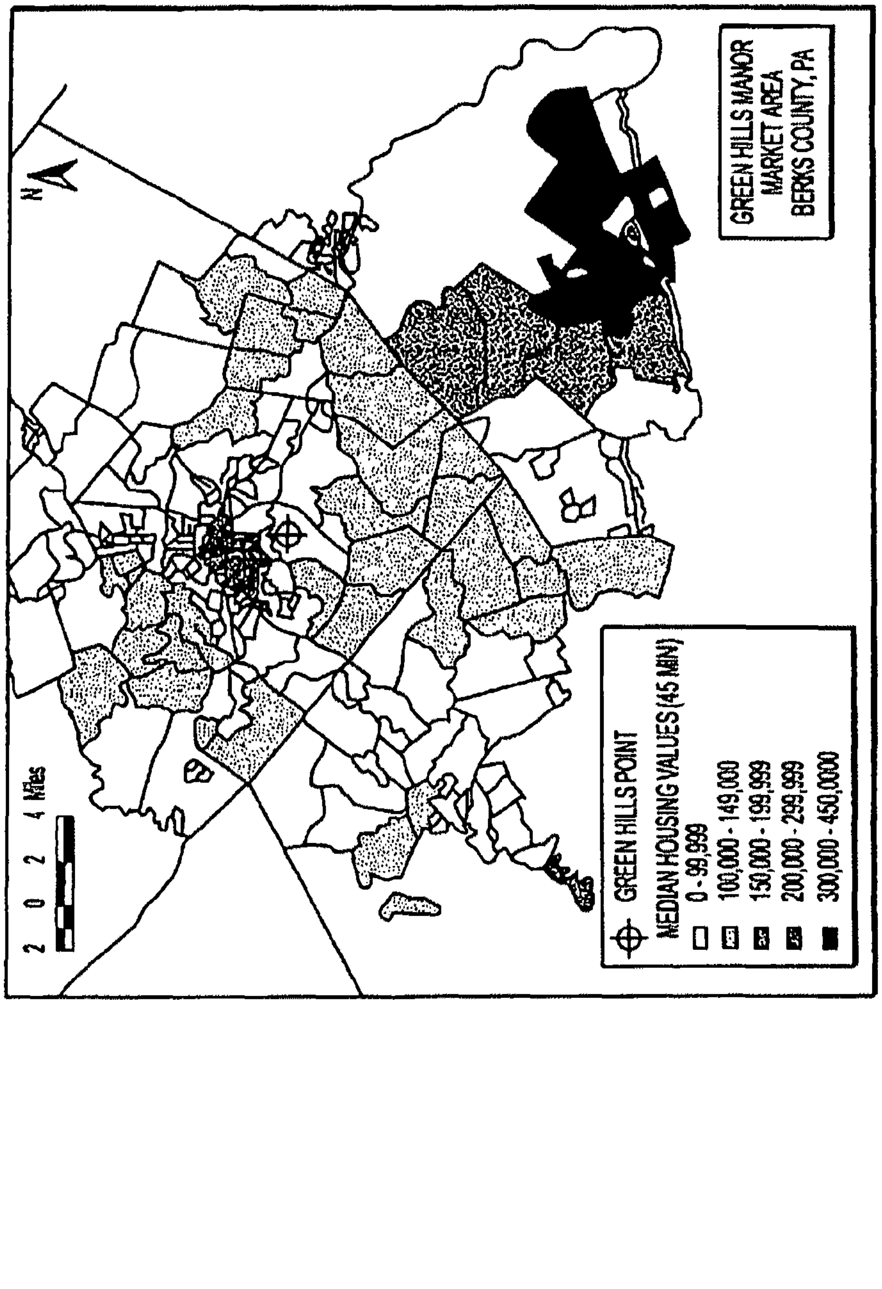

Another criterion for the demand model may be related to housing values. Population groups may be weighted differently based on the median home values in the census block. FIG. 8C shows an example of a choropleth map of census block groups showing median house value. The model may weight more highly the population in higher priced home value census block groups. The process is not dependent upon size of the census unit. Blocks or tracts, for example, can be used in place of block groups. Therefore, this example model has age parameters, disability parameters, and housing value parameters. The calculation of demand in this example will compute the weight given to a population group based on age, disability, and housing values.

Figure 9A:
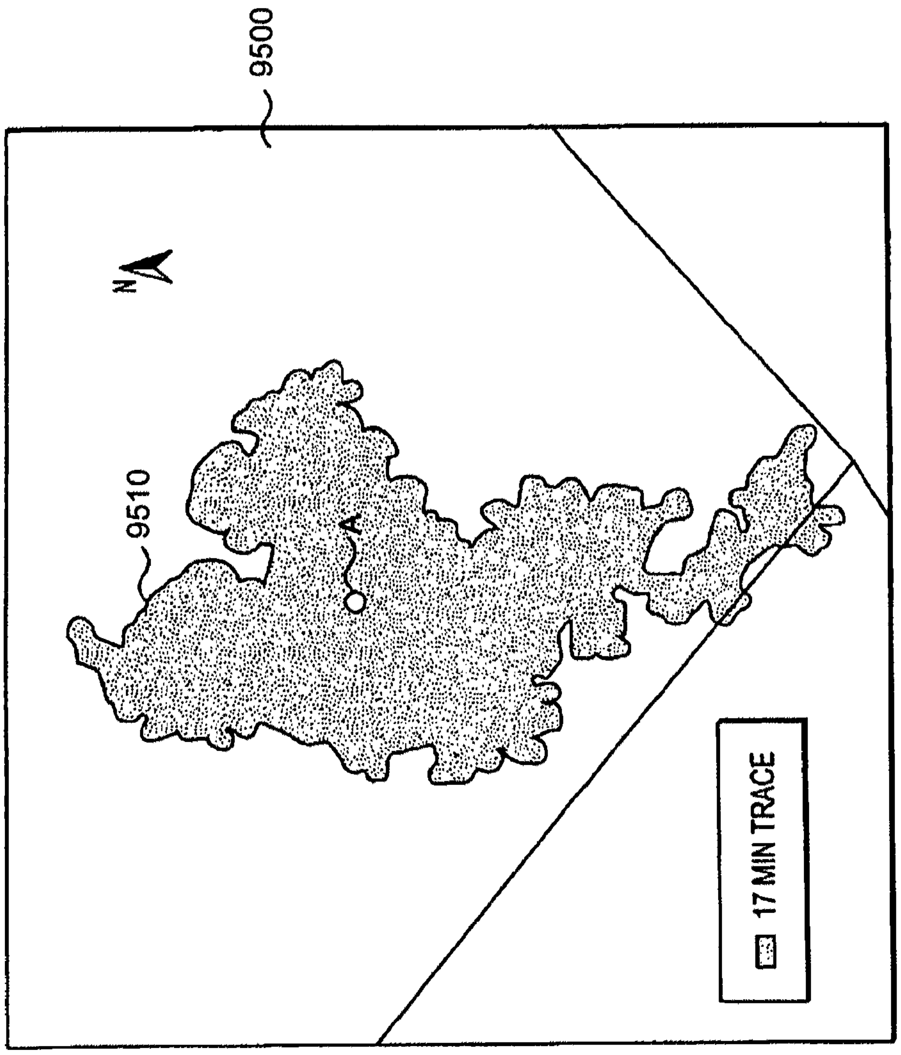
FIGS. 9A-9E are example display screens showing a map and associate travel time traces.
Figure 9B:
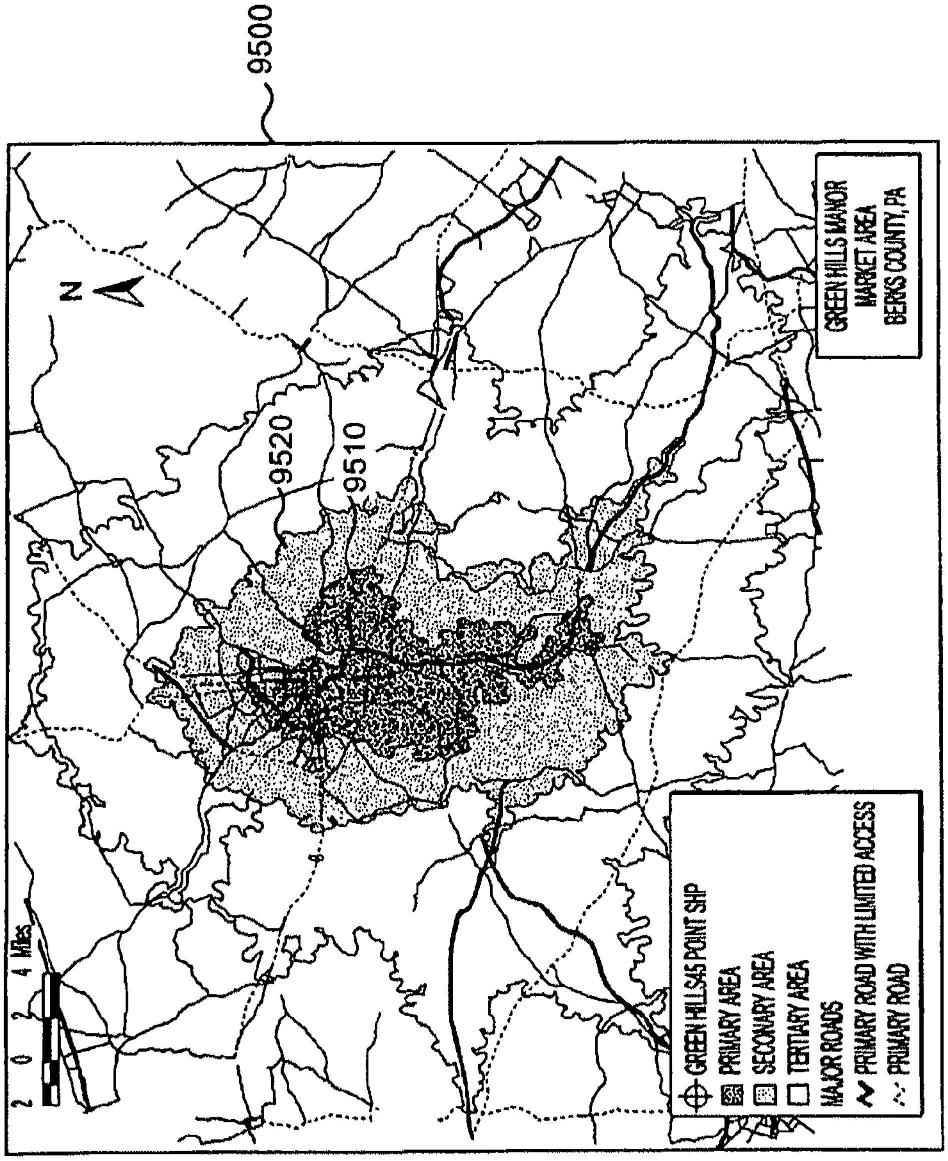
Figure 9E:
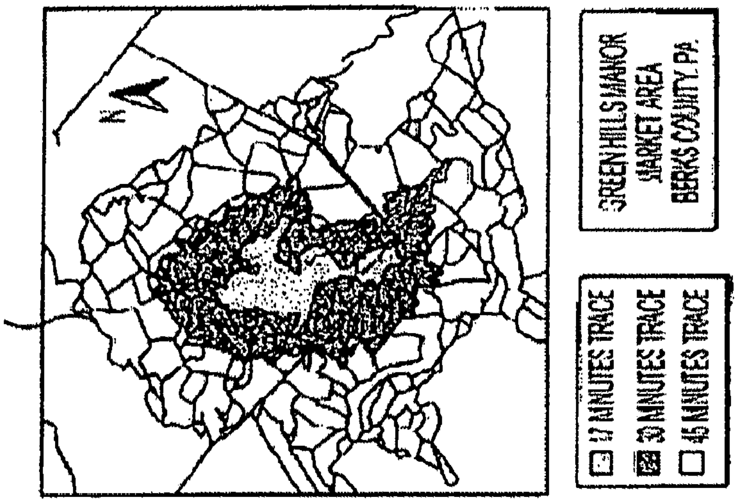
Figure 9D:
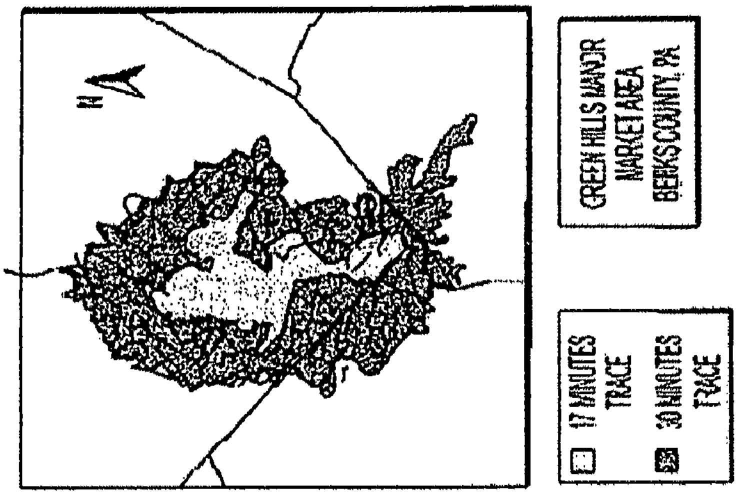
Figure 9C:
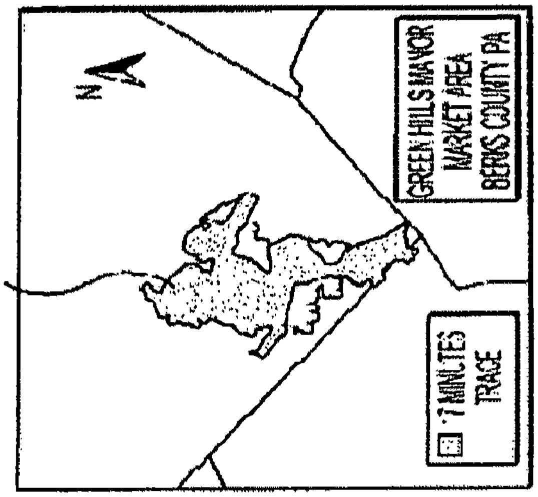

Processing module 5127 prompts the analyst to select a maximum travel time that encompasses the traced area (step 7340). FIG. 9A shows a display of a map 9500 with the selected geographical point A at the center and a time travel trace 9510 around the point. The selected maximum travel time is usually in minutes; for example, a trace representing a 20-minute trip from the point may be a likely market area depending on the business. Travel time program module 5126 maps the maximum travel time trace from the site and maps decreasing intervals until the site is reached (step 7350). The result is concentric traces around the site. Another example of an interval trace would contain a trace for every few minutes of additional travel time. FIG. 9B shows a map 9500 with three travel time traces 9510, 9520, and 9530 at different intervals from the site. FIG. 9C shows the first travel trace closest to the site representing a 17-minute travel time around the site. FIG. 9D shows a second travel trace representing travel times between 17 and 30 minutes around the site. FIG. 9E shows a third travel trace representing travel times between 30 and 45 minutes around the site. One of ordinary skill in the art will recognize that the choices of travel times and the numbers of travel time traces can be varied to accommodate the needs of each analysis for precision and accuracy.

The travel-time program module 5128 uses available travel time databases and generally operates as follows. A database of street networks, such as the Bureau of the Census's TIGER Street Files, has information on travel rates on different roads. The street file is converted into a network of nodes (intersections) and connections between the nodes (streets). Each line segment (street) has associated data about the class of road and other information such as one-way street or no left turns. The class of road determines the average speed or rate (R) to be used and the length of the line segment defines a distance (D). The time to travel over a line segment is found by dividing distance (D) by the rate (R). The program 5128 computes optimal travel times to all points of a fine, regular grid of geographical points within the analysis area. Contours interpolated from these travel times form irregular-shaped travel time traces of the market area.

Figure 10:
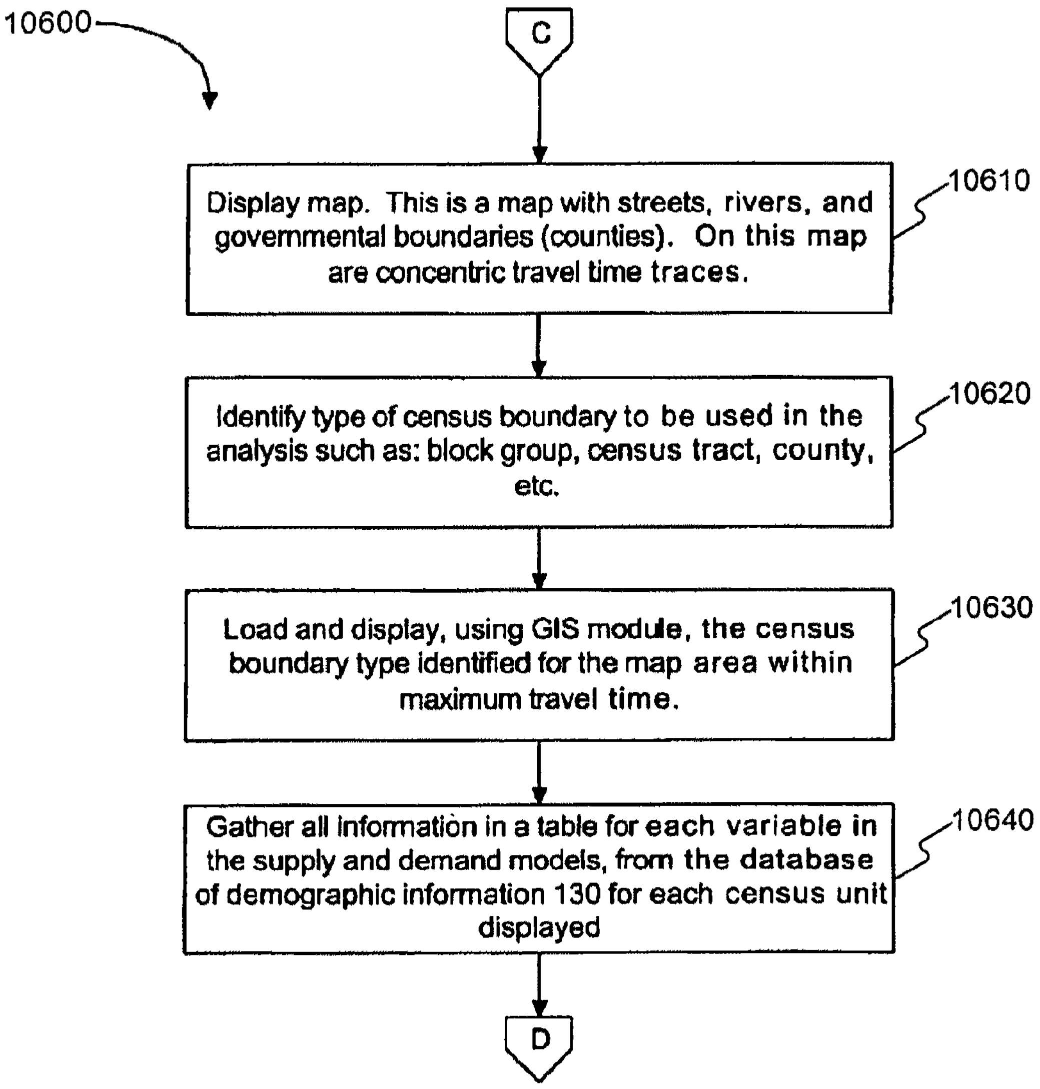
FIG. 10 is a flowchart showing additional steps for performing market analysis by using demographic data.

Processing continues in FIG. 10, which shows flowchart 10600 with additional processing steps. Travel-time program module 126 displays a map having typical map information, such as rivers and roads, using data in the geographic database 5125 for the traced area (step 10610). The map also shows concentric travel time traces. The analyst now selects a type of census unit to be used in the market analysis such as a census block, block group, census tract, or county (step 10620). For simplicity the specific example used throughout this application will assume that the analyst selects census blocks as the unit of analysis.

Figure 11:
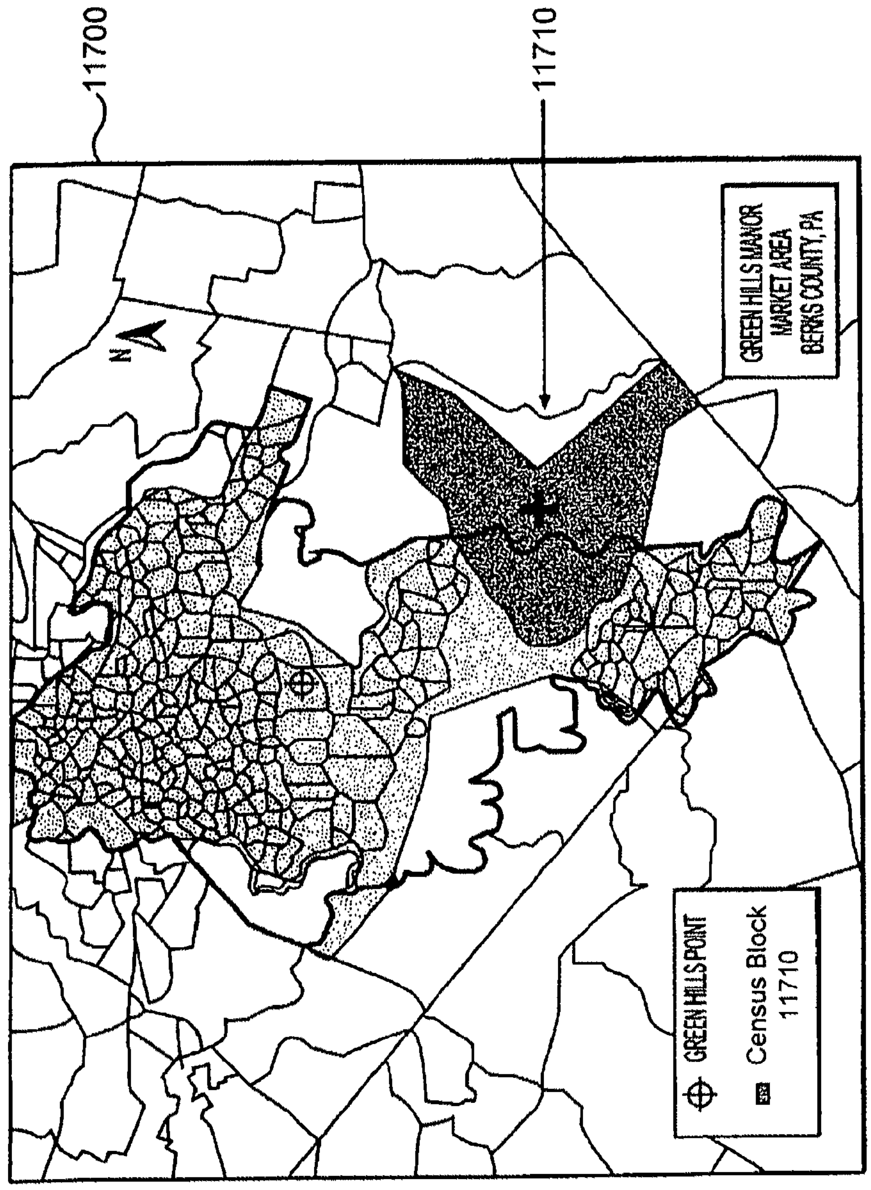
FIG. 11 is a sample screen display of a map with census blocks.

Next, GIS module 5122 loads and displays the census units on the market area within the maximum travel time (step 10630). FIG. 11 shows a map display 11700 with census blocks inserted.

Processing module 5127 creates a market area table with an entry for each census unit displayed (step 10640). Columns are included for each variable in the supply and demand models and data corresponding to the variables are retrieved from the demographic information database 5130.

Figure 12:
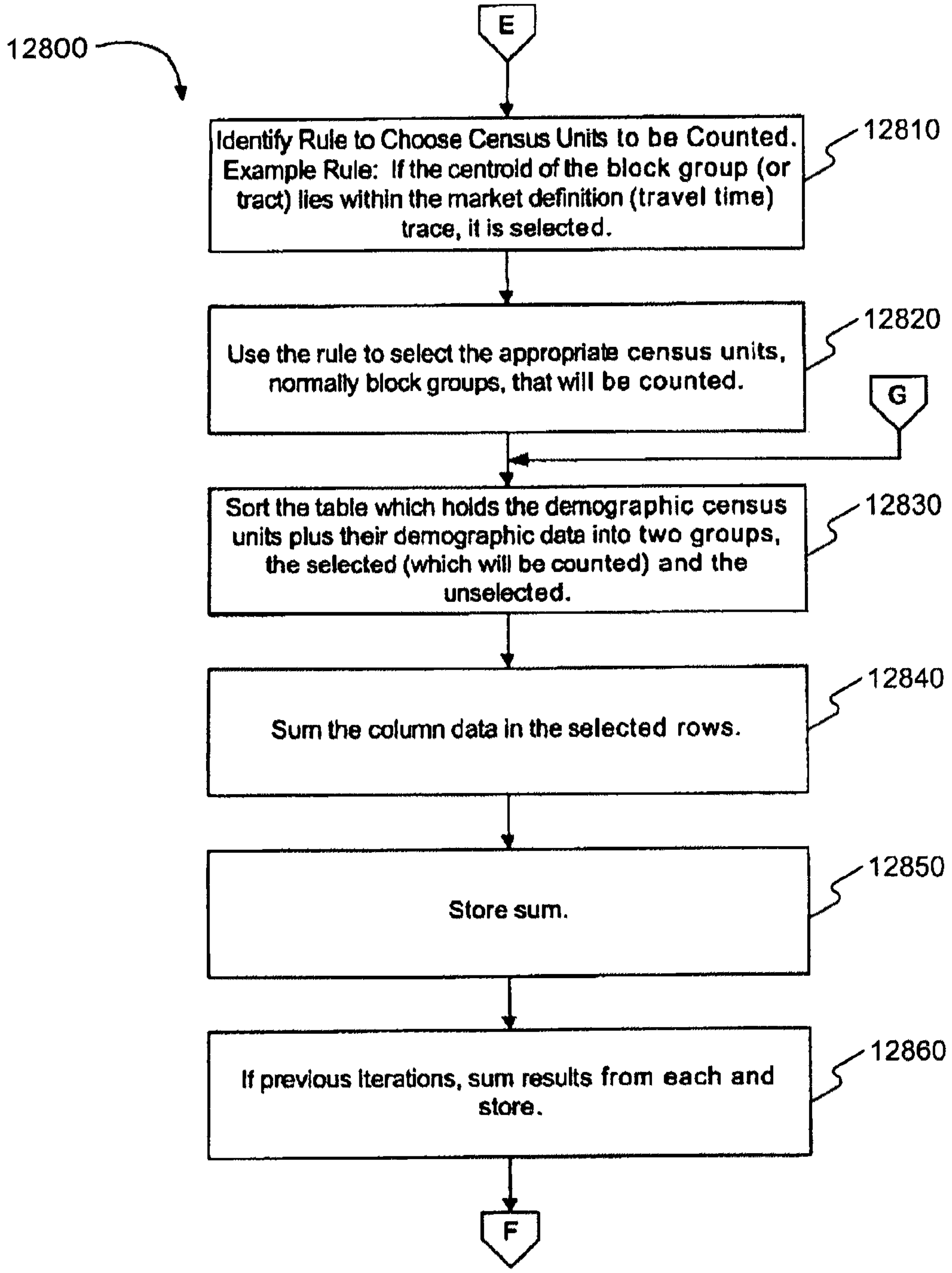
FIG. 12 is a flowchart showing additional steps for performing market analysis including summing demographic data.

FIG. 12 shows a flowchart 12800 with additional steps for analyzing a market consistent with the present invention. The analyst now selects which census blocks to include in the market analysis. For example, some census blocks may only be partially within the maximum travel time; therefore, the analyst must decide how to select which groups to include in the analysis and the weight to be assigned to each group. For example in FIG. 11, census block 11710 is a group only partially within the travel time trace 9510 [FIG. 9]. The analyst may use a rule to choose census blocks (step 12810). One example rule is to determine the centroid of a census block and include the entire census block in the analysis only if the centroid is within the travel time trace. Processing module 5127 [FIG. 5] uses the identified rule to select the appropriate census units to be counted (step 12820). The market area table created by the processing module 5127 is sorted to separate the selected and non-selected census blocks (step 12830). In FIG. 11, because census block 11710 has a center that is not within the travel trace 9510, this census block is not selected using the example rule. Returning to FIG. 12, processing module 5127 sums the column data for each of the rows selected (step 12840) and stores the same (step 12850). Each column corresponds to a variable in the demand or supply model. The total value for the associated variable equals the summed results for the corresponding column. In general these sums are weighted by the weights assigned to the overlaid census units to account for partial overlaps with the travel time trace.

Entry point G shown above step 12830 is where processing begins for additional travel time traces within the market area to be studied. Each travel time trace may be successively processed by processing the census blocks used to represent it (its travel time "band"). Therefore, after summing the columns for a particular travel time band, if results for shorter travel time traces exist, the current summed results are added to the previously obtained summed results (step 12860). The demand or supply model may require that before summing results from different iterations, each iteration's trace be provided a different weighted value, the weights being empirically based when possible. Therefore, the summed value of the supply or demand components for a trace may first be multiplied by a weighting factor reflecting that trace's closeness to the business site.

Figure 13:
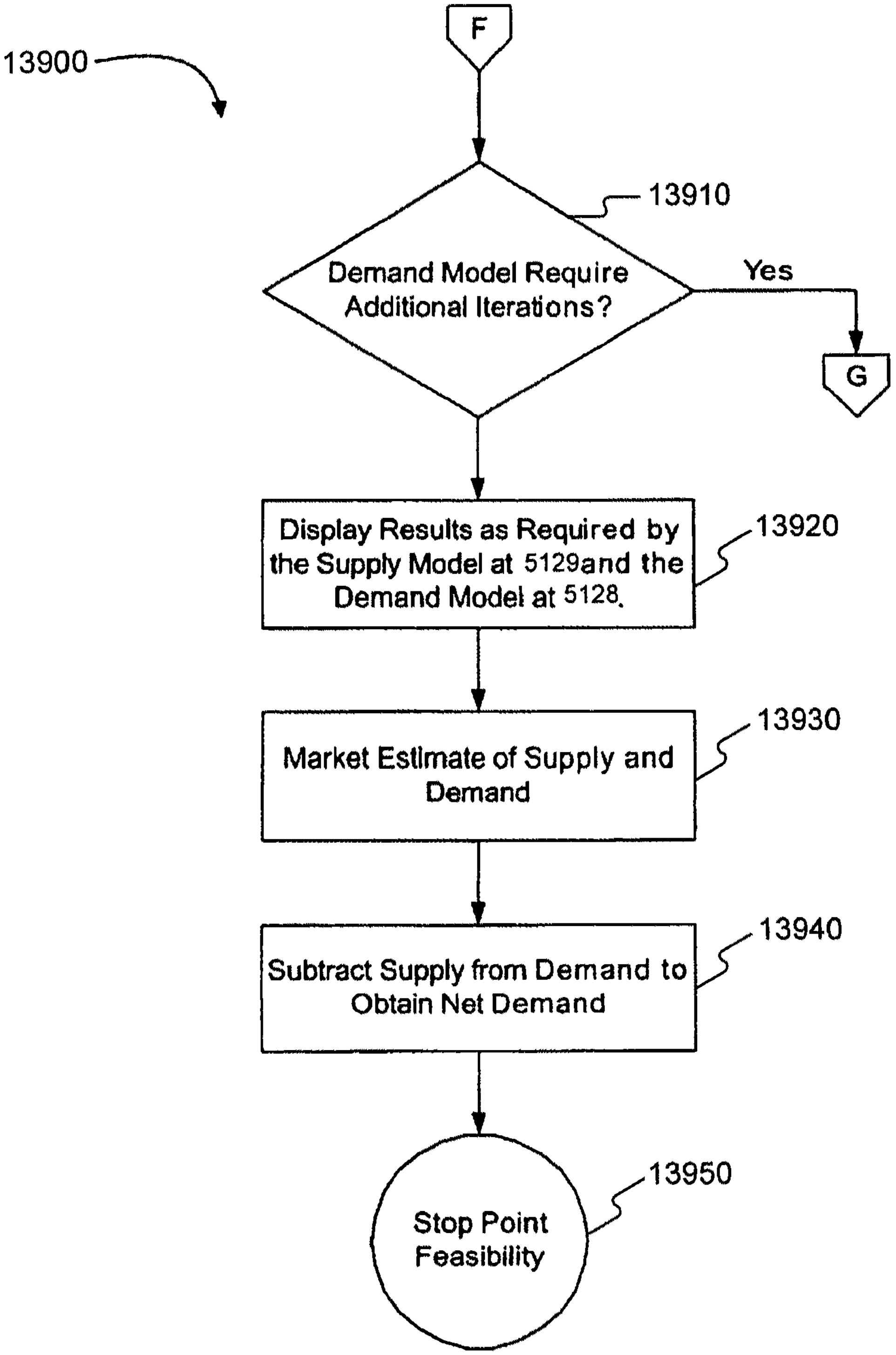
FIG. 13 is a flowchart showing additional steps for performing market analysis including calculating supply and demand.

FIG. 13 shows a flowchart 13900 for further processing a market analysis consistent with the present invention. Processing module 5127 determines whether the demand and supply models require additional iterations for processing additional traces of travel time (step 13910). If so, processing repeats starting at step 12830 in FIG. 12. Otherwise, the final summed results are displayed (step 13920). The market estimate of supply and demand is determined (step 13930). This estimate may be based on calculations of the market and demand supply models or may be input by an analyst reviewing the displayed summed column data. The estimated supply is subtracted from the demand to obtain the net demand (step 13940). The point feasibility analysis is now complete (step 13950).

Figure 14:
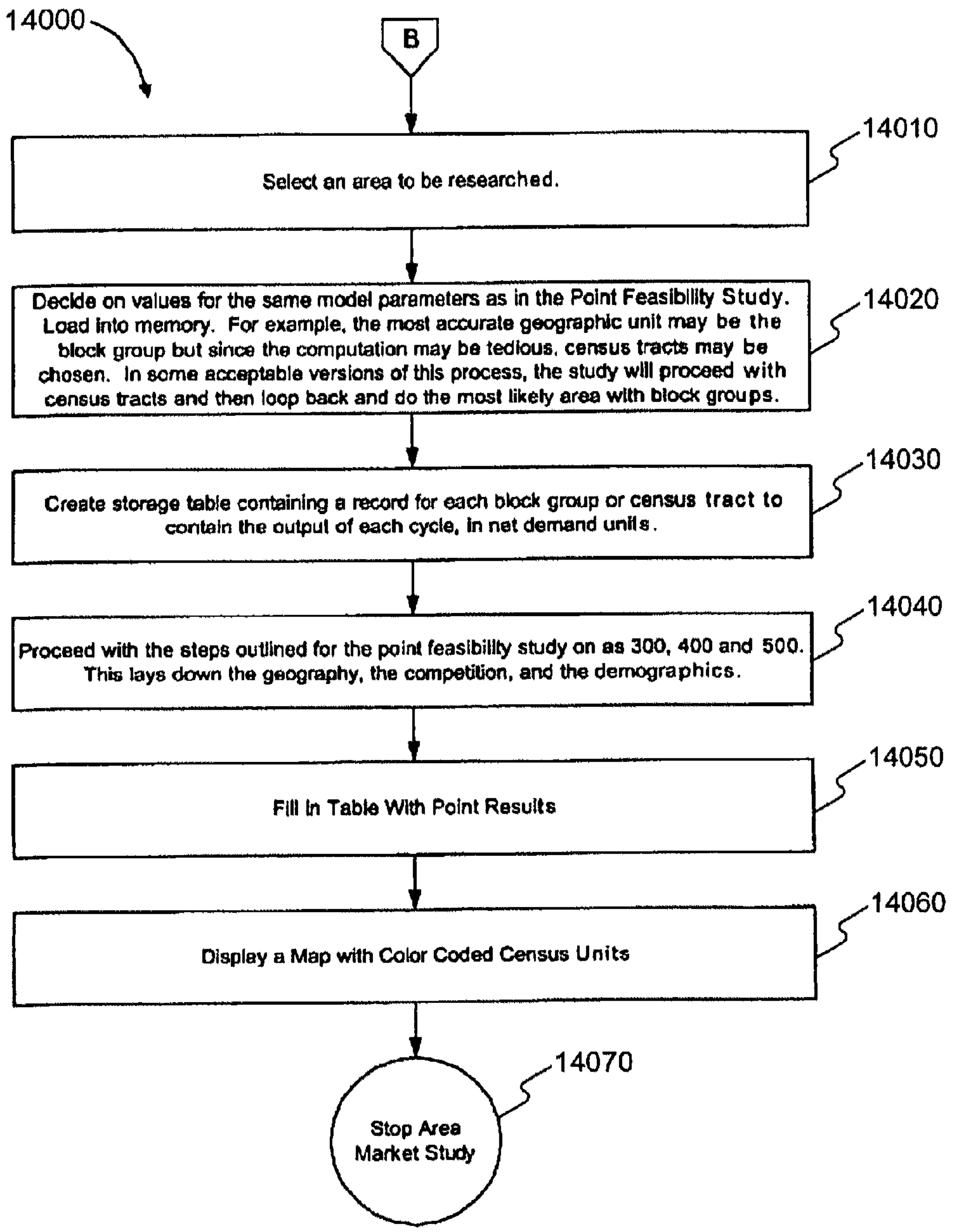
FIG. 14 is a flowchart showing the steps for an area feasibility analysis.

FIG. 14 shows a flowchart 14000 that includes the steps for an area feasibility analysis. As previously discussed, an area feasibility analysis is performed by selecting a large number of points within the analysis area, such as one point within each of the census units. First, the analyst selects a geographical area to be researched (step 14010). The analyst selects a geographic unit such as a census block or some other regional unit to use in the analysis (step 14020). Then, each unit within the selected area is given a row in a newly created storage table containing a record for each unit, such as a census block (step 14030). The point feasibility analysis is repeated for all possible points within the area (step 14040). Processing module 5127 fills in the table with the results of the point studies for each census unit as the point studies are performed (step 14050). Processing module 5127 uses display 5110 to display a choropleth map to show the different net demand levels calculated for each census unit (step 14060). The market area analysis is now complete (step 14070).

Referring to FIGS. 9A and 9B, having obtained traces based on travel time, the next step is to select geographical area units such as census blocks. One skilled in the art will appreciate that using the system shown in FIG. 9, one may define traces based on distance; for example, circular traces. Alternatively, one may define traces in terms of level sets (contours) of any continuous measure of proximity to a geographic point.

One rule to select a census block is discussed earlier. Other rules may be used. Also, as discussed earlier, having obtained the bands of census blocks, weights need to be assigned to each band to weight both the supply and demand from each of the bands. Additionally, as discussed earlier, the weights are empirically based.

In order to weight the bands, research may be conducted within the market area to determine the locations of the existing facilities in the defined market area. As part of the supply and demand research, the address of each resident at the time of entry to the facility in which he or she resides may be identified as a geographic point and the points for the residents may be plotted using the system described in FIG. 5. The process of identifying a point based on an address is sometimes referred to as "geocoding."

As discussed with respect to step 12860 (FIG. 12), the supply and demand values for each travel band are empirically weighted. The weighting of the travel bands may be accomplished using the processing module 5127 and other components of FIG. 5. In one method consistent with the present invention, having summed the columns for each travel time band, as discussed in steps 12840 and 12850 (FIG. 12), the data for residents geocoded within the market area may be separated from the data for those transferred from another facility. Similarly, data for those residents who might have entered a facility from outside the market area may be separated from data for the other residents. This partitioning of customers data helps develop a more accurate demand model, which represents "from home" residents using one set of variables, transfers from within the market area using another set, and transfers from outside the market area using a third set. Thus, in this regard, residents are modeled in a manner appropriate to their location of origin, making the results more accurate.

Figure 15:
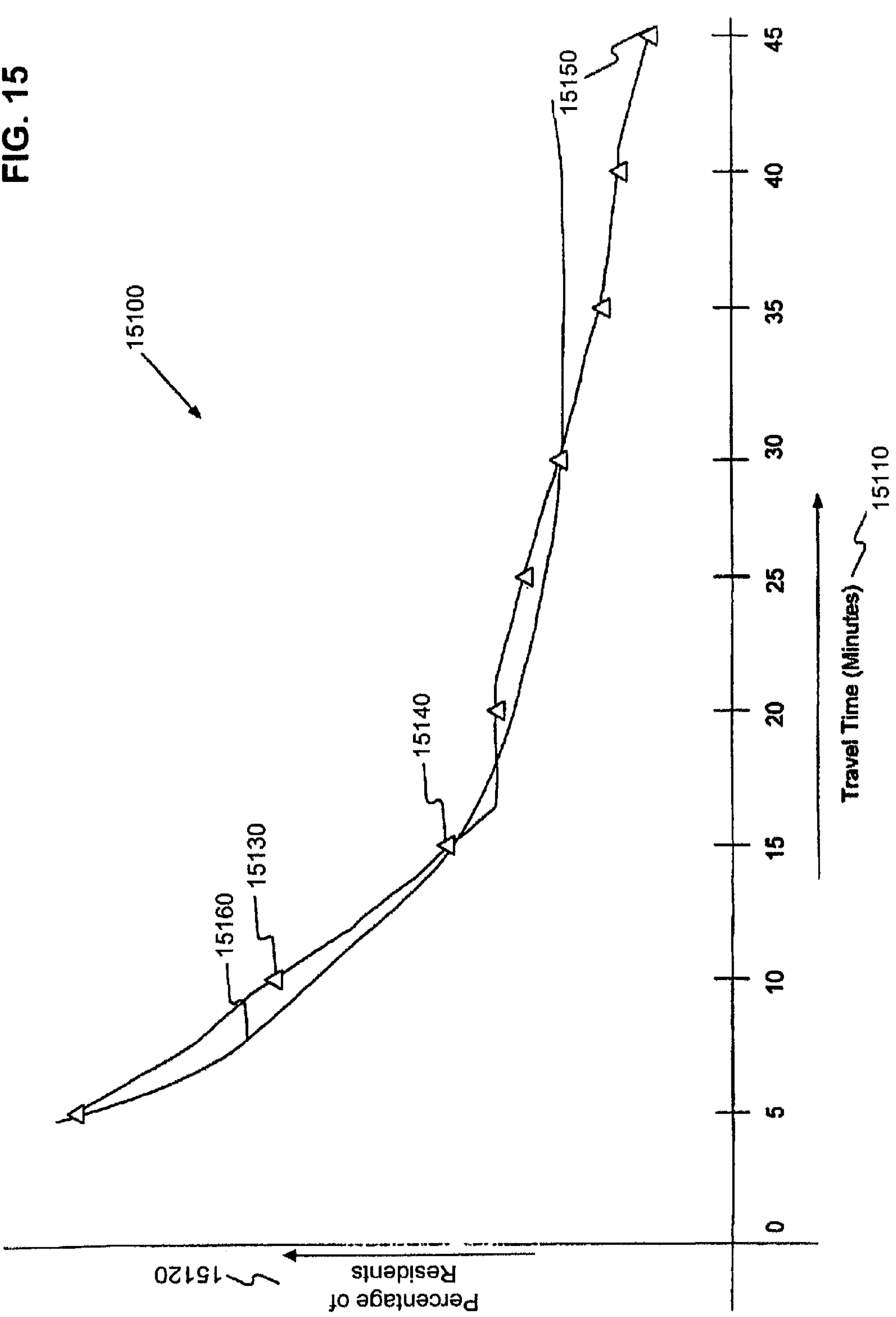
FIG. 15 is an exemplary histogram and a corresponding regression fitting consistent with the present invention.

As shown in one example at FIG. 15, the travel band data are then plotted on a line graph 15100 with the percentage of the residents, 15130, 15140, . . . 15150 from each travel band on the Y axis and the travel times on the X axis. A curve 15160 is then fitted to the tops of the bars and a correlation coefficient is computed.

Although the curve shown in FIG. 15 is exponential (for example, $y=58.908e^{-00519x}$, $R^2=0.8032$), it may also be based on a polynomial (for example $y=-0.0244x^2+1.0889x+7.4306$, $R^2=1$). Specifically, curve 15160 shows a steady decay as the travel time increases.

While the (polynomial curve fitted to a histogram of the data) example, as described above, may adequately represent the empirical relation of demand and/or supply to the site in question, other forms of summary may be more appropriate. Adaptations can also be useful, as the band data may be combined to facilitate curve fitting. Not every market area is the same. Population density, for example, can have a significant effect on the distribution of supply and demand. Whatever mode is chosen to represent the supply and demand data, it should remain the same for both supply and demand, and remain the same throughout the market area.

The travel bands may then be combined or "clustered;" for example, from the nine bands shown in FIG. 15 to three bands. Any one of several rules may be followed to combine the bands. For example, the nine bands may be combined into three bands with the same percentage of the customers, or one band may have 5% of the customers, another 15%, and the third 80%.

One skilled in the art will understand that other rules may also be used to combine the bands. Although one need not perform this step, it does reduce the number of travel bands. Additionally, each one of these travel bands has a contribution weight, which may be equal to the percentage of customers that come from that particular band.

In another method consistent with the present invention, once data for customers residing in homes located within the market area are separated from data for customers who were transferred, and once data for customers from outside the market area are separated from data for customers from inside the market area, multivariate linear models can be developed to relate demand to demographic variables associated with each band. One skilled in the art will appreciate that other methods may also be used to arrive at contribution weights for each travel band.

In another embodiment consistent with the present invention, the market area may be defined based on the distance of the facility from points around the facility. Thus, for example, the market area may be a circle with a five-mile radius and its center at the facility. As discussed earlier, the market area may be of other shapes, such as it may be rectangular. One skilled in the art will appreciate that regression or other statistical techniques can be used to generate weights for the bands, but not the bands themselves. These bands may then be assigned weights based on the proportion of the potential customers each band contributes to the facility.

Having determined the contribution weight for each band, one may use the contribution weight as a factor to adjust the supply and demand associated with each band. For example, using the processing module 5127, one may reduce the supply of 100 beds in the outermost travel band to five by multiplying the contribution weight of that travel band, e.g., 5%, by the supply of beds.

Similarly, one may adjust the demand for each band by factoring in the contribution weight associated with each band; but, the methods to adjust the contribution weights should not just be guesses or arbitrary. The methodology consistent with the invention uses reproducible techniques to define a market area and bands and draw empirical data from within the market area to validate the band weights and the demand and supply models used in the computations.

Figure 16A:
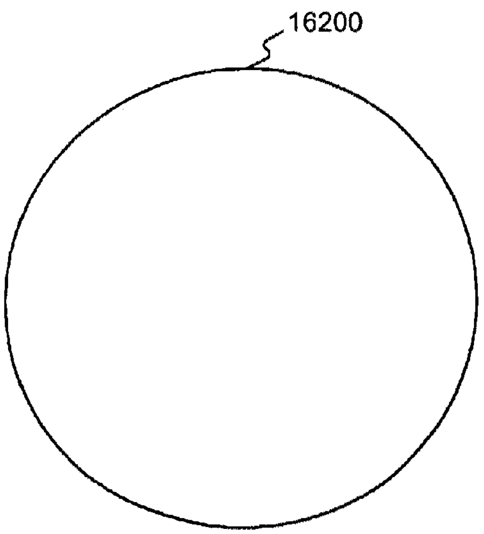
FIGS. 16A-16D are diagrams illustrating the concept of a demand model consistent with the present invention.
Figure 16B:
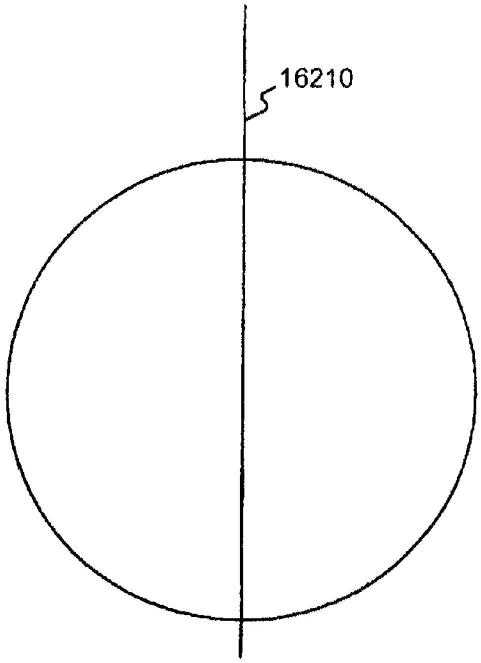
Figure 16C:
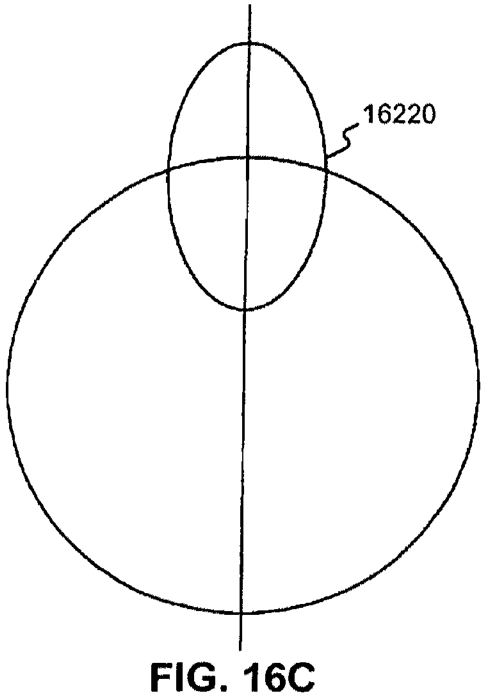
Figure 16D:
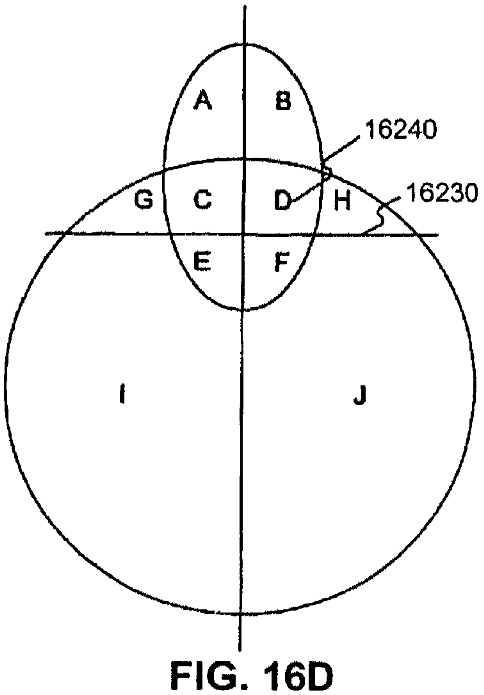

Several different types of demand models may be used consistent with the present invention. One type of demand model is explained with respect to FIGS. 16 and 17. Venn diagrams graphically explain the filtering or selection of demographics data using a demand model. FIG. 16A depicts a starting set, a circle, that includes every person over the age of 65 in a given market area based on census data, which, as discussed earlier, may be stored in the census database 136 created as part of the database of demographic information 5130 (shown in FIG. 5). As shown in FIG. 16B, one may then draw a vertical line 16210 separating persons in households that, for example, have an income greater than $25,000 per year from those in households having an income of $25,000 or less. Next, by analyzing the demographic information stored in the database 5130 and other sources of information, one may represent via an ellipse 16220 (FIG. 16C) the subset of the population that has both mobility and self-care limitations. Such individuals are conceptually shown to be within the ellipse and those that do not have mobility and self-care limitations are outside the ellipse. Finally, as shown in FIG. 16D, one may add a horizontal line separating the circle into two halves that are not equal. The upper half represents those individuals who are 75 or older. Everyone inside the circle 16200 and below horizontal line 16230 is older than 65 years but younger than 75. As discussed earlier, one skilled in the art will appreciate that other factors such as gender may be used to further refine the demand model.

The data associated with the demand model as depicted in the Venn diagrams in FIGS. 16A-16D may also be stored in a table such as that shown in FIG. 17. FIG. 17 depicts a table 17300 that, when processed by the processing module, provides one type of demand model. The demand model shown in FIG. 17 depicts the various categories of interest that may be incorporated in a demand model. Categories may be the age 17340, mobility and self-care limits 17350, qualified by income 17360, over the age of 75 17370, and between the age of 65-74 17380. One skilled in the art will appreciate that other ways of arranging data corresponding to the demand model or other techniques for data storage and access may be used to represent the demand model as well as to process the demand model in order to apply the demand model to the weighted bands.

Figure 18:
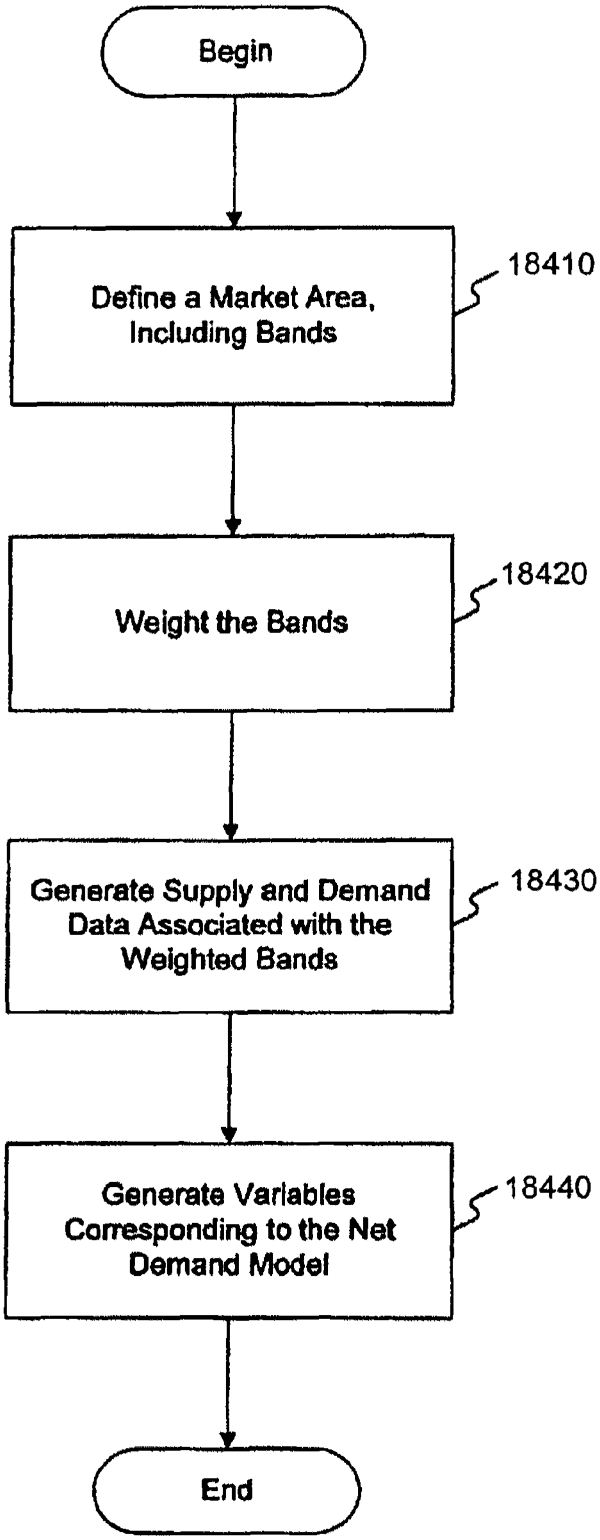
FIG. 18 is an exemplary flow chart corresponding to determining variables associated with the net demand model, consistent with the present invention.
Figure 19:
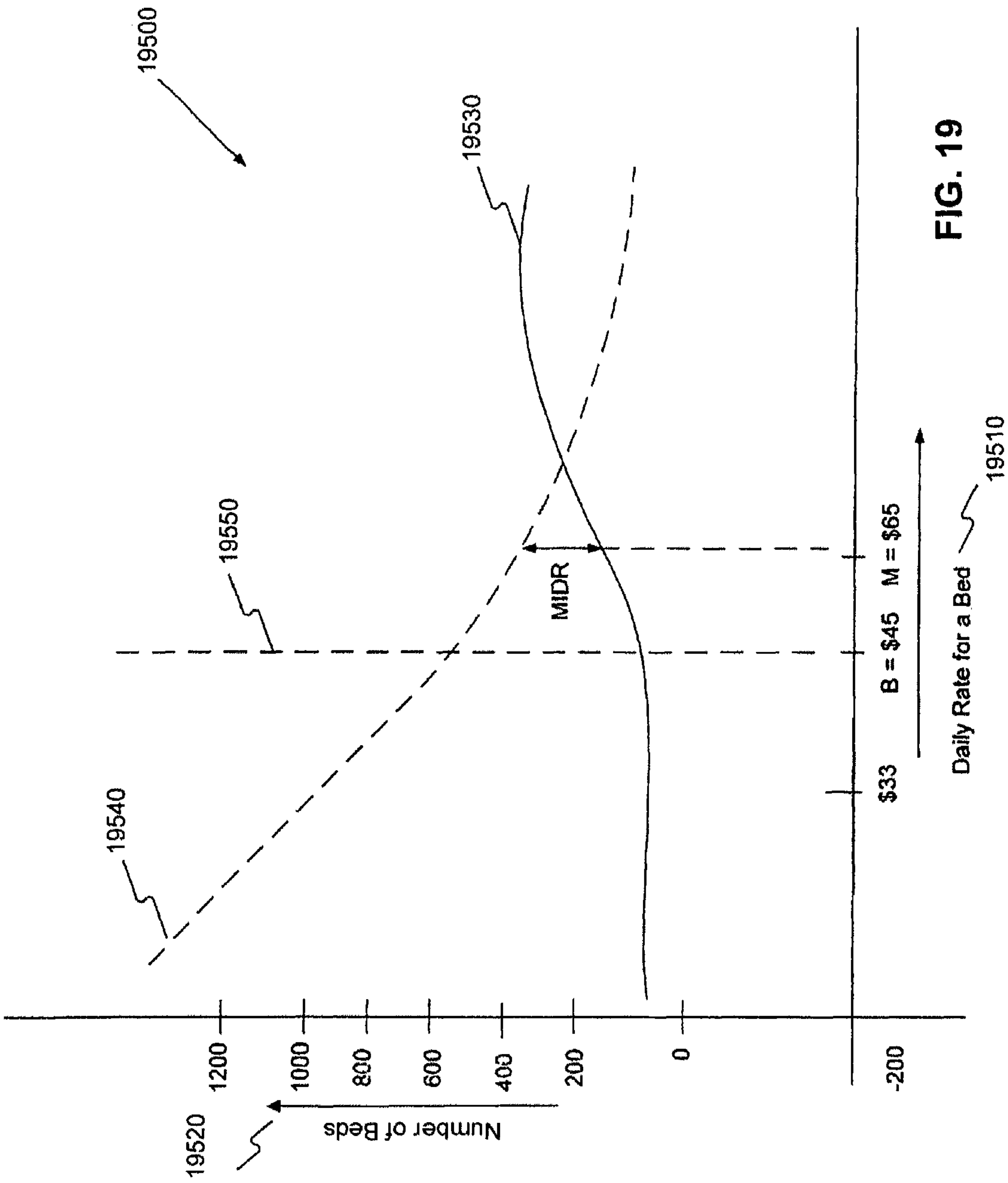
FIG. 19 is a graphical depiction of the variables corresponding to the net demand model, according to the present invention.

Having incorporated various factors that may affect supply or demand in a particular market area in a demand model, processing module 5127 and the other system components may generate a set of variables corresponding to a net demand model as shown in FIG. 19. FIG. 18 depicts a flow chart corresponding to the process for generating the variables in the net demand model. First, a market area is defined, including the bands associated with the market area (step 18410). As discussed earlier, a market area may be defined using travel time or distance, and may be of any shape.

Processing module 5127 then weights the bands (step 18420) based, for example, on travel time to or distance from the facility, as discussed earlier. The processing module next is used to generate and aggregate supply and demand data associated with the weighted bands (step 18430). As part of this step, demand curve 19540 and supply curve 19530 may be generated. As discussed earlier, the demand curve is generated by applying the demand model (for example, the model discussed with respect to FIGS. 16 and 17) to census or other data. The supply curve is an inventory of existing competition based on price. Weighting the data (both supply and demand) may be performed in one step. Thus, for example, to determine the demand curve one may sum for each category of census data (age groups) the number of residents in the market area by calculating [(Weight for Band 1)*(Weight for Category A)*(Sum of all residents in Category A in Band 1)+(Weight for Band 2)*(Weight for Category A)*(Sum of all residents in Category A in Band 2)+ . . . +(Weight for Band n)*(Weight for Category A)*(Sum of all residents in Category A in Band n)], where n is the number of bands. One may similarly calculate the numbers for category B and so on, and then add the demand to plot demand curve 19540. Similarly, using this process, demand from residents transferred from outside the market area may also be accounted for. One skilled in the art will appreciate that other methods may also be used to calculate empirically derived and weighted demand and supply.

Breakeven may be calculated by noting that it represents the point at which an assisted living facility at a standard level of occupancy (for example, 93%) will cover only its costs (fixed and variable), where the variable income is the income at a particular price point.

Next, using processing module 5127, one may generate the variables corresponding to the net demand model (step 18440). As FIG. 19 shows, net demand model 19500 may include, in one analysis, variables such as supply, demand, net demand, price elasticity of demand, breakeven, and maximum initial daily rate (MIDR). FIG. 19 depicts, along the x-axis, the daily rate price for a bed (19510), and, along the y-axis, the available beds (supply) and the demand for them (19520). The variables shown in FIG. 19 correspond to senior housing and relate to an assisted living facility; however, other variables might be used for analyzing retail industry, for example, to determine the best location for a retail establishment.

Demand curve 19540 plots demand by price. Supply curve 19530 indicates supply at different price points. As one might expect, demand diminishes as price increases. The supply of beds increases as price increases. Net demand is the vertical distance (e.g., in beds) between the two curves at any price point. As shown in FIG. 19, for example, demand is high at low prices: close to 1000 beds at a daily rate of $33. Breakeven 19540 is indicated at a price point of $45. The breakeven is provided by the analyst or the operator and is the point at which gross revenues equal the sum of fixed and variable costs. FIG. 19 also shows the maximum initial daily rate ("MIDR"), which may be derived in the following manner. Assume, for example, a developer wants to build a 100-bed facility. The price at which the supply and the demand curve are 100 beds apart corresponds to the maximum initial daily rate, which in this example is $65. One can plot these supply and demand curves using processing module 5127 and a computer display connected to the processing module, as long as the module has stored the demand model and the data corresponding to a market area. Using the plot, one can then read values of the different variables associated with the net demand model. In one embodiment consistent with the present invention, there are three input variables—supply curve, demand curve, and breakeven—and the other three variables—price elasticity of demand, net demand, and MIDR—may be derived from these three input variables.

As discussed above, another variable associated with the net demand model is the price elasticity of demand that corresponds to the rate at which the supply curve separates from the demand curve. The rate at which the curves separate provides the rate of expected response of the market to changes in price. Thus, once the supply and demand curves are established, they are then band-weighted according to empirical research from within the market area and other variables associated with the net demand model are generated.

As discussed above, another variable associated with the net demand model is price sensitivity, which, in some special cases has been called price elasticity. Price sensitivity, a standard concept, applies to both supply and demand. The process becomes unique when it rests upon the travel-time band-weighted from sampling concept.

In a point analysis, once the supply and demand data have been established, they are then band-weighted, as described above, according to empirical research (sampling) from within the market area, resulting in a special and unique form of estimate. The travel time band-weighted data are then plotted on the Net Demand Model graph. The price sensitivities can now be seen at a glance on the graph. Due to the banding and weighting process, market relationships not otherwise visible can be viewed by inspection.

For example, the rate at which the curves separate provides, at a glance, the rate of the travel time-weighted expected response of the market to changes in price. The difference between the supply and demand curves is a plot of travel-time-weighted net demand.

In a market area simulation which involves multiple units, the price sensitivity of each unit to changes in supply and demand due to other facilities' actions and the forecasted changes in the marketplace, can be incorporated into the simulation.

Also, the demand curve 19540 may also be verified or validated. This may be accomplished by several means. For example, the price elasticity of demand may be plotted for an existing facility in the defined market area and compared with the price elasticity of demand for a proposed facility or site by using data such as the degree of fill of facilities in the market area or the rate of replacement within the market area.

Having generated the six variables discussed above with respect to a net demand model, a comparison analysis may be performed. A comparison analysis may be used to compare two sites, for example, A and B, with a comparable third site, C that has already been completed and staffed and that is operating at full occupancy. One can then use triangulation techniques on facility C for a reality check. Because comparison can include triangulation against existing facilities, which have already been filled, the absolute value of demand can be estimated more effectively than is possible with existing methods.

Even with rigorous empirical techniques for defining the market area and for weighting the supply and demand within the market area, the task of determining total demand (the vertical height of the demand curve) is difficult. Traditional practice has been to estimate or guess at the value of total demand based on assumptions drawn from national or regional research, i.e., data from outside the market area. The use of the net demand model allows triangulation against a known existing facility that is fully leased and operating, and thus provides data from within the market area. To perform a comparison analysis one can either compare the net demand at each facility or one can compare the MIDR.

In general, however, the comparison analysis discussed in this part of the description relates to comparing two sites A and B once the maximum initial daily rate corresponding to each one of the sites has been determined. As discussed above, however, sites may be compared based on net demand. In other words, comparing MIDR is a special case of comparing net demand, which can provide special insights that may not be available by simply comparing the net demand. For example, suppose site A is offered for sale for $1 million and has a MIDR of $75 per day, and site B is offered for sale for $500,000 and has a MIDR of $65 per day. The MIDR associated with each of the two sites allows a comparison that is much more rigorous than just a comparison of the sale prices of the two facilities. Thus, processing module 127 allows one to compute the capitalized value of a one-dollar difference in the MIDR of the two using certain assumptions. For example, assuming for each site (1) a 93% occupancy rate; (2) 100 beds; and (3) a capitalization rate of 13%, one may use the following formula to arrive at the capitalized value of a one dollar difference in the MIDR of the two sites: ($1.00×365 days*93% occupancy×100 beds)/(13% capitalization rate). This formula reveals a capitalization value of $261,115, or approximately $250,000. Because site A has a MIDR of $75 and site B has a MIDR of $65, site A is a better value based on the net advantage despite being more expensive. In this example, the net advantage is $2 million, taking into account the difference in the capitalized value of the two sites; i.e., $2.5 million, and the difference between the asking prices of the two sites; i.e., $0.5 million).

Figure 20:
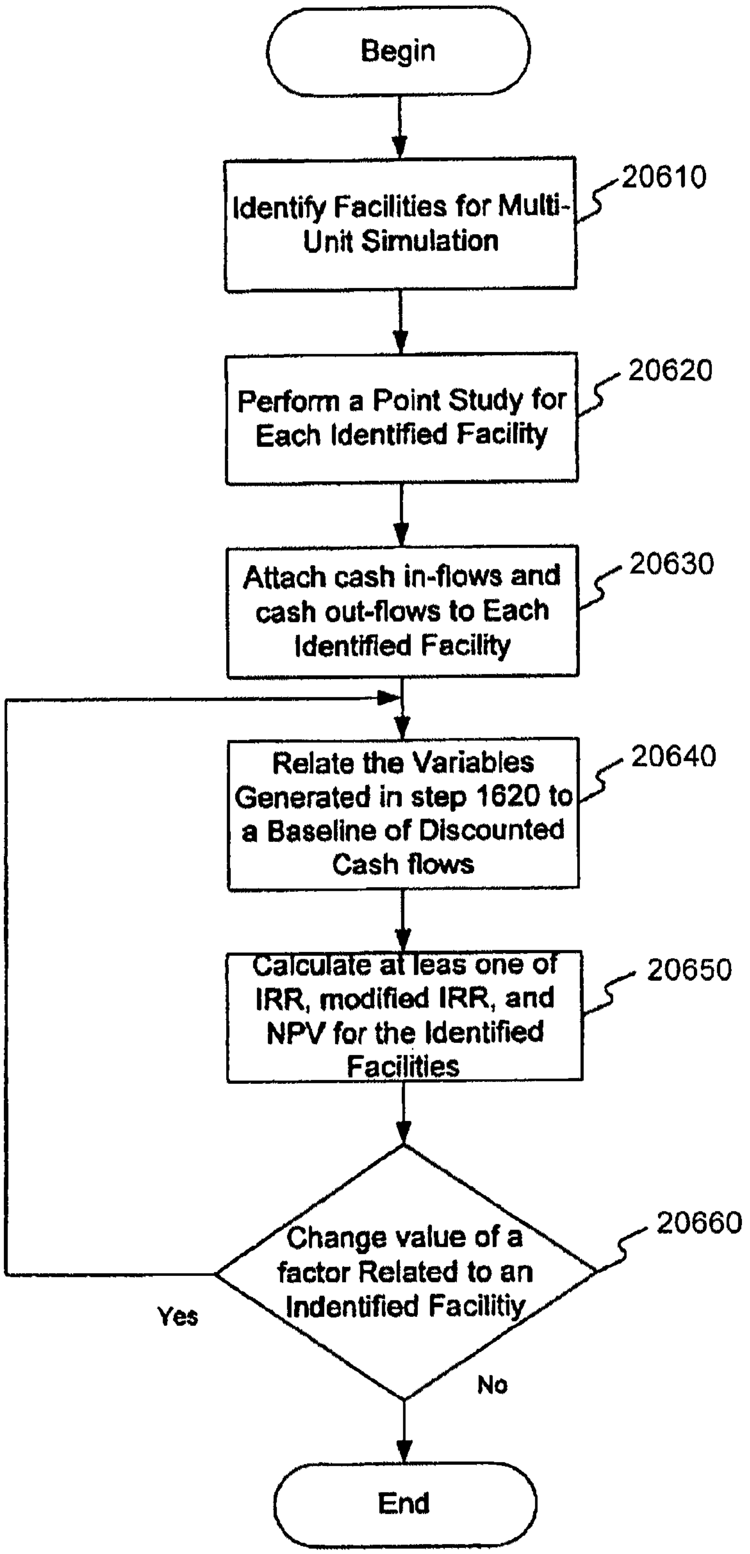
FIG. 20 is a flow chart of a process for performing a multi-unit simulation consistent with the present invention.

In another aspect consistent with the present invention, the system of FIG. 1 may be used to perform a multi-unit simulation; for example, where a client wants to take over a chain of assisted living facilities. As shown in FIG. 20, the facilities that will be the subject of the analysis are identified (step 20610). Next, for each of the identified facilities, a point analysis is performed (step 20620). In some cases, a point analysis may be performed for each competing facility as well. As part of this step, at least the six variables discussed earlier with respect to a net demand model are generated for each site that is a part of the chain. Additionally, each site is assigned a percentage fill variable, such that the changes in price of other facilities may be reflected through price elasticity of demand to the percentage of fill and thus to the net income of the each facility. Next, cash inflows and cash outflows (i.e., financial pro form a) are attached to each identified facility (step 20630). The in/out cash flows expected from each facility that is being analyzed will depend on factors such as the price of beds and enrollment. Next, the variables generated above are related to a baseline of discounted cash flows (step 20640).

Then, an internal rate of return ("IRR"), a modified internal rate of return ("modified IRR"), or a Net Present Value ("NPV") may be calculated for the multi-unit chain (step 20650). As part of this function, processing module 5127 calculates a cumulative or summed financial pro form a for the entire chain or group of assisted living facilities that are part of the multi-unit simulation. Cash flows into and out of each one of the facilities may be stored, for example, in a table that processing module 5127 can access. Using known techniques, an internal rate of return, a modified rate of return, or a net present value may be used for analyzing the facilities as an investment. For example, one may plot cash flows for the entire chain and then calculate the internal rate of return for the chain.

By using processing module 5127 and the aforementioned table or spreadsheet containing the cash flows, one may analyze the various permutations and combinations of the facilities. Also, one may change the values of factors, such as enrollment and price associated with each facility, to perform "what if" analysis (step 20660). Specifically, as part of this step, for example, one may try a series of ideas and compare the outcomes for each idea. For example, one may tie cash inflow from the sale of facility A to improvement of facility B (which would result in cash out for improvements and cash in from the higher rates); but the higher rates may result in lower demand at facility B and perhaps higher demand at nearby competing facilities, all of which may be captured in the net discounted cash flow.

Obviously, the market area analysis can be improved further if the research can extract more accurate information from the underlying data for a geographical area. For example, the ability to report the contents of individual census blocks (which average fewer than fifty people) allows analysts and researchers to assign data to ever-more-complex geographic shapes such as travel time bands. Privacy laws, however, do not allow reporting individually identifiable information. Thus, Census age data are reported in full detail (by year of age up to age 100) at high levels of geography, like state and county, but are "binned" into five-year age groups (ending with "85 and older") at detailed levels of geography like block and census block. Since binned data yield inferior forecasts, analysts and researchers face a dilemma.

One solution to the binning problem is interpolation. For example, one can compare the counts in a geographic region ("cell") to counts in another cell or counts in a larger "parent" region in terms of the proportions of the total for each age. If a cell has exactly the same age distribution as another, their proportions at each age will be the same. In reality, proportions will vary from cell to cell, age by age, for many reasons.

The model described below assumes that each cell has a set of demographic "characteristics" that influence the distribution of people by age. From these demographic characteristics a distribution of "ideal" proportions $\{p_a|0\leqq a\}$ reflecting how those characteristics can be predicted. Although ideal proportions might never be realized, they represent values around which the population's actual proportions might fluctuate due to random, cell-specific factors such as differences in migration, changes in condition, etc. Introducing ideal proportions allows the separation of random or incidental aspects of the age distribution in each cell from more demographically meaningful aspects captured by the ideal proportions. The demographically meaningful aspects will vary from cell to cell within the larger parent population. To the extent the parent region has homogeneous demographic characteristics, there should be small variation in ideal proportions between cells.

These suppositions, suggestions, and expectations translate into a two-stage model of age distribution. First, there is the set of ideal proportions associated with each cell. Second, this set influences the actual counts (data) as if a multinomial sampling process had occurred. If the total population in the cell is n, then we should draw n "balls" with replacement from an urn containing a proportion $p_0$ of people in the zeroth age group, $p_1$ people in the first age group, and so on. This sampling helps account for the rather larger age-to-age variations observed in the proportions of small populations compared to larger ones.

In addition, to account for actual variations between cells that exceeds the variation suggested by the multinomial model, the ideal proportions are modeled as the outcome of a stochastic process. Such an "age-distribution process" is characterized by parameters that determine its first two moments: the "model" proportions $\{\pi_a|0\leqq a\}$ and a related variance-covariance matrix. The model proportions are values around which the ideal proportions fluctuate from cell to cell within a common parent. The variances describe how much fluctuation tends to occur. The covariances (after normalization by the variances in the usual way) describe possible correlations between ages.

In effect, the model informs about a "typical" distribution of population by age ($\pi_a$) as well as about correlations among people of different ages. Interestingly, strong correlations usually do exist.

The age-distribution process must be estimated from data or inferred from theory. Usually, the interpolation problem must be solved for a large collection of cells within the parent region. A detailed age distribution of the parent's population can serve to estimate the model proportions. The age distribution in each cell might deviate from that of its parent, but on average, the cells' distributions reflect that of their parent.

It is more difficult to estimate the variances and covariances. As explained below, such estimate need not be very good for this statistical model to produce results superior to traditional interpolation methods.

Studying demographic behavior for extreme ages presents a compelling argument for some such model. Conventional methods of interpolation, such as cubic extrapolation and linear extrapolation, do not account for age distribution at the extremes. The usual approaches are overly simplistic. Incorporating the model distribution into the interpolation method causes the extrapolation to extreme ages in each cell to mimic the distribution by age in the parent population. This, at least, has a chance of being realistic and, incontestably, produces correct results on average.

The next step in model construction is taken by observing, on both empirical and theoretical grounds, that the ideal and model proportions are best expressed in terms of their Logits.

The "Logit" of a proportion is the difference between its natural logarithm and that of its complement; that is, $$\text{Logit}(p)=\ln(p)-\ln(1-p).$$

The Logit is a monotonic, order-preserving re-expression of any proportion between 0 and 1. It takes on all possible real values, becoming arbitrarily negative for small p and arbitrarily positive for large p. (To avoid making special cases in some equations, it is convenient to think of Logit(0) as negative infinity and Logit(1) as positive infinity.)

The Logit is a variance-stabilizing transformation for data that allows the assumption of a single variance describing the variability of the Logits, rather than a potentially different variance for each age. This both simplifies the model and makes estimating its parameters easier.

On theoretical grounds, in most cases there are arbitrary choices concerning what number to use for the total population in a cell. For instance, a county may have 1,000 married white males aged 30. This number could be expressed as a proportion any number of ways, such as a proportion of the number of married white males in the county, of the number of white males in the county, of the number of males in the county, or of the total population in the county. Therefore, the statistical model, and thereby its estimates, should not depend on the choice of base of the proportions.

It would also be good for the variance of the re-expressed proportions not to change when all proportions are rescaled by a constant factor. A logarithm is a good choice. However, the logarithm (or any re-expression of a proportion) ought to be applied symmetrically. Given a total, it is just as valid to count the people not in a group as to count those who are in it. Thus, changing a proportion p to its complement 1−p should correspond to a simple, readily understood change in the way it is expressed. Combining these two ideas—re-expressing small proportions with a logarithm and doing so symmetrically—leads to the Logit, up to an arbitrary (and irrelevant) constant multiple.

Finally, in the expectation that the Logit has stabilized variances of the actual proportions, there needs to be a way to model correlations among the Logits. A distribution of the Logits of the actual proportions will be referred to as a "prior" (distribution). It determines the probabilities associated with the stochastic process $\{p_a|0\leqq a\}$.

The objective is to estimate the population at every age for one cell, given the populations $k_1, k_2, \ldots, k_m$ in a set of m disjoint age bins. The first step is to introduce one variable $z_a$ for each age a to represent the Logit of the cell's population proportion at age a.

$$z_a=\text{Logit}(p_a)=\ln(p_a)-\ln(1-p_a); \tag{1}$$

Equivalently, $$p_a=\text{Logistic}(z_a)=\exp(z_a)/(1+\exp(z_a)) \tag{2}$$

since the Logistic is the functional inverse of the Logit.

As the possible proportions range from zero to one, these Logits range over all real values from the most negative to the most positive. Differentiating both sides of equation (2)[0162] by z and simplifying produces the following fundamental and useful differential relationship $$\frac{dp_a}{dz_a}=p_a(1-p_a). \tag{3}$$

The conditional Logit-Normal model assumes the z's have a multivariate Normal distribution with mean $\mu=(\mu_a)$ and covariance matrix V. These will be considered parameters of the model, but they should not be estimated from the data. Instead, they represent information prior to, and independent of, the data. Any value of the z's gives a corresponding vector of p's that in turn determines a multinomial distribution of the counts $k=(k_1, k_2, \ldots, k_m)$. Multiplying the distribution of k (conditional on z, μ, and V) by the distribution of z (conditional on μ and V) gives the likelihood function.

In general, a distribution consists of two factors. One part determines its functional form and the other part normalizes that to a total unit probability. The likelihood function, being a product of two distribution functions, therefore factors into four parts. The first is the multinomial coefficient $(k_1+k_2+\ldots+k_m)!/(k_1!k_2!\ldots k_m!)$, which depends on the bin counts $k_1, \ldots, k_m$, but otherwise is independent of the variables $z_a$ or any other parameters. Therefore, when minimizing the likelihood, one can ignore this factor.

The second part is the multinomial probability term whose logarithm is $$\ln(p_1^{k_1}p_2^{k_2}\ldots p_m^{k_m})=k_1\ln(p_1)+k_2\ln(p_2)+\ldots+k_m\ln(p_m). \tag{4}$$

The p's are the ideal proportions within each bin as provided by the Logistics of the z's:

$$p_i=\sum_{a\in A_i}p_a, \tag{5}$$

$$p_a=\exp(z_a)/(1+\exp(z_a)). \tag{5}$$

Expressing the ideal bin proportions $p_i$ as sums of the ideal proportions by age, $p_a$, directly relates the interpolation problem (which is to estimate the $p_a$'s) to the data (which reflect the values of the $p_i$). The product of these two factors gives the probability of $(k_1, k_2, \ldots, k_m)$ conditional upon the values of the z's.

The third part of the likelihood is the exponential portion of the multivariate Normal distribution of the z's, which by definition is the exponential of $$-(z-\mu)^{tr}V^{-1}(z-\mu)/2. \tag{6}$$

Finally, the fourth part of the likelihood is the normalizing constant (coming from the multivariate Normal distribution function) inversely proportional to the square root of the determinant of V. Like the multinomial coefficient, it does not depend on the z's and so also can be ignored. The product of the third and fourth parts gives the probability of the z's conditional upon μ and V.

To find the derivative of the log-likelihood function, it is evident from (5) that the derivative of $\ln(p_i)$ with respect to $z_a$ is needed. This is trivially zero when age a is not in the $i^{th}$ bin. When a is in the $i^{th}$ bin, (3) gives the derivative of $p_i$ as $p_a(1-p_a)$. A convenient way to write this is to define $p_{ia}$ as equal to $p_a$ whenever a is in the $t^h$ bin and otherwise equal to zero. Thus, $$\frac{\partial\ln(p_i)}{\partial z_a}=\frac{p_{ia}(1-p_{ia})}{p_i}; \tag{7}$$

$P_{ia}=P_a$ if age a is included in bin $A_i$, $P_{ia}=0$ otherwise.

Assembling results (1) through (6) yields the derivative:

$$\frac{\partial \ln(L)}{\partial z_a} = \left[\sum_{i=1}^{m} k_i p_{ia}(1-p_{ia})/p_i\right] - [V^{-1}(z-\mu)]_a. \tag{8}$$

At any local maximum of the likelihood L, (8) will be zero. Thus a global maximum occurs either at a zero of (8) or when one or more of the variables $z_a$ becomes unbounded.

Before proceeding to a solution, there is the question of constraints. So that the interpolated values will reproduce the total cell population, the Logistics of the z's must provide estimated proportions which add to unity. In other words:

$$\sum_a \exp(z_a)/(1+\exp(z_a)) = \sum_a p_a = 1. \tag{9}$$

In addition, if (as with many conventional interpolation methods), the interpolated values must reproduce each of the observed bin counts exactly, requiring the replacement of the single constraint (9) by one constraint for each bin $A_i$, yielding:

$$g_i(z) = n\left(\sum_{a\in A_i} p_a\right) - k_i = 0; \tag{10}$$

$$i = 1, 2, \ldots, m;\ n = \sum_{i=1}^{m} k_i.$$

(This expression (10) defines the functions $g_i$) This collection of constraints implies the previous one, and therefore generalizes it. Whether one wants to use equations (9) or (10), though, depends on whether it is more important to "honor" the data or to estimate the model proportions as well as possible. This determination, in turn, depends on an interpretation of the second stage of the model to see whether the multinomial variation reflects some kind of intrinsic variability, or whether it captures possible measurement error. The former case would warrant honoring the data, but not the latter case.

Either way, maximizing the likelihood can be achieved by introducing Lagrange multipliers. The nature of the problem is the same, regardless of the number of constraints. The derivatives of the constraints (10) are, as before, readily found using (3):

$$\frac{\partial g_i}{\partial z_a} = n\frac{\partial p_{ia}}{\partial z_a} = np_{ia}(1-p_{ia}),\ i = 1, 2, \ldots, m. \tag{11}$$

At least one of the Lagrange multipliers, written $\lambda_1$, $\lambda_2, \ldots,$ and $\lambda_m$, must be non-zero. The constrained likelihood equations are $$\frac{\partial \ln(L)}{\partial z_a} + \sum_{i=1}^{m} \lambda_i \frac{\partial g_i}{\partial z_a} = 0 \text{(one for each age } a\text{) and} \tag{12}$$

$g_i(z)=0$ (one for each bin $A_i$).

Equations (10) and (11) expand to:

$$0 = \sum_{i=1}^{m} k_i p_{ia}(1-p_{ia})/p_i - [V^{-1}(z-\mu)]_a + \sum_{i=1}^{m} \lambda_i n p_{ia}(1-p_{ia}) \tag{13}$$

(one for each age a) and $$n\left(\sum_{a\in A_i} p_a\right) - k_i = 0 \text{ (one for each bin } A_i\text{)}. \tag{14}$$

Because there is no overlap among bins, the sums in equation (13) simplify, such that the only nonzero term for age a corresponds to the index i for which a is in bin $A_i$.

The second derivatives of the log likelihood are also useful. They can, for example, help estimate the variance-covariance matrix of the estimators, act as inputs to software that requires analytic evaluation of second derivatives, or demonstrate the existence of a unique solution to the constrained equations.

$$-\frac{\partial^2 \ln(L)}{\partial z_a \partial z_b} = \sum_{i=1}^{m} k_i p_{ia}(1-p_{ia})p_{ib}(1-p_{ib})/p_i^2 + [V^{-1}]_{ab},\ a \neq b; \tag{15}$$

$$-\frac{\partial^2 \ln(L)}{\partial z_a^2} = \sum_{i=1}^{m} k_i \frac{p_{ia}(1-p_{ia})}{p_i^2}(p_{ia}(1-p_{ia}) - p_i(1-2p_{ia})) + [V^{-1}]_{aa}$$

In the usual case of no overlap among bins, a unique bin A is associated with each age a, so again the sums contain only one nonzero term. The matrix of second partial derivatives becomes the sum of a block-diagonal matrix and $V^{-1}$:

$$-\frac{\partial^2 \ln(L)}{\partial z_a \partial z_b} = k_i\left(\frac{p_a(1-p_a)}{p_i}\frac{p_b(1-p_b)}{p_i} - \frac{1-2p_a}{p_i}\delta_{ab}\right) + [V^{-1}]_{ab}, \tag{16}$$

a and b both in $A_i$;

$=[V^{-1}]_{ab}$ otherwise.

Here, $\delta_{ab}=0$ except for a=b, where $\delta_{ab}=1$.

As a check, simple cases should produce reasonable solutions. Suppose that each bin contains exactly one age. Ages and bins are therefore identified and $p_{ia}=p_a$ whenever i is the bin for age a, and is zero otherwise. In this situation the bin-by-bin constraints (10) restrict the only possible solution to $p_a=k_a/$. Therefore let us adopt the single sum-to-unity constraint (9).

To avoid the complications of a general covariance matrix V, suppose V is simply diagonal with a constant variance $\sigma^2$. The constrained likelihood equations (13) and (14) require only one Lagrange multiplier A. They become $$0=k_a(1-p_a)-\sigma_{-2}(z_a-\mu_a)+\lambda n p_a(1-p_a) \tag{17}$$

(one for each age a) and $$\sum_{a\in A_i} p_a = 1.$$

As σ becomes arbitrarily large and none of the bin counts is zero, $p_a=k_a/n$, $z_a=\text{Logit}(p_z)$ provides a solution, because one can choose $\lambda=-1$ to obtain $$-(k_a(1-k_a/n)-\sigma^{-2}(z_a-\mu_a))+n(k_a/n)(1-k_a/n)= \sigma^{-2}(z_a-\mu_a)\xrightarrow[\sigma\to\infty]{}0. \quad (18)$$

This solution satisfies the single constraint $$\sum_{a\in A_i} p_a = \sum_{a\in A_i} k_a/n = n/n = 1$$

by construction. This characterizes situations where the prior distribution of z is so diffuse that it does not affect the estimated population proportions, which are therefore given by the intuitively obvious set of observed proportions $p_a=k_a/n$, regardless of the prior means μ.

Another extreme is attained by letting σ become arbitrarily close to zero. To handle this, multiply both sides of equation (17) by $\sigma^2$ to obtain $$0=\sigma^2 k_a(1-p_a)-(z_a-\mu_a)+\sigma^2\lambda n p_a(1-p_a)\text{(one for each age }a). \quad (19)$$

Now the only possible solution must be $z_a=\mu_a$, because the equation approaches $0=-(z_a-\mu_a)$ in the limit as σ goes to zero. For the constraint to hold, though, $$1=\sum_{a\in A_i} p_a = \sum_{a\in A_i}\frac{\exp(\mu_a)}{1+\exp(\mu_a)}.$$

Thus, the prior means must themselves form a feasible solution. When they do, and when the prior distribution has very small variances, the data have no appreciable influence on the solution.

In both of the preceding cases, calculating the negative Hessian (16) gives a diagonal matrix with positive entries everywhere for any value of σ. This demonstrates the limiting solutions are limits of local maxima of the likelihood (rather than just limits of local critical points). That these local maxima really are global maxima can be deduced from the behavior of the likelihood function as the z's become unbounded: provided all the k's are nonzero, the log likelihood function becomes arbitrarily negative.

To understand the behavior of the estimator in the more general case, let's consider a single bin A. Here, p is the sum of the $p_a$ for ages a in A, k is the bin count, and n is the total population. When the bin does not cover all possible ages, the value of n may exceed k. The constraint $$np-k=n\left(\sum_{a\in A_i} p_a\right)-k=0$$

forces p=k/n. Equations (13) and (14) involve one Lagrange multiplier (λ−1) and thereby become $0=np_a(1-p_a)-[V^{-1}(z-\mu)]_a+(\lambda-1)np_a(1-p_a)$ for each age a; that is, $$(z-\mu)_a=\lambda n V[p(1-p)]_a. \quad (20)$$

When the sum of the logistics of the μ's equals p, the likelihood is maximized uniquely when z=μ. Apart from a constant term, the log likelihood is the sum of equations (4) and (6), which in this case becomes $k\ln(p)-(z-\mu)^{tr}V^{-1}(z-\mu)/2$. The constraint is that p=k/n. Consider the dual problem, which is to minimize the constraint subject to keeping the log likelihood constant, say equal to C. Because V is positive-definite, so is its inverse, and therefore the second term in the log likelihood is never negative and is zero only when z=Therefore the first term k ln(p) never exceeds C, so p cannot exceed exp(C/k) and attains that value only when z=μ. The solution to the dual problem therefore solves the primal.

This solution causes the estimated population distribution by age within the bin to be exactly the same as the prior distribution. In general, though, the sum of the logistics of the μ's ($p^{(0)}$) does not equal the proportion p=k/n given by the data. To explore what happens, $p^{(0)}$ can be changed, at least by small amounts, by means of comparably small changes in the age proportions $p_a$ that still satisfy the constrained likelihood equation (20). To this end let (The an infinitesimal real number. For each age a in the bin, set $$\pi_a^{(0)}=p_a^{(0)}(1-p_a^{(0)})nV[p^{(0)}(1-p^{(0)})]_a. \quad (21)$$

The sum of these values is positive because V is positive-definite and n is positive. This shows $$v=p^{(0)}\Big/\sum_{a\in A}\pi_a^{(0)} \quad (22)$$

is well defined. Let $\pi_a=v\pi_a^{(0)}$.

The values $p_a^{(\delta)}=p_a^{(0)}+\pi_a\delta$, $\lambda^{(\delta)}=v\delta$ satisfy the constrained maximum likelihood equations $z_a^{(\delta)}-\mu_a=\lambda^{(\delta)}nV[p^{(\delta)}(1-p^{(\delta)})]_a$ to first order in δ, where $z_a^{(\delta)}=\text{Logit}(p_a^{(\delta)}$.

Specifically, $z_a^{(\delta)}=\text{Logit}(p_a^{(\delta)}=\ln(p_a^{(0)}+\pi_a\delta)-\ln(1-[p_a^{(0)}+\pi_a\delta])$ $=\ln(p_a^{(0)})+\pi_a\delta/p_a^{(0)}-[\ln(1-p_a^{(0)})-\pi_a\delta/(1-p_a^{(0)})]$ to first order in δ

$=\text{Logit}(p_a^{(0)})\ \pi_a\delta/[p_a^{(0)}(1-p_a^{(0)})]$ $=\text{Logit}(p_a^{(0)})+nV[p^{(0)}(1-p^{(0)})]_a v\delta$ $=z_a+nV[p^{(0)}(1-p^{(0)})]_a v\delta$ Subtracting $\mu_a$ and using the assumption that $z_a-\mu_a$ is zero gives $z_a^{(\delta)}-\mu_a=\lambda^{(\delta)}nV[p^{(0)}(1-p^{(0)})]^a$.

This is almost what we want, but with the $p^{(0)}$'s instead of the $p^{(\delta)}$'s. But the difference between them is infinitesimal and—since $\lambda^{(\delta)}=v\delta$ is also infinitesimal—the difference between $\lambda^{(\delta)}nV[p^{(0)}(1-p^{(0)})]_a$ and $\lambda^{(\delta)}nV[p^{(\delta)}(1-p^{(\delta)})]_a$ is second order in δ. Consequently, $$z_a^{(\delta)}-\mu_a=\lambda^{(\delta)}nV[p^{(\delta)}(1-p^{(\delta)})]_a$$

to first order in δ as desired.

The definition of $p^{(0)}$ is the sum of the proportions $p_a^{(0)}$, so this proposition and equation (22) show that $p^{(0)}$ changes to $p^{(0)}+p^{(0)}\delta$. Therefore, since δ was an arbitrary infinitesimal, this is a smoothly varying set of solutions to the constrained likelihood equations within any infinitesimal neighborhood of $p^{(0)}$.

Equation (21) shows how small departures of the bin proportion k/n from the parent proportion predicted by the μ's translate to changes in the estimated proportions by age. The changes are directly proportional to the $\pi_a^{(0)}$, which (according to the right hand side of equation (21)) are (a) directly proportional to a quadratic form in the $p_a(1-p_a)$ and (b) directly proportional to the covariance matrix V of the z's. In practice, the proportions by age are usually small (a few percent), so the $(1-p_a)$ terms are practically negligible.

The result can be loosely summarized by characterizing the conditional Logit Normal estimator as a two-step process. In the first step, it gets the estimated proportions by age within a bin to mimic the pattern given by the parent distribution. Then, it adjusts those values by amounts that are directly proportional to the squares of the amounts and also directly proportional to the variances of the Logits. This characterization must be understood in the general sense that "variances of the logits" includes the idea of covariance; that is, of correlated adjustments. Strong positive correlation (which is frequently the case for nearby ages) causes the adjustments to be similar, of similar size, among neighboring ages. Negative correlations (which are observed in the United States between ages spanning the breakpoints of 18 and 22 years, for instance) will cause the adjustments to magnify relative differences in the proportions for those ages.

With more than one bin, the likelihood equations (13) and (14) represent a trade-off among bins. This occurs through two mechanisms. First, if a bin's observed proportion $k_i/n$ in a bin differs from the prior proportion in that bin, $$\sum_{a \in A_i} \frac{\exp(\mu_a)}{1+\exp(\mu_a)},$$

then on balance there must be compensating discrepancies in the proportions of the remaining bins. Proposition 2 indicates how the estimates adjust for these discrepancies. Second, the covariance matrix V "connects" the adjustments made in one bin to those in another. Positive correlations tend to induce adjustments in similar directions; negative correlations, adjustments in opposite directions. Exactly how these mechanisms interact depends on the sizes of the discrepancies (between data and prior proportions) relative to the covariances of the Logits, and so is difficult to predict in general.

To summarize, the investigations of simple and limiting cases conducted here show more clearly how the prior proportions, through their Logits μ, and the covariance matrix V of the Logits, control the estimates. The estimated proportions by age represent a trade-off between the estimates suggested by the prior proportions and the values suggested by the binned data.

Let p be the column vector of Logistics of the components of z. Because the constraints are linear in p, but the log Likelihood is nonlinear, it seems advantageous to pose the problem in terms of the p's. When this is the case, additional constraints must be added:

$$0 \leqq p_a \leqq 1 \text{ for all } a. \tag{23}$$

In vector notation this is $0 \leqq p \leqq 1$. Such constraints are unnecessary when solving the problem in terms of z, since they will automatically be satisfied no matter what the values of the z's are. When a p is zero or one, we can make the corresponding z extremely small (about −300) when p is zero, and extremely large (about +300) when p is one.

When the full constraints in equation (10) are applied to reproduce the individual counts, then the first factor of the log likelihood does not vary and the problem simplifies:

Minimize $(z-\mu)^{tr}V^{-1}(z-\mu)$ subject to (9), (10), and (23).

In particular, the actual counts (the k's) in the bins do not matter: only their relative proportions can influence the solution.

The problem as posed in terms of p, regardless of which set of constraints one chooses, is a nonlinear multivariate minimization subject to linear constraints and linear inequalities. The IMSL routine DLCONG [Visual Numerics 1997], which implements M. J. D. Powell's "Tolmin" algorithm [Powell 1989], provides a double-precision solution employing analytical calculation of the gradient (the first derivatives). It is iterative, beginning by finding a feasible solution and then improving it until the gradient of the objective function is smaller than a user-specified tolerance.

Because it speeds things up to start with a known feasible solution, observe that when the age groups do not overlap and exhaustively partition all ages, the crude estimate $$p_a = (k_i/|A_i|)/n \ (A_i \text{ is the unique age group containing age } a) \tag{24}$$

is feasible. This estimate apportions the bin count $k_i$ for bin $A_i$ uniformly among the $|A_i|$ distinct ages in the bin. Another feasible solution that perhaps is closer to the optimum is $$p_a = w_a k_i / n$$

with the weights $w_a$ suggested by the prior distribution within age group i:

$$w_a = \pi_a \Big/ \sum_{b \in A_i} \pi_b,\ \pi_b = \exp(\mu_b)/(1+\exp(\mu_b)).$$

The simpler equation (24) has given acceptable results.

The Micro-Demographic Forecast (MDF) is developed to employ the above interpolation technique to estimate an initial population distribution in each micro-geographical unit, forecast its change due to mortality and migration, and then allow reassembly of the forecasts into any desired geographic units.

The MDF offers combined geographic and temporal accuracy. On one hand, because of the privacy limitations of the Census, data that are most suitable for prediction—one-year age groups, for example—are only available in coarse geographic units such as counties. If the area of interest is smaller, irregular, or spans parts of several counties, less accurate binned data must be used to approximate the geography. The problem is geographic congruence: is the area of interest congruent with the area for which researchers have good temporal data? Temporal demographic forecasts (5, 10, 15 or more years in the future) having accuracy comparable to forecasts made from one-year data are therefore impossible using binned data unless the area of interest consists of whole counties or whole states. Thus, without the MDF, one must choose between a less accurate temporal forecast with greater geographic congruence or a more accurate temporal forecast with less geographic congruence.

On the other hand, since the MDF uses the interpolation discussed above and informs the "subordinate" data with information about the distribution occurring in the parent data, the aggregated subordinate data will mimic the superior distribution far more accurately than aggregated binned data. For example, the senior cohorts form one tail of the age distribution. Binned data from the Census Bureau almost always have, as the oldest grouping, "85 and older." Since the mean age at entry to a senior living facility is about 85, binned data are therefore of marginal utility since the distribution above 85 is not known. The standard means of inferring distributions over 85 are the Sprague and Spline Interpolations. Since Sprague and Spline are polynomials, they are unstable and inaccurate at the tails of the distribution. The MDF, using the interpolation consistent with the present invention, is more stable and more accurate.

Figure 21:
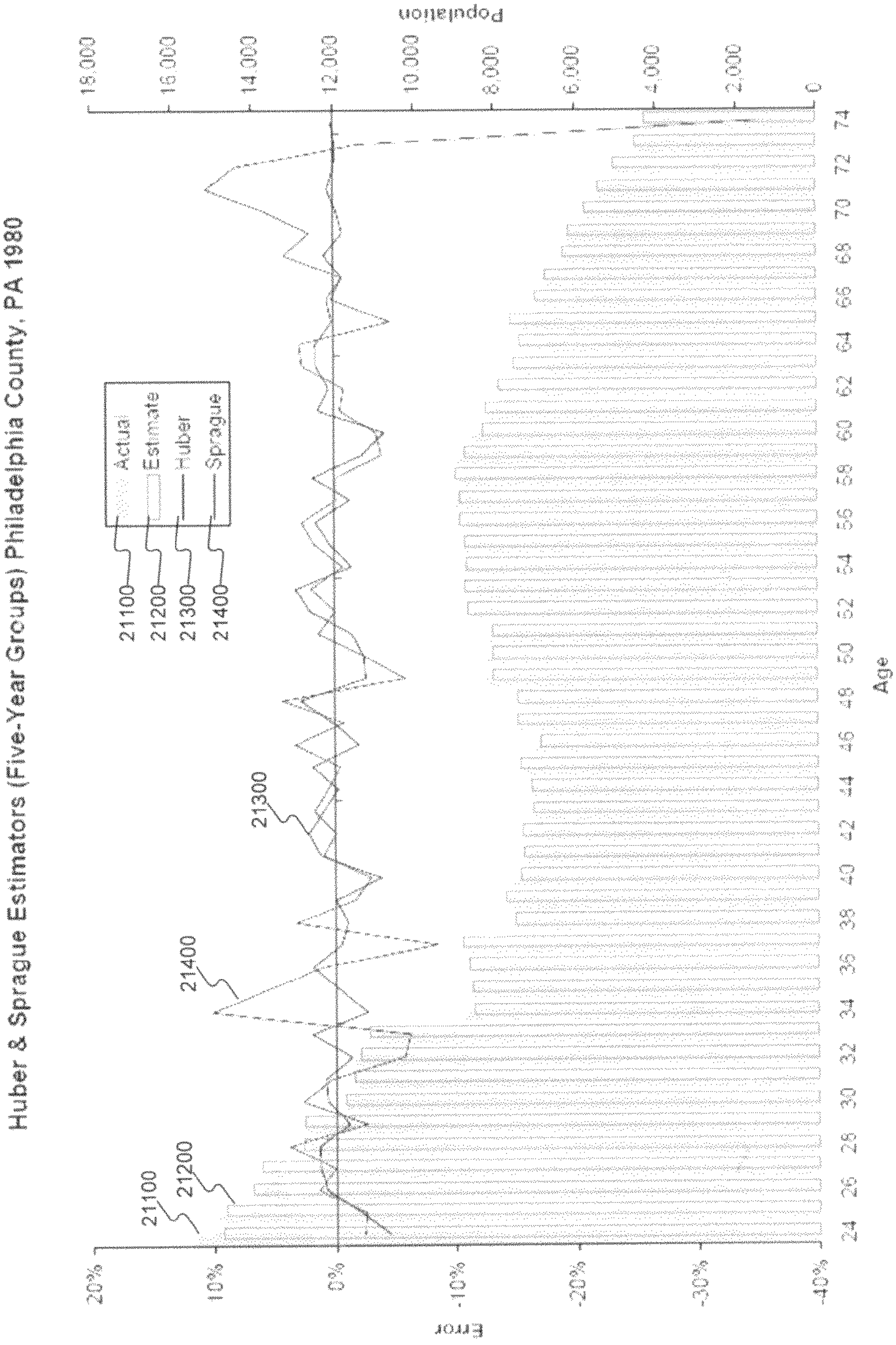
FIG. 21 is a graphical illustration of the comparison between the Micro-demographic Forecast and the Sprague Interpolation.

FIG. 21 is a graphical illustration of the comparison between the Micro-demographic Forecast and the Sprague Interpolation. In FIG. 21, bar indicator 21100 represents the actual numbers of people for various ages in Philadelphia county, PA in 1980, while bar indicator 21200 represents the estimated numbers [using the MDF?]. Curve 21300 represents the errors from the Huber Estimator or MDF, consistent with the present invention. In comparison, curve 21400 represents the errors from the Sprague Interpolation. Both the MDF and the Sprague Interpolation use data in five-year groups. Clearly, the MDF has much smaller error margins. More importantly, the MDF is much more accurate than the Sprague Interpolation when the age group is 70 or older.

In another example, the MDF may be used to create a spatially and temporally relevant demographic prediction for a proposed Facility A at Site A. Since a facility has a useful life (and mortgage) exceeding 15 years, a good forecast of the relevant demography (persons aged 75-76, 76-77, etc., for example) is necessary. The forecast geographic units must be as small as possible to fit within travel time bands, allowing congruence between the travel time bands and the geographic census units. From a practical point of view, blocks are best. Census blocks, block groups, census tracts, and counties are all large for travel time bands. The MDF allows inferences to be made from aggregated small geographic units (blocks) that fit travel time bands.

A point market analysis for a senior living facility (Facility A) creates estimates of supply, demand, and net demand at price and amenity point. Net demand is compared with the proposed beds for the site. Oversimplifying, if the net demand is not greater that the proposed beds (at price and amenity point), the project is not feasible. Here, supply is the number of competing beds at price and amenity point offered on the market by other facilities (Facilities B, C, etc.) The proposed beds are not counted. Demand is the result of a demand model which is based on the MDF's estimate of available residents who are qualified by (1) age, (2) means, (3) disability, and (4) (perhaps later) preference. Both supply and demand are then each discounted by the empirical weight of the travel time band to which it is assigned.

The MDF data must be relevant, both spatially and temporally, to the proposed Site A. Spatial relevance may be addressed by weighting the supply and demand contents of each travel-time band according to empirical evidence of the band's relative contribution to residents at Facility A. Temporal relevance may be addressed by estimates and forecasts for key economic time periods such as the lease-up period, the five and ten year marks, or the expected economic lifespan of proposed Facility A. Temporal relevance may also be addressed by the comparative accuracy of the interpolation technique in the MDF over forecasts from binned data.

Another technique, consistent with the present invention, is dynamic microsimulation where individual actors (consumers or groups of consumers) are synthesized, endowed with realistic locations at specific times, confronted with choices, and allowed to make those choices according to some model. Statistical summaries of the results not only provide forecasts of possible market conditions, but also give insight into the market dynamics by revealing its possible behavior over time in the finest possible detail. For example, the dynamic microsimulation may be used to simulate consumer choices for assisted living or long-term care.

The dynamic microsimulation advances upon other microsimulations in several ways:

(1) It uses a detailed population distribution to project population into the future.

(2) It incorporates the effect of travel time on consumer choice.

(3) It simulates the "visibility" of facilities. This is the combined effect of reputation and advertising.

(4) It responds to future changes in the marketplace, such as failed facilities or new facilities that will be built.

(5) It accounts for mortality.

(6) It is integrated with a GIS to enable detailed post-processing of the results, such as mapping the modeled interactions and the spatial distributions of consumer choices.

The dynamic microsimulation may be used to explore spatial interaction phenomena. It provides improvement over prior microsimulation efforts that either (a) focus on generating the "synthetic" data at a detailed, individual level needed for static (current time) estimates of the marketplace or (b) incorporate travel time to estimate a static pattern of choices. In addition, a "micro" simulation attempts to reproduce and project the behavior of a system through detailed modeling of the smallest components: in this case, people and assisted living facilities. The dynamic microsimulation tracks the system over time, which allows the system to change in response to events that occur during the simulation.

Accordingly, the dynamic microsimulation contains some behavioral elements and is specifically designed to incorporate additional behavioral aspects easily, by coding rules for facilities to respond to under-utilization.

The foregoing descriptions of exemplary implementations consistent with the present invention would suggest to persons skilled in the art still other such implementations. For example, although systems and methods consistent with the present invention are described as using census blocks as the defined unit of measurement, one skilled in the art will appreciate that the present invention can be practiced using other geographic units or definitions of map areas. Also, although systems and methods consistent with the present invention are described as using a primary, secondary, and tertiary market travel trace time, one skilled in the art will appreciate that the present invention can be practiced using fewer or greater numbers of travel time traces. The specification and examples be considered as exemplary only, with a true scope and spirit of the present invention depending on the following claims.

What is claimed is:

1. A computer-implemented method for computing travel costs across a region having an embedded network, the method comprising steps, performed by a computer, of:

obtaining data associated with the network, the network comprising nodes and edges connecting the nodes, wherein the data associated with the edges indicates (i) allowed directions of travel along the edges, (ii) total travel costs to traverse the edges, and (iii) whether the edges are accessible;

obtaining a grid representing the region, the grid comprising a plurality of cells covering the region and representing unit costs of travel across the cells;

preparing a cost-grid dataset comprising costs for off-network travel between an initial location in the region and the plurality of cells in the grid;

preparing, using the computer, a hybrid grid-network dataset comprising network travel costs between nodes of the network, the off-network travel costs between cells of the grid, and travel costs between the network and the grid, wherein the preparing step comprises:

rasterizing accessible edges of the network to locate grid cells connecting the network with the grid;

identifying, based on the rasterized edges, one or more of the plurality of cells of the grid that are accessible to the network; and computing the network travel costs associated with travel between the nodes of the network, and the travel costs between the nodes of the network and connected grid cells;

calculating back-links between elements of the hybrid grid-network dataset, the back-links reflecting travel routes originating at the initial location;

storing, using a storage device, the prepared hybrid grid-network dataset and the calculated back-links; and querying the hybrid grid-network dataset and the calculated back-links to identify a route with a minimum travel cost from the initial location to a query point within the region.

2. The method of claim 1, wherein the cost-grid dataset further comprises costs for off-network travel from a group of initial locations in the region.

3. The method of claim 1, wherein the initial location in the region includes points off the network.

4. The method of claim 1, wherein the elements of the hybrid grid-network include centers of cells in the grid and nodes of the network.

5. The method of claim 1, further comprising reporting the minimum travel cost.

6. The method of claim 1, further comprising:

providing a set of initial locations within the region; and initializing one or more of the hybrid grid-network and cost-grid datasets.

7. The method of claim 6, wherein the step of initializing the datasets includes:

labeling each initial location in the set with a zero cost;

initializing the costs in the cost-grid dataset to infinity; and nullifying the back-links between elements of the hybrid grid-network dataset.

8. The method of claim 1, wherein the step of obtaining the grid includes:

computing unit costs of travel as a function of location or other attributes of points in the region.

9. The method of claim 6, wherein the step of preparing the cost-grid dataset includes:

computing costs and back-links to travel along the grid to a nearest accessible node of the network from each of the set of initial locations.

10. The method of claim 1, wherein:

the step of calculating the back links comprises:

computing minimum costs and back-links for traveling from cell to cell in the grid of the region beginning at the accessible network nodes in the network; and the method further comprises:

updating the cost-grid dataset using the back-links in the network; and updating the hybrid grid-network dataset with the back-links corresponding to the minimum costs.

11. The method of claim 1, further comprising:

obtaining data associated with one or more additional networks; and repeating, for the one or more networks, the steps of preparing the hybrid grid-network dataset, calculating the back-links, storing the hybrid grid-network dataset and the calculated back-links, and querying the hybrid grid-network dataset and the calculated back-links.

12. The method of claim 1, wherein the step of rasterizing the accessible edges includes:

creating a raster representation of the accessible edges;

interpolating costs along the accessible edges based on costs at endpoint nodes; and copying the interpolated costs to corresponding cells.

13. The method of claim 10 further including:

halting the computation of minimum costs and back-links upon reaching a predetermined cost limit.

14. The method of claim 10, further including:

halting the computation of minimum costs and back-links upon reaching a predetermined distance limit.

15. A system for computing travel costs across a region having an embedded network, comprising:

means for obtaining a data associated with the network, the network comprising nodes and edges connecting the nodes, wherein the data associated with the edges indicates (i) allowed directions of travel along the edges, (ii) total travel costs to traverse the edges, and (iii) whether the edges are accessible;

means for obtaining a grid representing the region, the grid comprising a plurality of cells covering the region unit costs of travel across the cells;

means for preparing a cost-grid dataset comprising costs for off-network travel between an initial location in the region and the plurality of cells in the grid;

means for preparing a hybrid grid-network dataset representing network travel costs between the nodes of the network, the off-network travel costs between cells of the grid, and travel costs between the network and the grid, wherein the means for preparing comprises:

means for rasterizing accessible edges of the network to locate grid cells connecting the network with the grid;

means for identifying, based on the rasterized edges, one or more of the plurality of cells of the grid that are accessible to the network; and means for computing the network travel costs associated with travel between the nodes of the network, and the travel costs between the nodes of the network and connected grid cells;

means for calculating back-links between elements of the hybrid grid-network dataset, the back-links reflecting travel routes originating at the initial location;

means for storing, using a storage device, the prepared hybrid grid-network dataset and the calculated back-links; and means for querying the hybrid grid-network dataset and the calculated back-links to identify a route with a minimum travel cost from the initial location to a query point within the region.

16. The system of claim 15, wherein the cost-grid dataset further comprises costs for off-network travel from a group of initial locations in the region.

17. The system of claim 15, wherein the initial location in the region includes points off the network.

18. The system of claim 15, wherein the elements of the hybrid grid-network comprise centers of cells in the grid and nodes of the network.

19. The system of claim 15, further comprising means for reporting the minimum travel cost.

20. The system of claim 15, further comprising:

means for providing a set of initial locations within the region; and means for initializing one or more of the cost-grid and hybrid grid-network datasets.

21. The system of claim 20, wherein the means for initializing the datasets includes:

means for labeling each initial location in the set with a zero cost;

means for initializing the costs in the cost-grid dataset to infinity; and means for nullifying the back-links in the hybrid grid-network dataset.

22. The system of claim 20, wherein the means for obtaining the grid includes:

computing the unit costs of travel as a function of location or other attributes of points in the region.

23. The system of claim 20, wherein the means for the cost-grid dataset includes:

means for computing costs and back-links to travel along the cost grid to a nearest accessible node of the network from each of the set of initial locations.

24. The system of claim 15, wherein the means for calculating the back-links comprises:

means for computing minimum costs for traveling from cell to cell in the region beginning at the accessible network nodes in the network; and the system further comprises:

means for updating the cost-grid dataset using the back-links of the network; and means for updating the hybrid grid-network dataset with back-links corresponding to the minimum costs.

25. The system of claim 15, further comprising:

means for obtaining data associated with one or more additional networks; and means for repeating, for the one or more additional networks, the steps of preparing the hybrid grid-network dataset, calculating the back-links, storing the hybrid grid-network dataset and the calculated back-links, and querying the hybrid grid-network dataset and the calculated back-links.

26. The system of claim 15, wherein the means for rasterizing the accessible edges includes:

means for creating a raster representation of the accessible edges;

means for interpolating costs along the accessible edges based on costs at endpoint nodes; and means for copying the interpolated costs to corresponding cells.

27. The system of claim 24, further including:

means for halting the computation of minimum costs and back-links upon reaching a predetermined cost limit.

28. The system of claim 24, further including:

means for halting the computation of minimum costs and back-links upon reaching a predetermined distance limit.

29. A computer-readable medium containing instructions, when executed by a computer, for performing a method for computing travel costs across a region having an embedded network, the method comprising:

obtaining data associated with the network, the network comprising nodes and edges connecting the nodes, wherein the data associated with the edges indicates (i) allowed directions of travel along the edges, (ii) total travel costs to traverse the edges, and (iii) whether the edges are accessible;

obtaining a grid representing the region, the grid comprising a plurality of cells covering the region and representing unit costs of travel across the cells;

preparing a cost-grid dataset comprising costs for off-network travel between an initial location in the region and the plurality of cells in the grid;

preparing, using the computer, a hybrid grid-network dataset representing network travel costs between nodes of the network, the off-network travel costs between cells of the grid, and travel costs between the network and the grid, wherein the preparing step comprises:

rasterizing accessible edges of the network to locate grid cells connecting the network with the grid;

identifying, based on the rasterized edges, one or more of the plurality of cells of the grid that are accessible to the network; and computing the network travel costs associated with travel between the nodes of the network, and the travel costs between the nodes of the network and connected grid cells;

calculating back-links between elements of the hybrid grid-network dataset, the back-links reflecting travel routes originating at the initial location;

storing, using a storage device, the prepared hybrid grid-network dataset and the calculated back-links; and querying the hybrid grid-network dataset and the calculated back-links to identify a route with a minimum travel cost from the initial location to a query point within the region.

30. A computer-implemented method for determining a market area, the method comprising steps, performed by a computer, of:

receiving a potential market location and a maximum travel time;

defining a preliminary market area around the potential market location using the maximum travel time from that potential market location;

defining, within the preliminary market area, bands reflecting increasing travel time from the potential market location;

weighting the bands according to a market-related factor; and determining a final market area based on the weighted bands, wherein defining bands includes:

obtaining data associated with the network, the network comprising nodes and edges connecting the nodes, wherein the data associated with the edges indicates (i) allowed directions of travel along the edges, (ii) total travel costs to traverse the edges, and (iii) whether the edges are accessible;

obtaining a grid representing the region associated with the market area, the grid comprising a plurality of cells covering the region and representing unit costs of travel across each cell;

preparing a cost-grid dataset comprising costs for off-network travel between an initial location in the region and the plurality of cells in the grid;

preparing, using the computer, a hybrid grid-network dataset representing network travel costs between the nodes of the network, the off-network travel costs between cells of the grid, and travel costs between the network and the grid, wherein the preparing step comprises:

rasterizing accessible edges of the network to locate grid cells connecting the network with the grid;

identifying, based on the rasterized edges, one or more of the plurality of cells of the grid that are accessible to the network; and computing the network travel costs associated with travel between the nodes of the network, and the travel costs between the nodes of the network and connected grid cells;

calculating back-links between elements of the hybrid grid-network dataset, the back-links reflecting travel routes originating at the initial location;

storing, using a storage device, the prepared hybrid grid-network dataset and the calculated back-links; and querying the hybrid grid-network dataset and the calculated back-links to identify a route with a minimum travel cost from the initial location to a query point within the region.

31. A system for determining a market area, the system comprising:

means for receiving a potential market location and a maximum travel time;

means for defining a preliminary market area around the potential market location using the maximum travel time from that potential market location;

means for defining, within the preliminary market area, bands reflecting increasing travel time from the potential market location;

means for weighting the bands according to a market-related factor; and means for determining a final market area based on the weighted bands, wherein means for defining bands includes:

means for obtaining a data associated with the network, the network comprising nodes and edges connecting the nodes, wherein the data associated with the edges indicates (i) allowed directions of travel along the edges, (ii) total travel costs to traverse the edges, and (iii) whether the edges are accessible;

means for obtaining a grid representing the region associated with the market area, the grid comprising a plurality of cells covering the region and representing unit costs of travel across each cell;

means for preparing a cost-grid dataset-comprising costs for off-network travel between an initial location in the region and the plurality of cells in the grid;

means for preparing a hybrid grid-network dataset representing the network travel costs between nodes of the network, the off-network travel costs between cells of the grid, and travel costs between the network and the grid, wherein the means for preparing comprises:

means for rasterizing accessible edges of the network to locate grid cells connecting the network with the grid;

means for identifying, based on the rasterized edges, one or more of the plurality of cells of the grid that are accessible to the network; and computing the network travel costs associated with travel between the nodes of the network, and the travel costs between the nodes of the network and connected grid cells;

means for calculating back-links between elements of the hybrid grid-network dataset, the back-links reflecting travel routes originating at the initial location;

means for storing, using a storage device, the prepared hybrid grid-network dataset and the calculated back-links; and means for querying the hybrid grid-network dataset and the calculated back-links to identify a route with a minimum travel cost from the initial location to a query point within the region.

* * * * *